US010264943B2

(12) United States Patent
Toga et al.

(10) Patent No.: US 10,264,943 B2
(45) Date of Patent: Apr. 23, 2019

(54) WASHER

(71) Applicant: HOSHIZAKI DENKI KABUSHIKI KAISHA, Toyoake-shi (JP)

(72) Inventors: Keiichi Toga, Toyoake (JP); Yoshimasa Tameishi, Toyoake (JP); Mamoru Tsumori, Toyoake (JP); Mikio Mototsune, Toyoake (JP); Youji Ebita, Toyoake (JP); Kenji Kobayashi, Toyoake (JP)

(73) Assignee: HOSHIZAKI CORPORATION, Toyoake (JP)

( * ) Notice: Subject to any disclaimer, the term of this patent is extended or adjusted under 35 U.S.C. 154(b) by 483 days.

(21) Appl. No.: 15/107,830

(22) PCT Filed: Oct. 29, 2014

(86) PCT No.: PCT/JP2014/078786
§ 371 (c)(1),
(2) Date: Jun. 23, 2016

(87) PCT Pub. No.: WO2015/098276
PCT Pub. Date: Jul. 2, 2015

(65) Prior Publication Data
US 2016/0324390 A1   Nov. 10, 2016

(30) Foreign Application Priority Data

Dec. 27, 2013 (JP) ................................ 2013-272294
Dec. 27, 2013 (JP) ................................ 2013-272299

(Continued)

(51) Int. Cl.
*A47L 15/00* (2006.01)
*A47L 15/42* (2006.01)

(52) U.S. Cl.
CPC ....... *A47L 15/0047* (2013.01); *A47L 15/0081* (2013.01); *A47L 15/42* (2013.01);
(Continued)

(58) Field of Classification Search
None
See application file for complete search history.

(56) References Cited

U.S. PATENT DOCUMENTS

| 4,202,406 A | 5/1980 | Avery |
| 5,660,193 A | 8/1997 | Archer et al. |

(Continued)

FOREIGN PATENT DOCUMENTS

| CN | 101543389 A | 9/2009 |
| CN | 101790341 A | 7/2010 |

(Continued)

OTHER PUBLICATIONS

International Search Report dated Jan. 20, 2015 for PCT Application No. PCT/JP2014/078786.

(Continued)

*Primary Examiner* — Michael E Barr
*Assistant Examiner* — Jason P Riggleman
(74) *Attorney, Agent, or Firm* — Moser Taboada

(57) ABSTRACT

A washer includes: a supply-water storage section configured to store supply water;
a wastewater storage section configured to temporarily store wastewater and
a wastewater heat recovery device including a water supply channel through which the supply water is supplied to the supply-water storage section and a drain channel through which the wastewater is drained from the wastewater storage section, and configured to exchange heat between the wastewater flowing in the drain channel and the supply water flowing in the water supply channel.
the wastewater heat recovery device is disposed below the washing chamber, and is provided in a machine chamber in which a pump configured to deliver the supply water from the supply-water storage section to the washing chamber is disposed, and
the drain channel is connected to a drain hole of the wastewater storage section.

15 Claims, 30 Drawing Sheets

(30) Foreign Application Priority Data

May 28, 2014 (JP) ................................. 2014-110534
Jul. 3, 2014 (JP) ................................. 2014-137911

(52) U.S. Cl.
CPC ....... *A47L 15/4223* (2013.01); *A47L 15/4291* (2013.01); *A47L 15/0078* (2013.01); *Y02B 40/46* (2013.01)

(56) References Cited

U.S. PATENT DOCUMENTS

| 2009/0090402 | A1* | 4/2009 | Tameishi | A47L 15/0055 |
| | | | | 134/56 D |
| 2010/0024844 | A1 | 2/2010 | Brunswick et al. | |

FOREIGN PATENT DOCUMENTS

| CN | 102917630 A | 2/2013 |
|----|-------------|--------|
| JP | S61237964 A | 10/1986 |
| JP | H04180725 A | 6/1992 |
| JP | H08150107 A | 6/1996 |
| JP | H10108818 A | 4/1998 |
| JP | H10-115459 A | 5/1998 |
| JP | H1161964 A | 3/1999 |
| JP | 2003301500 A | 10/2003 |
| JP | 3106414 U | 1/2005 |
| JP | 2006-038242 | 2/2006 |
| JP | 2006038242 A | 2/2006 |
| JP | 3132813 U | 6/2007 |
| JP | 2008-008568 | 1/2008 |
| JP | 2008008568 A | 1/2008 |
| JP | H4-180725 | 11/2008 |
| JP | 2009-099481 | 5/2009 |
| JP | 2009099481 A | 5/2009 |
| JP | 2012-047407 | 3/2012 |
| JP | 2012047407 A | 3/2012 |
| JP | 2013-234766 | 11/2013 |
| JP | 2013234766 A | 11/2013 |

OTHER PUBLICATIONS

Japanese Office Action dated Apr. 24, 2018 for Application No. P2014-137911.
Japanese Office Action dated Jun. 13, 2017 for Application No. 2013272299.
Chinese Office Action dated Mar. 5, 2018 for Application No. 201480070970.7.
Japanese Office Action dated Apr. 3, 2018 for Patent Application No. P2014-110534.
Japanese Office Action dated Jun. 6, 2017 for Application No. 2013272299.
Extended European Search Report dated Aug. 16, 2017 for Application No. 14873951.9.
International Preliminary Report on Patentability dated Jul. 7, 2016 for PCT Application No. PCT/JP2014/078786.

* cited by examiner

Fig.26
(A)
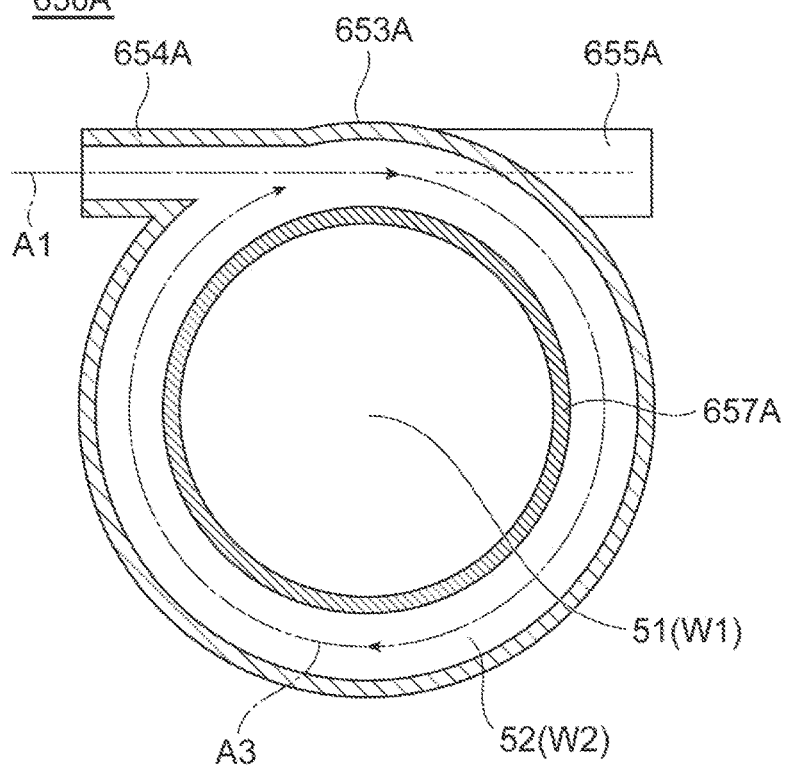
(B)
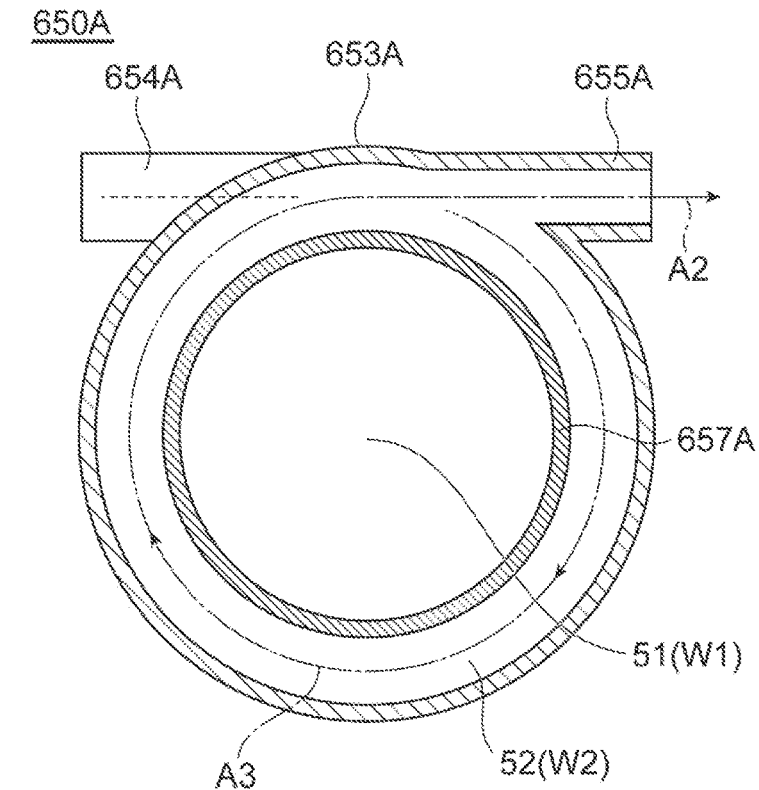

Fig.27
(A)
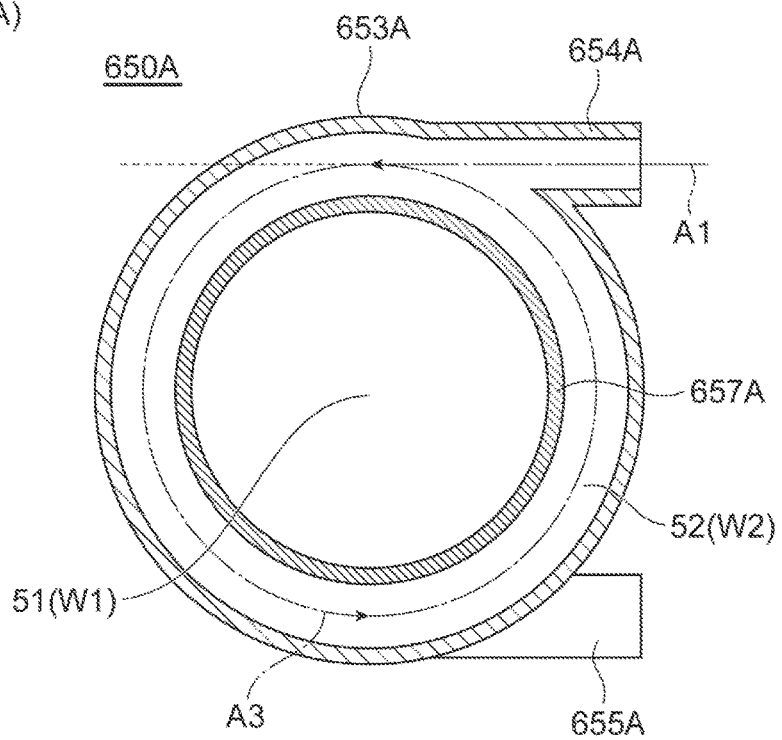
(B)
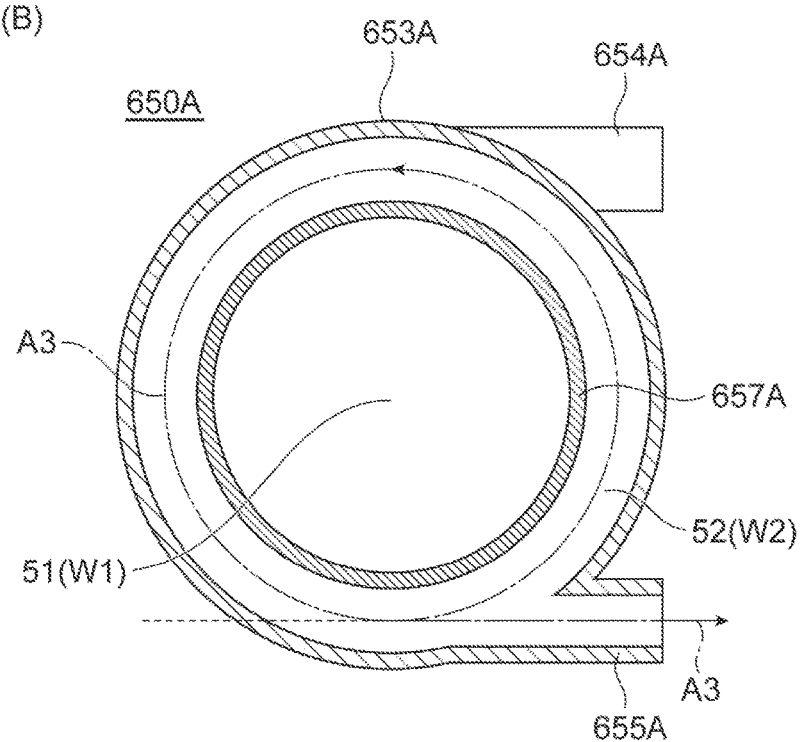

WASHER

TECHNICAL FIELD

The present invention relates to a washer configured to wash an object to be washed such as a dish.

BACKGROUND ART

A washer has been known that includes a wastewater heat recovery device configured to exchange heat between supply water supplied for washing and rinsing dishes and other tableware in a washing chamber and wastewater drained from the washing chamber during the washing and rising. Washers including such wastewater heat recovery devices are disclosed in Patent Literature 1 (Japanese Unexamined Patent Publication No. H8-150107) and Patent Literature 2 (Japanese Utility Model Registration No. 3132813), for example. The washers disclosed in Patent Literatures 1 and 2 are each provided with a machine chamber accommodating a device such as a pump below the washing chamber in which dishes and other tableware are washed, and each wastewater heat recovery device described above is provided outside such a machine chamber.

CITATION LIST

Patent Literature

[Patent Literature 1] Japanese Unexamined Patent Publication No. H8-150107
[Patent Literature 2] Japanese Utility Model Registration No. 3132813

SUMMARY OF INVENTION

Technical Problem

However, in the above-described conventional washers, because the wastewater heat recovery devices are provided outside the machine chambers (hereinafter, outside the machine chamber is referred to as "outboard"), there is a problem in that temperature of wastewater decreases while the wastewater is flowing to the outboard wastewater heat recovery device thereby deteriorating efficiency of heat exchange. In the above-described conventional washers, because the wastewater heat recovery devices need to be provided outboard, there is a problem in that flexibility in installation of the washers is poor.

In view of this, the present invention aims to provide a washer that enables efficient heat exchange and can prevent a decrease in flexibility in installation of the washer.

Solution to Problem

A washer according to one aspect of the present invention includes: a supply-water storage section configured to store supply water to be used for washing and rinsing an object to be washed accommodated in a washing chamber; a wastewater storage section configured to temporarily store wastewater that has been used for washing and rinsing the object to be washed; and a wastewater heat recovery device including a water supply channel through which the supply water is supplied to the supply-water storage section and a drain channel through which the wastewater is drained from the wastewater storage section, the wastewater heat recovery device being configured to exchange heat between the wastewater flowing in the drain channel and the supply water flowing in the water supply channel. The wastewater heat recovery device is disposed below the washing chamber, and is provided in a machine chamber in which a pump configured to deliver the supply water from the supply-water storage section to the washing chamber is disposed. The drain channel is connected to a drain hole of the wastewater storage section.

In the washer thus configured, because the drain channel is directly connected to the drain hole of the wastewater storage section, the wastewater that has just been drained from the wastewater storage section can be used to exchange heat with the supply water. In the washer thus configured, the wastewater heat recovery device is disposed in the machine chamber, which eliminates the need of creating space for the wastewater heat recovery device to be separately provided outside the machine chamber. This enables efficient heat exchange and can prevent a decrease in flexibility in installation of the washer.

In one embodiment, the wastewater beat recovery device may include: a connection portion having a hollow portion serving as part of the drain channel, the connection portion being formed so as to be fixable to the wastewater storage section; a straight tube formed so as to be capable of fitting into the hollow portion of the connection portion, and having a hollow portion serving as part of the drain channel; and a body portion formed so as to be fixable to the connection portion to allow the straight tube to be inserted into the body portion from an end portion on a side connected to the connection portion. In a state in which the straight tube is inserted into the body portion, the water supply channel may be formed between an outer peripheral surface of the straight tube and an inner peripheral surface of the body portion.

In the wastewater heat recovery device thus configured, the connection portion is fixed to the wash-water tank, and the body portion into which the straight tube is inserted is fixed to the connection portion so that the straight tube is fitted into the hollow portion. Consequently, the drain channel is formed in the hollow portions of the connection portion and the straight tube, and the water supply channel is formed between the inner peripheral surface of the body portion and the outer peripheral surface of the straight tube. In the washer including this wastewater heat recovery device, the drain channel is formed from the straight tube, and thus garbage such as food scraps can be easily removed. Because the washer is structured such that the straight tube serving as the drain channel can be detached from the body portion, maintainability is excellent in that the straight tube can be cleaned after being detached, for example.

In one embodiment, the wastewater heat recovery device may include: a connection portion having a hollow portion serving as part of the drain channel, the connection portion being formed so as to be fixable to the wastewater storage section; a bellows tube formed so as to be capable of fitting into the hollow portion and having a hollow portion serving as part of the drain channel; and a body portion formed so as to be fixable to the connection portion to allow the bellows tube to be inserted into the body portion from an end portion on a side connected to the connection portion. In a state in which the bellows tube is inserted into the body portion, the water supply channel may be formed between an outer peripheral surface of the bellows tube and an inner peripheral surface of the body portion. A bellows portion of the bellows tube may be formed so that an outer diameter of the bellows portion is smaller than an inner diameter of a portion of the body portion into which the bellows tube is inserted.

In the wastewater heat recovery device thus configured, the connection portion is fixed to the wash-water tank, and the body portion into which the bellows tube is inserted is fixed to the connection portion so that the bellows tube is fitted into the hollow portion. Consequently, the drain channel is formed in the hollow portions of the connection portion and the bellows tube, and the water supply channel is formed between the inner peripheral surface of the body portion and the outer peripheral surface of the bellows tube. In the washer including this wastewater heat recovery device, the drain channel is formed from the bellows tube, which can increase the contact area between the drain channel and the water supply channel, thereby enhancing the efficiency of heat exchange between the wastewater and the supply water. In the washer including this wastewater heat recovery device, the bellows tube serving as the drain channel is smaller than the inner diameter of the portion of the body portion into which the bellows tube is inserted. This allows the bellows tube to be detached from the body portion, and thus maintainability is excellent in that the bellows tube can be cleaned after being detached.

In one embodiment, the wastewater heat recovery device may include a portion serving as a double tube in which the water supply channel is disposed outside the drain channel, the water supply channel may include an inflow portion through which the supply water flows in and an outflow portion through which the supply water flows out, and at least one of the inflow portion and the outflow portion may be firmed so that a direction in which the supply water flows in at the inflow portion or a direction in which the supply water flows out at the outflow portion correspond to a direction of a tangent to the circumference of the double tube.

In the wastewater heat recovery device thus configured, the supply water that flows in from the inflow portion of the water supply channel flows to the outflow portion along the extending direction of the drain channel while rotating along the outer peripheral surface of the drain channel. In other words, the supply water flows spirally in the water supply channel. With the washer including this wastewater heat recovery device, the supply water can be retained in the wastewater heat recovery device for a longer period of time than in a case that the supply water flows straight in the water supply channel. Consequently, a sufficient period of time for exchanging heat between the wastewater and the supply water can be ensured, which allows the supply water to sufficiently receive heat that the wastewater has.

In one embodiment, the wastewater heat recovery device may include: a body tubular portion having a tubular shape; the water supply channel disposed in a manner facing an inner peripheral surface of the body tubular portion; and the drain channel formed in a space inside the water supply channel in a radial direction of the body tubular portion.

In the wastewater heat recovery device thus configured, because the water supply channel is completely contained in the body tubular portion forming the drain channel, heat that has been exchanged by heat exchange can be prevented from being radiated outside. The washer including this wastewater heat recovery device enables efficient heat exchange between the supply water and the wastewater.

In one embodiment, the water supply channel may be disposed spirally in a manner facing an inner peripheral surface of the body tubular portion.

In the wastewater heat recovery device thus configured, the water supply channel is disposed spirally, which allows a longer water supply channel to be obtained in the body tubular portion. Thus, the supply water can be retained in the body tubular portion for a longer period of time, whereby heat can be sufficiently exchanged between the supply water and the wastewater. In other words, space for obtaining required heat exchanging performance can be reduced.

In one embodiment, the water supply channel may be formed from a tubular member, and the body tubular portion and the tubular member may be formed integrally. In other words, the tubular member serving as the water supply channel may be insert molded into the body tubular portion.

In the wastewater heat recovery device thus configured, connection for providing the tubular member serving as the water supply channel in the body tubular portion does not need screws, for example. Thus, occurrence of leakage of fluid, such as the wastewater and the supply water, at portions connected by screws or other means can be reduced.

In one embodiment, a spiral groove may be formed on the inner peripheral surface of the body tubular portion. In this case, the water supply channel may be formed by an outer peripheral surface of an inserted tubular portion that is inserted into the body tubular portion and the spiral groove, and a hollow portion of the inserted tubular portion may serve as the drain channel.

In the wastewater heat recovery device thus configured, the drain channel formed in a space inside the water supply channel that is spirally disposed is formed as the hollow portion of the inserted tubular portion, and thus garbage such as food scraps contained in the wastewater can be prevented from being accumulated.

In one embodiment, the washer may further include a connection tubular portion a hollow portion of which serves as the drain channel. In this case, the connection tubular portion may be connected to at least one of both ends of the body tubular portion in the axial direction, and an inner diameter of the body tubular portion may be formed so that an inner diameter of the drain channel that is formed inside the water supply channel in the radial direction of the body tubular portion is substantially identical to the inner diameter of the connection tubular portion.

In the wastewater heat recovery device thus configured, a portion in the entire drain channel in which heat is transferred to and from the water supply channel, i.e., the drain channel formed in the space inside the water supply channel that is disposed on the inner peripheral surface of the body tubular portion is formed so that the inner diameter thereof is substantially identical to the inner diameter of the drain channel formed in the hollow portion of the connection tubular portion that is connected to this drain channel. Accordingly, the drain channel formed in the space inside the water supply channel and the drain channel connected to this drain channel in series along the draining direction are smoothly connected without level difference. In other words, the entire drain channel in the wastewater heat recovery device is smoothly formed without unevenness. Thus, garbage such as food scraps contained in the wastewater can be prevented from being accumulated in the drain channel portion that is formed in the space inside the water supply channel. Because the water supply channel is completely contained in the body tubular portion forming the drain channel, heat that has been exchanged by heat exchange can be prevented from being radiated outside. Consequently, maintainability is excellent, and heat can be efficiently exchanged between the supply water and the wastewater.

In one embodiment, the washer may further include a tapered portion connected to an end portion downstream of the body tubular portion in the axial direction, the tapered portion having a hollow portion serving as the drain channel.

The tapered portion may have an inclined surface that causes an inner diameter of the hollow portion to gradually decrease from a connection portion connected to the body tubular portion toward a direction in which the wastewater flows. When the distance in the radial direction of the body tubular portion between the water supply channels that are opposed to each other across a central axis of the body tubular portion is defined as a basic dimension, the inclined surface may be formed so that, in a cross section passing through the central axis along the direction in which the wastewater flows, a distance between the inclined surface and one point on the connection portion that is opposed to the inclined surface across the central axis is larger than the basic dimension.

The distance herein is different from the length of a perpendicular dropped from one point on the connection portion to the inclined surface. Specifically, this distance is a distance that does not allow a stick-like member having a length of the basic dimension to come into contact with the inclined surface when the stick-like member is pivoted, about a pivot axis that is one point on the connection portion that is in a position opposed to the inclined surface across the central axis, along a plane direction of the cross section passing through the central axis along the direction in which the wastewater flows. The downstream means downstream in the direction in which the wastewater flows.

In the wastewater heat recovery device thus configured, even if there is a portion having a hollow portion the inner diameter of which gradually decreases toward the direction in which the wastewater flows, the stick-like member can be prevented from being firmly caught at this portion. Even if a stick-like member is caught in the radial direction, the stick-like member can be forced to flow downstream together with water and/or another stick-like member that falls afterwards. Consequently, clogging with the stick-like member can be prevented.

In one embodiment, the wastewater heat recovery device may include a first member and a second member. In this case, the first member includes: a body portion including a supply-water inlet portion serving as an inlet of the water supply channel, a supply-water outlet portion serving as an outlet of the water supply channel, and a wastewater inlet portion serving as an inlet of the drain channel; and a water supply tube serving as the water supply channel that includes one end connected to the supply-water inlet portion and another end connected to the supply-water outlet portion, extends from the one end to the other end, and is disposed so that part between the one end and the other end protrudes in one direction from the body portion. The second member includes: an accommodating portion accommodating the part of the water supply tube protruding from the body portion and serving as the drain channel; and a wastewater outlet portion serving as an outlet of the drain channel, and is detachably mounted on the one direction side of the body portion. The wastewater flowing in the accommodating portion and the supply water flowing in the water supply tube accommodated in the accommodating portion exchange heat with each other.

Even after the wastewater heat recovery device thus configured is incorporated into the washer, by detaching the second member from the first member attached to the washer body, the inside of the wastewater heat recovery device can be easily inspected and cleaned. Consequently, the wastewater heat recovery device can be provided that is excellent in maintainability.

In one embodiment, the part of the water supply tube protruding from the body portion may be spirally wound along the one direction, and the wastewater flowing in from the wastewater inlet portion may pass through a space extending along the one direction and surrounded by the water supply tube spirally wound to be drained from the wastewater outlet portion.

In the wastewater heat recovery device thus configured, the wastewater passing through the space extending along the one direction and surrounded by the water supply tube spirally wound and the supply water flowing in the water supply tube exchange beat with each other. Because the water supply tube serving as a channel for the supply water is spirally disposed, required heat exchanging performance can be obtained in a smaller space.

In one embodiment, a joint portion between the accommodating portion of the second member and the body portion of the first member may be provided at a position that faces the water supply tube spirally wound in a plane direction orthogonal to the one direction.

In the wastewater heat recovery device thus configured, when viewed from a space serving as a channel of the wastewater, the joint portion between the first member and the second member is positioned behind the water supply tube. This prevents the wastewater from reaching the joint portion, and thus the wastewater can be prevented from leaking from the joint portion.

In one embodiment, the water supply tube of the first member may be formed integrally during injection molding of the body portion. In other words, the water supply tube may be an insert part for injection molding of the body portion.

In the wastewater heat recovery device thus configured, connection for providing the supply tube serving as a channel of the supply water in the body portion does not need screws, for example. Thus, occurrence of leakage of fluid, such as the wastewater and the supply water, at portions connected by screws or other means can be reduced.

In one embodiment, the supply-water inlet portion and the supply-water outlet portion of the body portion of the first member may each have a screw thread formed integrally during injection molding of the body portion.

In the wastewater heat recovery device thus configured, the number of components for connecting other pipes to the supply-water inlet portion and the supply-water outlet portion can be reduced. This can reduce the number of components in the entire wastewater heat recovery device.

Advantageous Effects of Invention

The present invention enables efficient heat exchange between the supply water and the wastewater.

BRIEF DESCRIPTION OF DRAWINGS

FIG. 26 includes sectional views at an inflow portion and at an outflow portion in a wastewater heat recovery device according to a fourth modification.

FIG. 27 includes sectional views at an inflow portion and at an outflow portion in a wastewater heat recovery device according to the fourth modification.

DESCRIPTION OF EMBODIMENTS

Dishwashers according to first to ninth embodiments will now be described with reference to the drawings. In the description of the drawings, like reference signs are given to like elements, and duplicated explanation is omitted. Dimensional ratios of the drawings do not necessarily match those of the description.

First Embodiment

Figure 1:
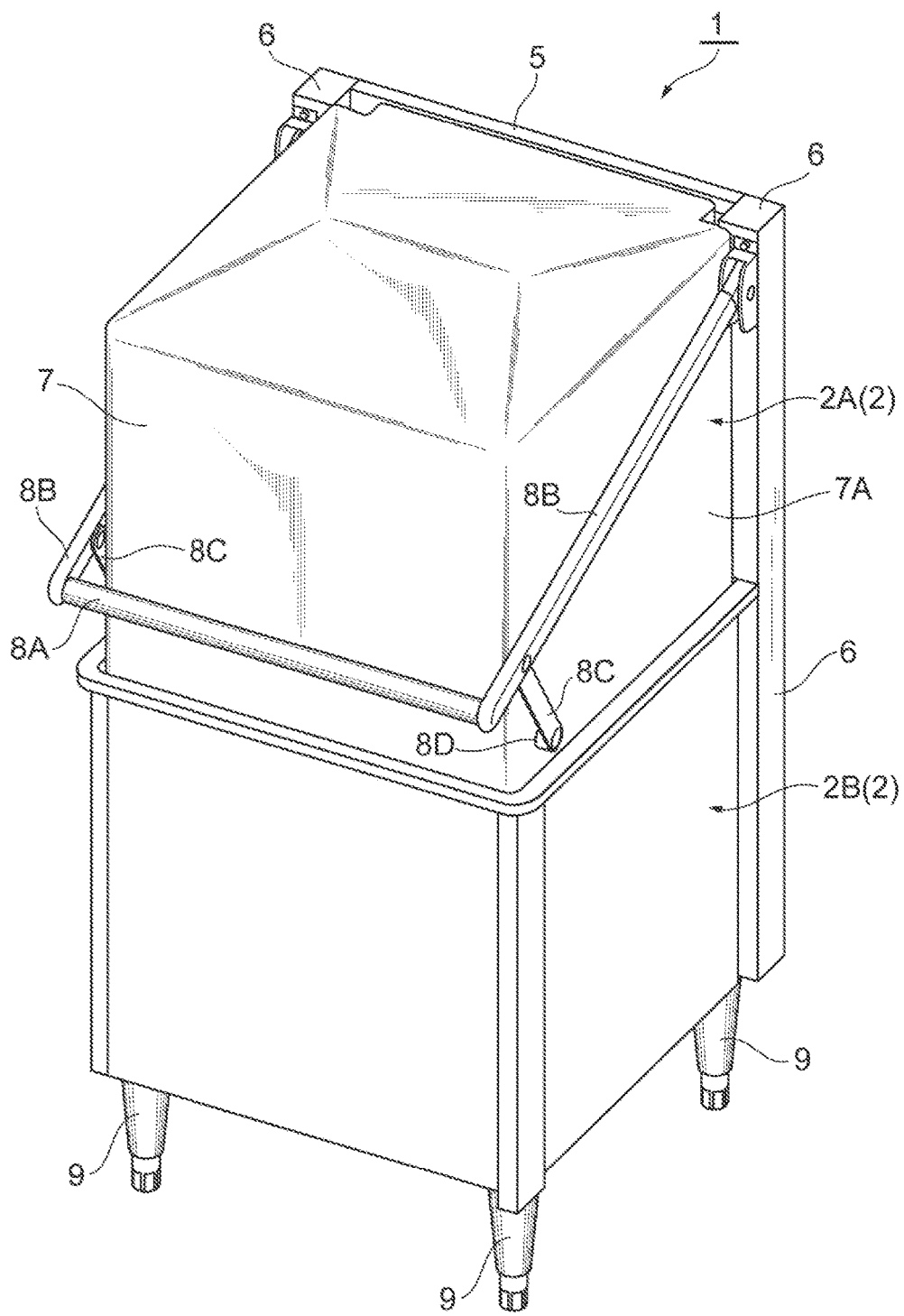
FIG. 1 is a perspective view illustrating a dishwasher including a wastewater heat recovery device according to a first embodiment.
Figure 2:
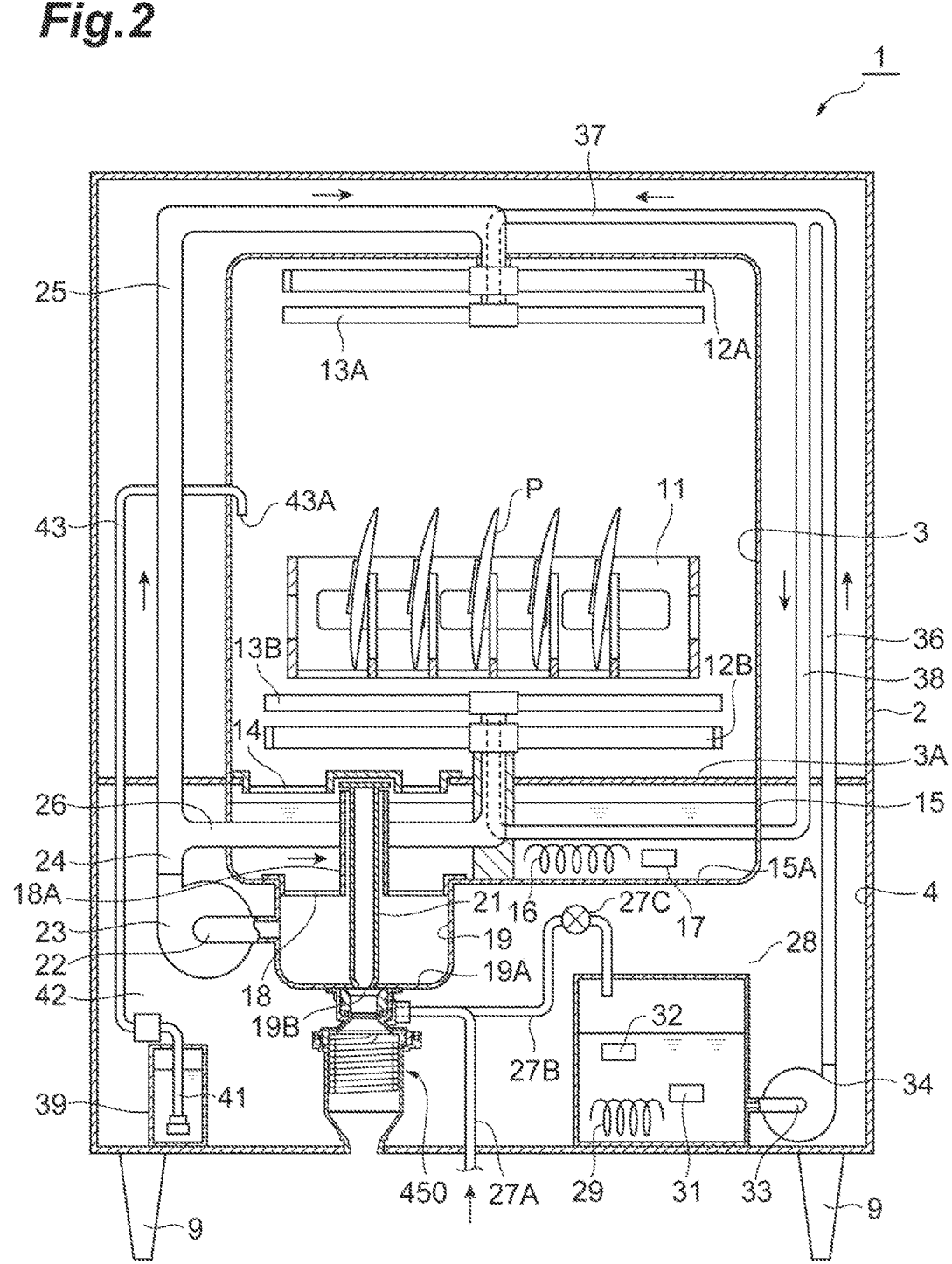
FIG. 2 is a sectional view illustrating a schematic structure of the dishwasher including the wastewater heat recovery device according to the first embodiment.

The following describes the first embodiment mainly with reference to FIG. 1 to FIG. 6. As depicted in FIG. 2, a dishwasher 1 of the first embodiment is a dishwasher configured to spray wash water (supply water) from upper and lower washing nozzles 12A and 12B provided in a washing chamber 3, and configured to spray rinse water (supply water) from upper and lower rinsing nozzles 13A and 13B. As depicted in FIG. 1 and FIG. 2, the dishwasher 1 includes a washer body 2 covered by a stainless-steel panel. As depicted in FIG. 1, the washer body 2 is partitioned into an upper section 2A in which the washing chamber 3 is formed and a lower section 2B in which a machine chamber 4 is formed. At corners on the rear side of the washer body 2, pillars 6 vertically extending over the upper section 2A and the lower section 2B are disposed, and a back panel 5 is disposed between the pillars 6 and 6.

The upper section 2A of the washer body 2 is provided with a box-type door 7 for opening and closing the washing chamber 3. This door 7 is guided by a pair of the stainless-steel pillars 6 and 6 in a vertically movable manner, and is moved up and down with a handle 8A horizontally extending on the front side. To both ends of this handle 8A, a pair of right and left pivoting arms 8B and 8B are fixed. The respective pivoting arms 8B and 8B are disposed along side surfaces 7A of the door 7 in an inclined manner. Because the door 7 needs to be vertically moved in response to pivoting motion of the handle 8A, to each of respective pivoting arms 8B and 8B, one end of a link portion 8C disposed along the corresponding side surface 7A of the door 7 is coupled in a manner capable of pivoting, and the other end of the link portion 8C is coupled to the door 7 via an axle pin 8D. To four corners of the bottom of the washer body 2, legs 9 are attached, which enable the dishwasher 1 to be stably installed.

As depicted in FIG. 2, in the washing chamber 3, a rack rail (not depicted) is detachably disposed. On this rack rail, a grid-like dish rack 11 on which dishes P such as plates and/or bowls after eating and drinking are arranged is mounted. At an upper part of the washing chamber 3, the upper washing nozzle 12A including three radially extending arms and the upper rinsing nozzle 13A including two arms are each rotatably disposed. In the same manner, at a lower part of the washing chamber 3, the lower washing nozzle 12B including three radially extending arms and the lower rinsing nozzle 13B including two arms are each rotatably disposed. Onto the dishes P arranged on the dish rack 11, wash water is sprayed from above and below by the upper and lower washing nozzles 12A and 12B, and rinse water is sprayed from above and below by the rinsing nozzles 13A and 13B.

At a bottom 3A of the washing chamber 3 thus configured, a first filter 14 is detachably disposed. Below this first filter 14, i.e., above the machine chamber 4, a wash-water tank (wastewater storage section) 15 configured to store wash water is formed. In this wash-water tank 15, a wash-water heater 16 configured to heat wash water to enhance washing performance and sterilization performance and a wash-water temperature sensor 17 configured to detect the temperature of the wash water are disposed.

At the bottom 15A of the wash-water tank 15, a second filter 18 including a finer mesh than that of the first filter 14 is detachably disposed. Below this second filter 18, a recessed portion 19 is formed in such a manner that part of the bottom 15A is recessed. At a bottom 19A of the recessed portion 19, a drain hole 19B is formed, to which a wastewater heat recovery device 450 is connected.

The wash-water tank 15 is provided with a vertically extending overflow tube 21. The upper end of the overflow tube 21 is positioned at the upper peripheral of the wash-water tank 15, and the lower end thereof is fitted into the drain hole 19B formed at the bottom 19A of the recessed portion 19. Excessive wash water flows into the overflow tube 21 from an incurrent hole formed at the upper end thereof, and is drained outside via the wastewater heat recovery device 450. Thus, the water level of wash water in the wash-water tank 15 is always kept at a specified level.

The overflow tube 21 can be detached from the wash-water tank 15. When a user pulls up the overflow tube 21, the drain hole 19B into which the overflow tube 21 was inserted is exposed from the bottom 19A of the recessed portion 19. From this drain hole 19B, the wash water in the wash-water tank 15 can be completely drained.

To the recessed portion 19 of the wash-water tank 15, a wash pump 23 is connected via a wash-water suction tube 22. To a discharge port of the wash pump 23, a wash-water discharge tube 24 is connected. The wash-water discharge tube 24 branches into a first wash-water discharge tube 25 and a second wash-water discharge tube 26. The first wash-water discharge tube 25 is connected to the upper washing nozzle 12A, and the second wash-water discharge tube 26 is connected to the lower washing nozzle 12B.

In the machine chamber 4, a hot-water storage tank (supply-water storage section) 28 is disposed, to which supply water W2 as rinse water is supplied from outside through a water supply pipe 27A, the wastewater heat recovery device 450, and a water supply pipe 27B. In this hot-water storage tank 28, a rinse-water heater 29 configured to heat rinse water to enhance sterilization performance, a rinse-water temperature sensor 31 configured to detect the temperature of the rinse water, and a water level sensor 32 configured to detect water level are disposed. A solenoid valve 27C provided on the water supply pipe 27B opens and closes a valve in accordance with the water level detected by the water level sensor 32 to keep the water level in the hot-water storage tank 28 constant. In the hot-water storage tank 28, an overflow tube (not depicted) for draining excessive rinse water outside to keep the water level at the specified level may be provided.

To the hot-water storage tank 28, a rinse pump 34 is connected via a rinse-water suction tube 33. To a discharge port of the rinse pump 34, a rinsing-water discharge tube 36 is connected. The rinsing-water discharge tube 36 branches into a first rinsing-water discharge tube 37 and a second rinsing-water discharge tube 38. The first rinsing-water discharge tube 37 is connected to the upper rinsing nozzle 13A, and the second rinsing-water discharge tube 38 is connected to the lower rinsing nozzle 13B.

Figure 3:
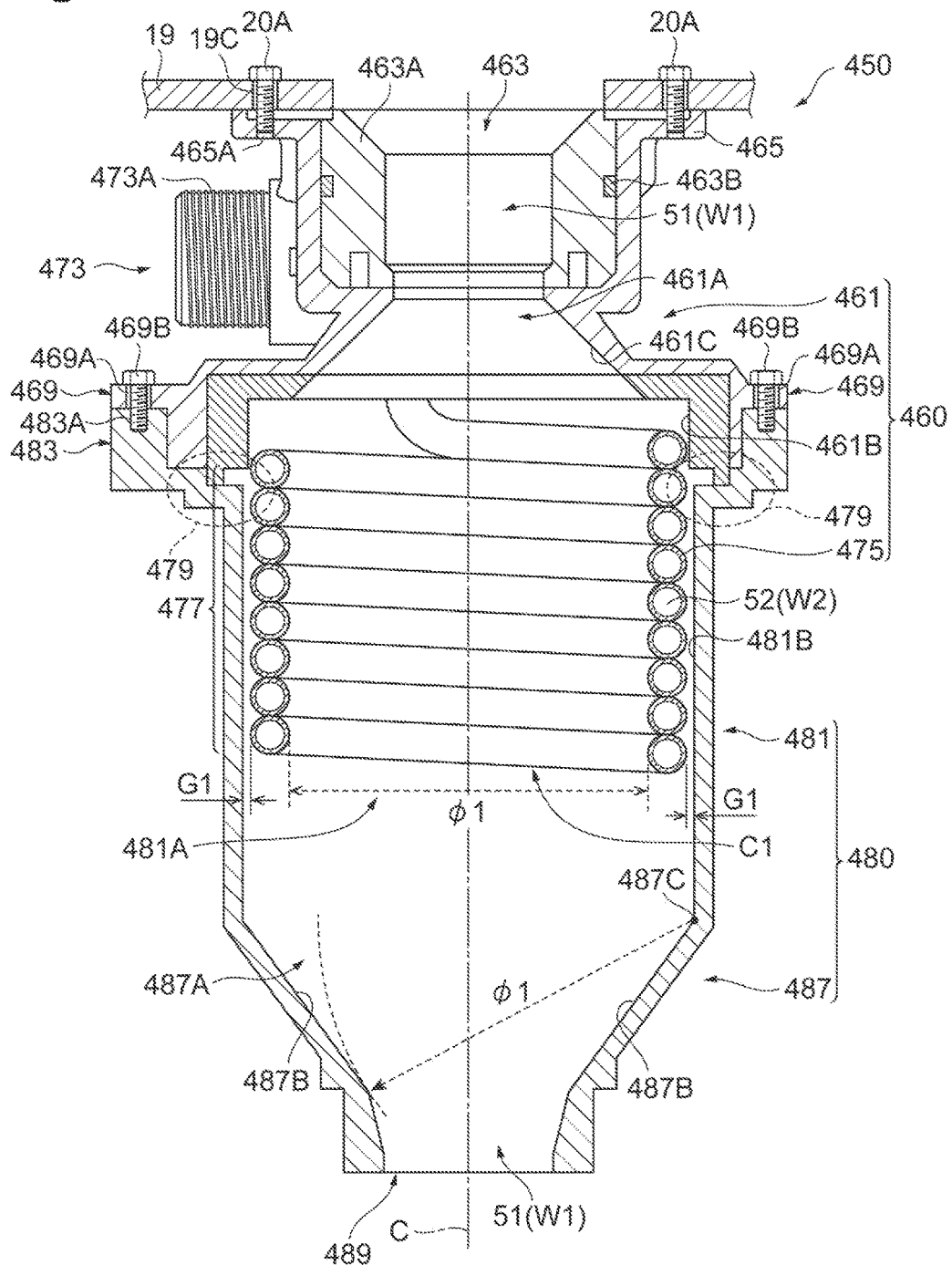
FIG. 3 is a sectional view illustrating the wastewater heat recovery device according to the first embodiment.

As depicted in FIG. 3, in the machine chamber 4, the wastewater heat recovery device 450 is disposed that has: a drain channel 51 through which wastewater W1 drained from the wash-water tank 15 flows; and a water supply channel 52 through which the supply water W2 supplied to the hot-water storage tank 28 flows, and that exchanges heat between the wastewater W1 flowing in the drain channel 51 and the supply water W2 flowing in the water supply channel 52.

The following describes the wastewater heat recovery device 450 in detail. As depicted in FIG. 3, the wastewater heat recovery device 450 mainly includes two members of a first member 460 (see FIG. 4) and a second member 480 (see FIG. 5). The first member 460 and the second member 480 are structured to be detachable from each other. The structure allowing the first member 460 and the second member 480 to be detached from each other will be described later in detail.

Figure 4:
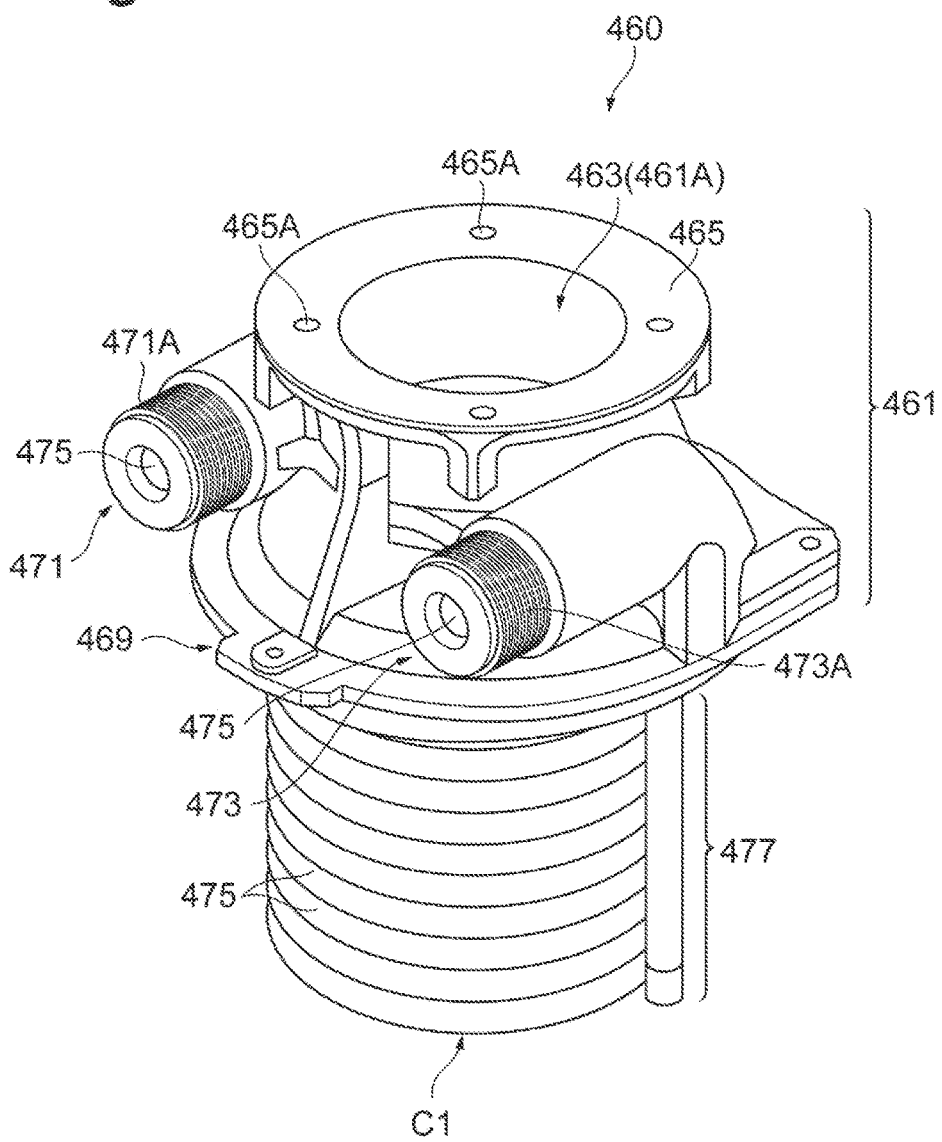
FIG. 4 is a perspective view illustrating a first member in FIG. 3.

As depicted in FIG. 3 and FIG. 4, the first member 460 includes a body portion 461 and a water supply tube 475. The body portion 461 is a tubular member in which a supply-water inlet portion 471 serving as an inlet for the supply water W2 and a supply-water outlet portion 473 serving as an outlet for the supply water W2 are formed, and also in which a hollow portion 461A extending from a wastewater inlet portion 463 serving as an inlet for the wastewater W1 and serving as the drain channel 51 is formed along a direction of a tube axis C.

The water supply tube 475 is a tube serving as the water supply channel 52, one end of which is connected to the supply-water inlet portion 471, and the other end of which is connected to the supply-water outlet portion 473. The water supply tube 475 as a whole includes a heat exchanging portion (part of the water supply tube protruding from the body portion) 477 protruding downward from the first member 460 along the tube axis C direction, and spirally wound so as to surround a space C1 around the tube axis centered on the tube axis C. Explanation will be made along the flow of the supply water W2 as follows. The water supply tube 475 extends from the supply-water inlet portion 471 toward the lower end of the body portion 461. From the vicinity of this lower end, the water supply tube 475 forms a heat exchanging portion 477 provided so as to be wound around the space C1 around the tube axis of the first member 460 to extend gradually downward in the tube axis C direction. The water supply tube 475 then extends again toward the upper end of the body portion 461, and is connected to the supply-water outlet portion 473.

The water supply tube 475 is formed integrally with the body portion 461 when the body portion 461 is injection molded. In other words, the water supply tube 475 is an insert part for injection molding of the body portion 461. The water supply tube 475 is a stainless-steel tube (SUS tube), for example. The supply-water inlet portion 471 and the supply-water outlet portion 473 in the body portion 461 have screw threads 471A and 473A that are formed integrally in the injection molding, respectively. To the supply-water inlet portion 471, the water supply pipe 27A through which the supply water W2 is supplied from an external water supply source is connected by being screwed onto the screw thread 471A of the supply-water inlet portion 471. To the supply-water outlet portion 473, the water supply pipe 27B through which the supply water W2 is supplied to the hot-water storage tank 28 is connected by being screwed onto the screw thread 473A of the supply-water outlet portion 473.

Figure 5:
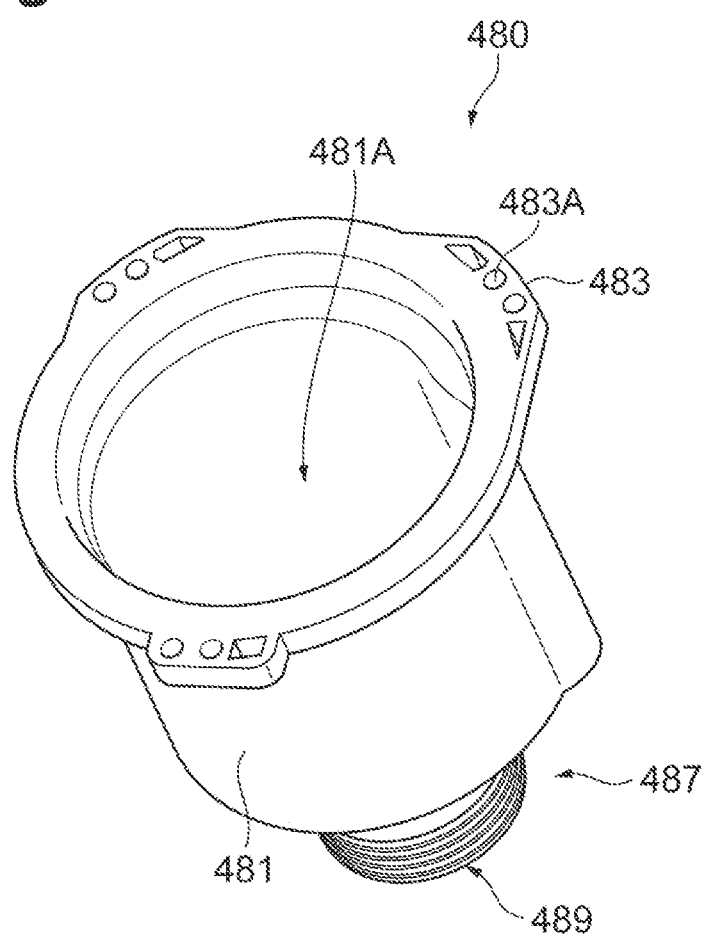
FIG. 5 is a perspective view illustrating a second member in FIG. 3.

As depicted in FIG. 3 and FIG. 5, the second member 480 has: an accommodating portion 481A into which the heat exchanging portion 477 protruding from the body portion 461 downward in the tube axis C direction is inserted (accommodated) and that serves as a channel for the wastewater W1; and a wastewater outlet portion 489 serving as an outlet for the wastewater W1. The accommodating portion 481A is formed along the tube axis C direction. The second member 480 is detachably mounted on the lower side of the body portion 461 in the tube axis C direction (one direction side).

The following describes the first member 460 of the wastewater heat recovery device 450 in further detail. As depicted in FIG. 3 and FIG. 4, on the body portion 461 of the first member 460, a wastewater inlet portion 463, an attachment portion 465, and a mounting portion 469 are further formed. The wastewater inlet portion 463 is a space formed on the upstream side of the body portion 461 in the draining direction, and formed so that a drain-channel forming portion 463A having a hollow portion serving as a drain channel can be fitted into the space. Into the wastewater inlet portion 463, the drain-channel forming portion 463A with a gasket 463B disposed on part of the outer peripheral surface thereof is fitted, whereby a portion serving as an inlet for the wastewater W1 is formed.

The attachment portion 465 is a portion for fixing the wastewater heat recovery device 450 on the recessed portion 19 of the wash-water tank 15 (see FIG. 2). Specifically, screws 20A that are inserted into through holes 19C formed in the recessed portion 19 of the wash-water tank 15 from the washing chamber 3 side are fastened into screw holes 465A of the attachment portion 465 of the body portion 461, whereby the wastewater heat recovery device 450 is fixed to the recessed portion 19 of the wash-water tank 15.

The mounting portion 469 is a portion for fixing the first member 460 to the second member 480. Specifically, screws 469B that are inserted into through holes 469A formed in the mounting portion 469 from the first member 460 side are fastened into screw holes 483A of the mounting portion 483 of the second member 480, whereby the first member 460 and the second member 480 are fixed to each other.

The following describes the second member 480 of the wastewater heat recovery device 450 in further detail. As depicted in FIG. 3 and FIG. 5, on the second member 480, the mounting portion 483, a body portion 481, and a tapered portion 487 are formed.

The mounting portion 483 is a portion for fixing the second member 480 to the first member 460. Specifically, screws 469B that are inserted into through holes 469A of the mounting portion 469 of the first member 460 from the first member 460 side are fastened into screw holes 483A formed on the mounting portion 483 of the second member 480, whereby the first member 460 and the second member 480 are fixed to each other.

A joint portion 479 between an inner peripheral surface 461B forming the hollow portion 461A of the body portion 461 of the first member 460 and an inner peripheral surface 481B forming the accommodating portion 481A of the second member 480 is provided at a position that faces the heat exchanging portion 477 in the radial direction of the tube axis C.

The body portion 481 is a portion into which the heat exchanging portion 477 of the first member 460 is inserted. The inner peripheral surface 481B of the body portion 481 is formed so as to face the outer peripheral surface of the water supply tube 475 with a predetermined distance of a gap G1 interposed therebetween when the first member 460 is fixed to the second member 480. This gap G1 may be set as close to zero as possible, or may be set to a distance that can obtain a water stream such that garbage such as food scraps is forced to flow by the wastewater W1 flowing in from the first member 460.

The tapered portion 487 is formed on the downstream side of body portion 481 in a direction in which the wastewater W1 flows. In the end portion of the tapered portion 487, the wastewater outlet portion 489 is formed. To the wastewater outlet portion 489, a drain tube (not depicted) through which the wastewater W1 from the dishwasher 1 can be drained is connected.

As depicted in FIG. 2, in the machine chamber 4, a detergent tank 39 configured to store detergent to be mixed into wash water in the wash-water tank 15 is disposed. To the detergent tank 39, a detergent supply pump 42 is connected via a detergent suction tube 41. To a discharge port of the detergent supply pump 42, one end of the detergent discharge tube 43 is connected. The other end 43A of the detergent discharge tube 43 is positioned in the washing chamber 3 and is open downward.

The machine chamber 4 accommodates, for example, an electrical box 71 in which a microcomputer (hereinafter referred to as "MICON") 70 configured to control overall operation of the dishwasher 1 is incorporated.

The following describes operation of the dishwasher 1. When a power switch of the dishwasher 1 is turned on, hot water in the hot-water storage tank 28 is sprayed into the washing chamber 3 by the rinse pump 34, whereby the hot water is supplied into the wash-water tank 15. In this manner, hot water is initially supplied. Detergent in an amount suitable for the amount of the initially supplied hot water is then supplied into the wash-water tank 15, and the detergent concentration in wash water in the wash-water tank 15 reaches a predetermined concentration.

After the initial supply of hot water, when the user has placed dishes P on the rack and has closed the door 7, a door switch (not depicted) detects that the door has been closed, and an operation start signal is input to the MICON 70. When the operation start signal has been input to the MICON 70, washing of dishes is started. The washing of dishes is performed by spraying the wash water in the wash-water tank 15 toward the dishes P in the washing chamber 3.

The wash pump 23 is started, whereby the wash water stored in the wash-water tank 15 is pumped to the upper and lower washing nozzles 12A and 12B through the wash-water discharge tube 24, for example, and is sprayed from the respective washing nozzles 12A and 12B toward the dishes P in the washing chamber 3. At this time, the respective nozzles 12A and 12B continue to rotate due to reaction force against the spraying force, and thus the wash water is distributed uniformly onto the dishes P, whereby stains on the dishes P can be efficiently washed away.

The wash water sprayed into the washing chamber 3 is collected in the wash-water tank 15 while food scraps, for example, washed away from the dishes P are removed by the first filter 14. Furthermore, after small food scraps are removed by the second filter 18, the wash water is circulated and supplied into the washing chamber 3 again by the wash pump 23.

Subsequently, the rinse pump 34 is started, whereby the rinse water stored in the hot-water storage tank 28 is pumped to the upper and lower rinsing nozzles 13A and 13B through the rinsing-water discharge tube 36, for example, and is sprayed from the respective rinse nozzles 13A and 13B toward the dishes P. At this time, also the respective rinse nozzles 13A and 13B continue to rotate due to reaction force against the spraying force, and thus the rinse water is distributed uniformly onto the dishes P, whereby the dishes P are efficiently rinsed.

The rinse water sprayed onto the dishes P is collected in the wash-water tank 15 through the first filter 14 and is mixed with wash water, and is used as wash water in the next washing step. When the rinse water has been sprayed into the washing chamber 3 and collected in the wash-water tank 15, excessive wash water exceeding the specified water level is drained from the overflow tube 21, and is drained outside through the wastewater heat recovery device 450. The temperature of the wastewater W1 drained from the overflow tube 21 is about 60° C.

While the wastewater W1 drained from the overflow tube 21 flows in the space C1 formed inside the water supply tube 475 that is spirally disposed in the wastewater heat recovery device 450, when the supply water W2 that is colder than the wastewater W1 flows in the water supply tube 475, the wastewater W1 and the supply water W2 exchange heat with each other. The temperature of the supply water W2 supplied from the external water supply source is 10° C. to 25° C. Thus, between the wastewater W1 at about 60° C. and the supply water W2 at 10° C. to 25° C., heat is exchanged. Consequently, the supply water W2 flowing in from the supply-water inlet portion 471 of the water supply tube 475 flows out from the supply-water outlet portion 473 thereof at a water temperature higher than that when flowing in. Because the solenoid valve 27C is provided on the water supply pipe 27B, depending on the open/closed state of the solenoid valve 27C, the supply water W2 may be retained in the tubular member 60. In this case, the supply water W2 retained in the tubular member 60 and the wastewater W1 exchange heat with each other.

The following describes functional effects of the dishwasher 1 of the first embodiment. In the dishwasher 1 of the first embodiment, because the drain channel 51 is directly connected to the drain hole 19B of the wash-water tank 15, heat can be exchanged between the wastewater W1 that has just been drained from the wash-water tank 15 and the supply water W2. In the dishwasher 1 thus configured, the wastewater heat recovery device 450 is disposed in the machine chamber 4, which eliminates the need of creating space for the wastewater heat recovery device 450 to be separately provided outside the machine chamber 4. This enables efficient heat exchange, and can prevent a decrease in flexibility in installation of the dishwasher 1.

In the dishwasher 1 of the first embodiment, the wastewater heat recovery device 450 is disposed in a limited space of the machine chamber, which contributes to downsizing. Consequently, the number of components is reduced, whereby cost can be reduced. As depicted in FIG. 2, because the wastewater heat recovery device 450 is directly attached to the bottom 19A of the recessed portion 19 of the wash-water tank 15, heat from the recessed portion 19 can be transferred to the wastewater heat recovery device 450, whereby efficiency of wastewater heat recovery can be increased.

In the dishwasher 1 of the first embodiment, as depicted in FIG. 1, because the machine chamber 4 is covered by the stainless panel, the temperature of the machine chamber 4 is higher than the temperature outside the washer body 2. This enables the efficiency of wastewater heat recovery to be increased. In the dishwasher 1 of the first embodiment, the machine chamber 4 is covered by the stainless panel, and thus is less susceptible to kitchen environment than the case that the wastewater heat recovery device is disposed outside the washer body 2. Thus, performance of wastewater heat recovery can be stabilized.

Patent Literature 3 (Japanese Utility Model Registration No. 3106414) discloses a wastewater heat recovery device configured to exchange heat between supply water supplied for washing and rinsing dishes and other tableware in a washing chamber and wastewater drained from the washing chamber during the washing and rinsing. However, in the wastewater heat recovery device configured as described in Patent Literature 3, because the water supply tube is exposed to the outside atmosphere, heat is exchanged also between the supply water heat of which has been already exchanged and the outside atmosphere, and thus efficiency of heat exchange between the wastewater and the supply water deteriorates.

In the wastewater heat recovery device 450 of the first embodiment, because the water supply tube 475 serving as the water supply channel 52 is completely inserted into the accommodating portion 481A of the second member 480 forming the drain channel 51, heat that has been exchanged by heat exchange can be prevented from being radiated outside the wastewater heat recovery device 450. This enables efficient heat exchange.

Patent Literature 4 (Japanese Utility Model Registration No. 3132813) discloses a washer including a wastewater heat recovery device configured to exchange heat between supply water supplied for washing and rinsing dishes and other tableware in a washing chamber and wastewater drained from the washing chamber during the washing and rinsing. In the wastewater heat recovery device of Patent Literature 4, heated wastewater is sprayed and is brought into contact with a water supply tube in which the supply water flows, whereby the supply water flowing in the water supply tube and the wastewater exchange heat with each other. However, in the wastewater heat recovery device configured as described in Patent Literature 4, in order to inspect and clean the inside of the wastewater heat recovery device that is already incorporated into the washer, it is necessary to detach the wastewater heat recovery device from the washer body first, and then to disassemble the wastewater heat recovery device into components, which results in poor maintainability.

In the wastewater heat recovery device 450 of the first embodiment, even after the wastewater heat recovery device 450 is incorporated into the dishwasher 1, by detaching the second member 480 from the first member 460 attached to the dishwasher 1, the inside of the wastewater heat recovery device 450 can be easily inspected and cleaned. Consequently, the wastewater heat recovery device 450 can be provided that enables efficient heat exchange and is excellent in maintainability. Alternatively, the second member 480 may be detached from the first member 460 after detaching the first member 460 from the dishwasher 1 to inspect and clean the inside of the wastewater heat recovery device 450. In this case also, disassembly and assembly of the wastewater heat recovery device 450 are easy, resulting in excellent maintainability.

Figure 6:
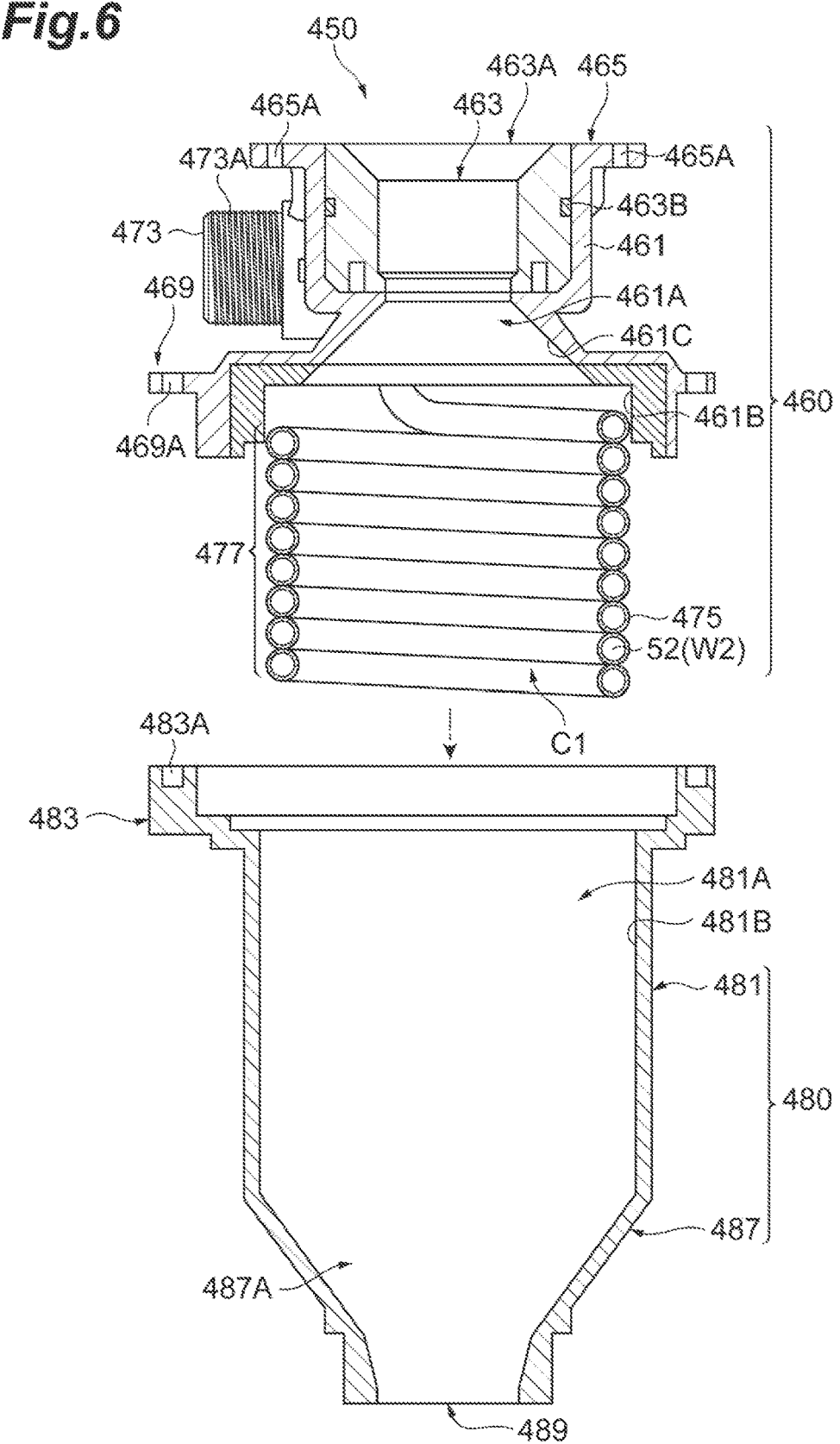
FIG. 6 is an exploded view of the wastewater heat recovery device according to the first embodiment

As depicted in FIG. 6, the wastewater heat recovery device 450 of the first embodiment is structured mainly with two components of the first member 460 and the second member 480. Accordingly, by handling the first member 460 as a kind of a lid, and fitting the first member 460 into the second member 480 having a container-like shape to cover the top of the second member 480 therewith, or covering the top with fastening members, the wastewater heat recovery device 450 can be easily assembled. Due to the reduced number of components, component cost can be reduced. Because the number of components is small, assembly time can be shortened, and productivity can be improved. Due to the reduced number of components, the number of locations requiring a sealing process decreases, and thus reliability of water leak prevention can be improved.

In the wastewater heat recovery device 450 of the first embodiment, as depicted in FIG. 3, when viewed from the space C1 around the tube axis through which the wastewater W1 flows, the joint portion 479 between the first member 460 and the second member 480 is positioned behind the water supply tube 475. Thus, the wastewater W1 flowing in from the body portion 461 will not come into hard contact with the joint portion 479. In the wastewater heat recovery device 450 of the first embodiment, the wastewater W1 can be prevented from reaching the joint portion 479. Consequently, the wastewater W1 can be prevented from leaking from the joint portion 479.

In the wastewater heat recovery device 450 of the first embodiment, connection for providing the water supply tube 475 serving as the water supply channel 52 in the body portion 461 of the first member 460 does not need screws, for example. Thus, occurrence of leakage of the wastewater W1 and the supply water W2 at portions connected by screws or other means can be reduced. It is also possible to save time and labor for sealing the connected portions, for example, to reduce the occurrence of leakage of the wastewater W1 and the supply water W2.

In the wastewater beat recovery device 450 of the first embodiment, it is possible to reduce the number of components for connecting the supply-water inlet portion 471 and the supply-water outlet portion 473 to the water supply pipes 27A and 27B, respectively. This enables the number of components in the entire wastewater heat recovery device 450 to be reduced.

In the wastewater heat recovery device 450 of the first embodiment, as depicted in FIG. 3, the upper end (upstream side in the draining direction) of the spirally disposed water supply tube 475 is disposed adjacently to the inclined surface 461C of the first member 460. The water supply tubes 475 that are adjacent to each other along the draining direction are disposed so as to be in contact with each other, so that there is substantially no gap between the respective water supply tubes 475. Thus, most of the wastewater W1 flowing in from the body portion 461 flows through the space C1 around the tube axis formed inside the water supply tube 475. In other words, the drain channel 51 is formed in the space C1 around the tube axis formed inside the water supply tube 475. The wastewater W1 hardly flows through the gap G1 formed between the water supply tube 475 and the inner peripheral surface 481B of the second member 480. Consequently, garbage does not flow into the gap G1, or does not clog the gap G1.

Because the water supply tube 475 serving as the water supply channel 52 is a circular tube, the area that is in contact with the drain channel 51 formed in the space C1 around the tube axis inside the water supply tube 475 is relatively large. This enables efficient heat exchange between the wastewater W1 and the supply water W2.

In the wastewater heat recovery device 450 of the first embodiment, because the water supply tube 475 serving as the water supply channel 52 is disposed spirally, space for obtaining required heat exchanging performance can be reduced.

The first embodiment has been described in the foregoing, but the present invention is not limited to the first embodiment, and various modifications can be made without departing from the gist of the invention.

In the wastewater heat recovery device 450 according to the first embodiment, an example has been described in which the first member 460 is structured as a tubular member in which the hollow portion 461A serving as the drain channel 51 is formed along the tube axis C direction, but the present invention is not limited to this. For example, the first member may be a plate-like member in which a wastewater inlet portion through which wastewater flows in is formed, and on the upper surface of the plate-like member, a supply-water inlet portion and a supply-water outlet portion may be provided. A water supply tube connected to the supply-water inlet portion and the supply-water outlet portion may be disposed so that part between one end thereof and the other end thereof protrudes in one direction from the lower surface of the body portion.

In the wastewater heat recovery device 450 according to the first embodiment, an example has been described in which the second member 480 is structured as a tubular member in which the hollow accommodating portion 481A formed along the tube axis C direction is formed, but the present invention is not limited to this. For example, the second member may be structured as a member having a tubular shape with a bottom, at a bottom portion of which a wastewater outlet portion is formed.

Even in each of the above-described wastewater heat recovery devices according to the modifications of the first embodiment, when the first member is mounted on the second member, the accommodating portion of the second member can accommodate the heat exchanging portion. In the wastewater heat recovery device thus structured also, even after the wastewater heat recovery device is incorporated into the dishwasher, by detaching the second member from the first member attached to the dishwasher, the inside of the wastewater heat recovery device can be easily inspected and cleaned.

In the wastewater heat recovery device 450 according to the first embodiment, an example has been described in which the water supply tube 475 as a whole includes the heat exchanging portion 477 protruding downward from the first member 460 along the tube axis C direction, and spirally wound so as to surround the space C1 around the tube axis centered on the tube axis C, but the present invention is not limited to this. For example, the water supply tube as a whole only needs to protrude downward from the first member along the tube axis C direction (one direction), and does not have to include a spirally wound portion. For example, instead of the heat exchanging portion 477 of the first embodiment, the water supply tube may extend from the supply-water inlet portion toward the lower end of the body portion, and turn around at a certain position to extend toward the upper end up to the supply-water outlet portion. Alternatively, the water supply tube may include a meandering portion so as to be routed back and forth repeatedly within a certain range in the tube axis C direction.

In the wastewater heat recovery device 450 according to the first embodiment, an example has been described in which the first member 460 and the second member 480 are fixed to each other with the screws 469B, but the present invention is not limited to this. For example, a locking mechanism may be provided in which one of the first member 460 and the second member 480 is provided with a fitting portion, the other thereof is provided with a fitted portion, and these members are fitted to each other and then are rotated to be fixed to each other.

In the wastewater heat recovery device 450 according to the first embodiment, an example has been described in which the water supply tube 475 is a circular tube whose cross section orthogonal to the channel direction is circular. However, the present invention is not limited to this. For example, the wastewater heat recovery device 450 may include a water supply tube that is a rectangular tube whose cross section orthogonal to the channel direction is rectangular. In the wastewater heat recovery device thus configured, the inner peripheral surface of the drain channel 51 is straight, and thus garbage such as food scraps contained in the wastewater W1 can be prevented from being accumulated.

The tapered portion 487 in the second member 480 of the first embodiment has the inclined surface 487B that causes the inner diameter of the hollow portion 487A to gradually decrease toward the direction in which the wastewater W1 flows. The portion at which the inner diameter of the hollow portion 487A starts to decrease is defined as a connection portion 487C. Herein, when the inner diameter of the space 481A that is formed inside the spirally disposed water supply tube 475 is defined as a "basic dimension φ1", in a cross section (FIG. 3) passing through the tube axis C along the direction in which the wastewater W1 flows, the inclined surface 487B may be formed so that the distance between the inclined surface 487B and one point on the connection portion 487C that is opposed to the inclined surface 487B across the tube axis C is larger than the basic dimension φ1. In other words, the inclined surface 487B may be formed so as not to come in contact with a stick-like member having a length of the basic dimension φ1 when the stick-like member is pivoted, about a pivot axis that is one point on the connection portion 487C that is opposed to the inclined surface 487B across the tube axis C, along the plane direction of the cross section passing through the tube axis C along the direction in which the wastewater W1 flows. Specifically, as depicted in FIG. 3, the inclined surface 487B may be formed so as not to come in contact with a circle of radius φ1 that is drawn centered on one point on the connection portion 487C.

In the wastewater heat recovery device 450 thus configured according to the first embodiment, even if there is a portion having the hollow portion 487A the inner diameter of which gradually decreases toward the direction in which the wastewater W1 flows, the stick-like member (e.g., toothpick) can be prevented from being caught firmly in the radial direction at this portion. Even if a stick-like member is caught in the radial direction, the stick-like member can be forced to flow downstream together with water and/or another stick-like member that falls afterwards. Consequently, clogging with the stick-like member can be prevented. Results of experiments conducted to explain the above-described effects will be described in the fifth embodiment.

In the present invention, the first embodiment and the modifications of the first embodiment may be appropriately combined.

Second Embodiment

Figure 7:
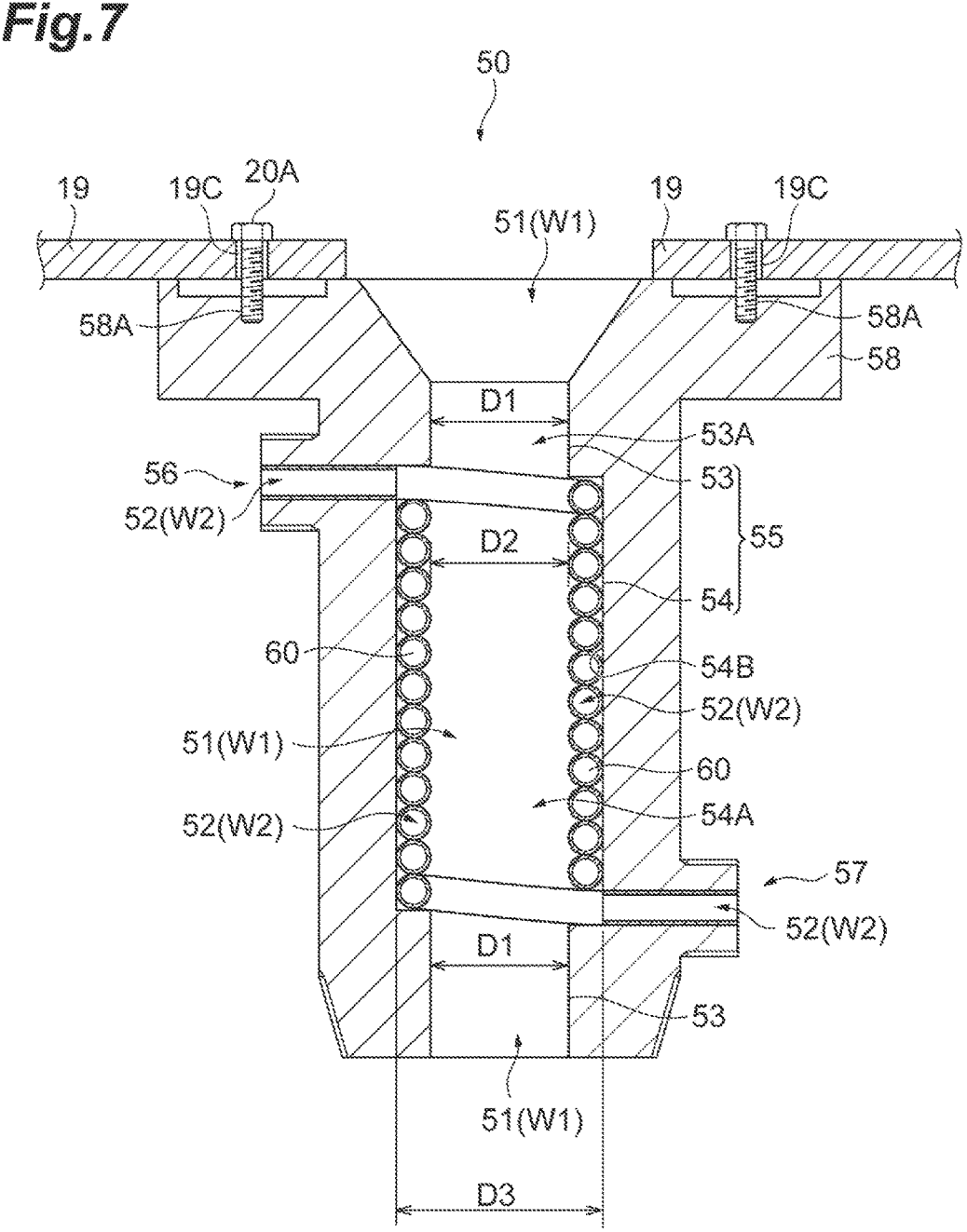
FIG. 7 is a sectional view of a wastewater heat recovery device according to a second embodiment.
Figure 8:
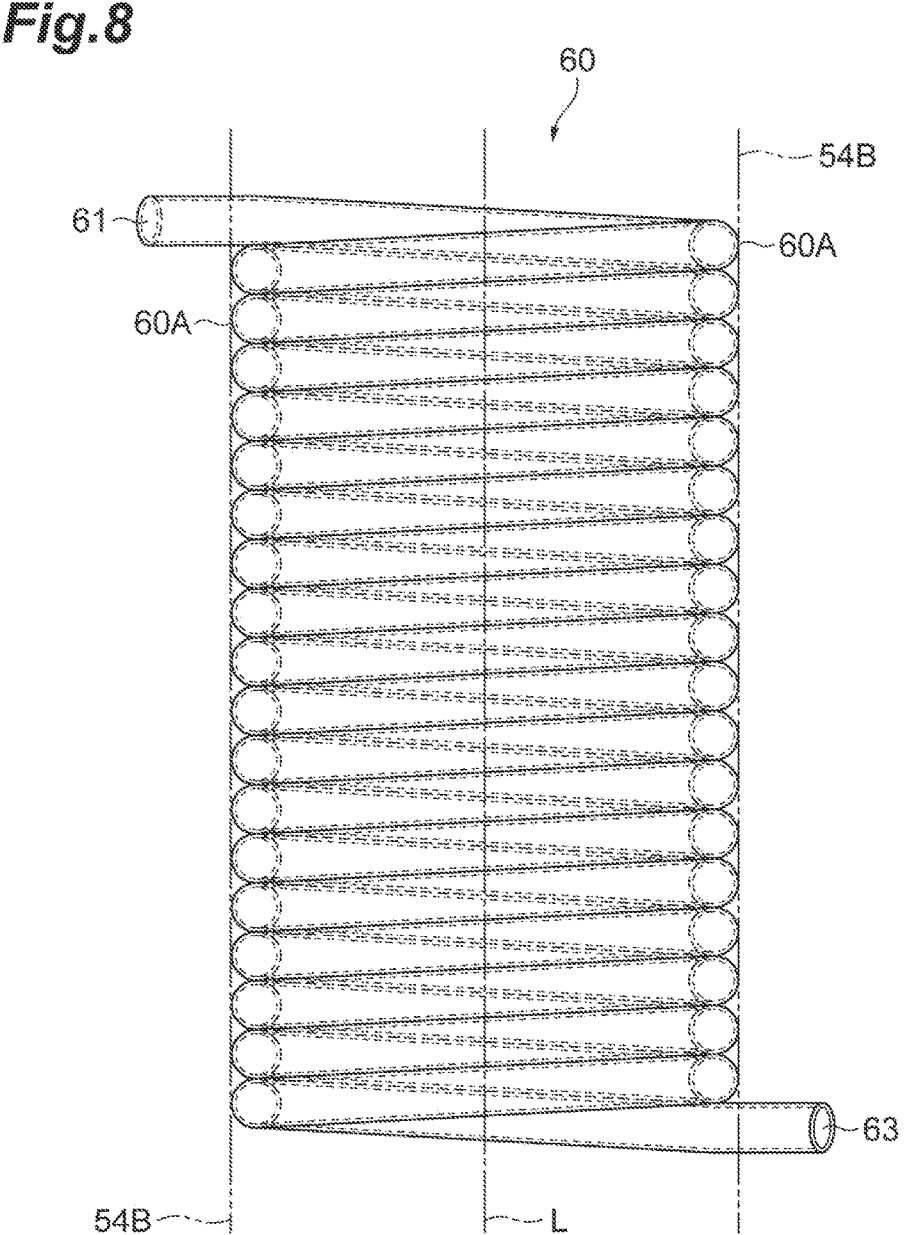
FIG. 8 is a front view of a tubular member depicted in FIG. 7.

The following describes a wastewater heat recovery device 50 according to the second embodiment mainly with reference to FIG. 7 and FIG. 8. A dishwasher to be equipped with the wastewater heat recovery device 50 is the same as the dishwasher 1 of the first embodiment, and detailed description is omitted herein. As depicted in FIG. 7, the wastewater heat recovery device 50 includes connection tubular portions 53, a body tubular portion 54, an inflow portion 56, an outflow portion 57, a fixing portion 58, and a tubular member 60. The connection tubular portions 53 are portions in which hollow portions 53A serve as the drain channel 51. The connection tubular portions 53 are connected to both ends of the body tubular portion 54 in the axial direction.

To both ends of the body tubular portion 54 in the axial direction, the connection tubular portions 53 are connected. The tubular member 60 serving as the water supply channel 52 is spirally disposed in a manner facing and being in contact with the inner peripheral surface 54B of the body tubular portion 54. A space 54A formed inside the spiral tubular member 60 serves as the drain channel 51. In the wastewater heat recovery device 50 of the second embodiment, the connection tubular portions 53 and the body tubular portion 54 are integrally formed as a body portion 55. Furthermore, into the body portion 55, the tubular member 60 serving as the water supply channel 52 is insert molded.

The inner diameter D3 of the body tubular portion 54 is formed so that the inner diameter D2 of the space 54A inside the spirally disposed tubular member 60 (i.e., the inner diameter of the drain channel 51 formed in the space 54A) is substantially identical to the inner diameter D1 of the connection tubular portions 53. The inflow portion 56 is a space formed through which the supply water W2 is caused to flow into the wastewater heat recovery device 50 and at which one end portion 61 of the tubular member 60 depicted in FIG. 8 is disposed. The outflow portion 57 is a space formed through which the supply water W2 is caused to flow out from the wastewater heat recovery device 50 and at which the other end portion 63 of the tubular member 60 depicted in FIG. 8 is disposed.

The fixing portion 58 is a portion for fixing the wastewater heat recovery device 50 to the recessed portion 19 of the wash-water tank 15. Specifically, screws 20A that are inserted into the through holes 19C formed in the recessed portion 19 of the wash-water tank 15 from the washing chamber 3 side are fastened into screw holes 58A of the fixing portion 58, whereby the wastewater heat recovery device 50 is fixed to the recessed portion 19 of the wash-water tank 15.

The drain channel 51 and the water supply channel 52 are in contact with each other with a thick wall part of the tubular member 60 interposed therebetween. By using, for example, a metallic tube excellent in thermal conductivity as the tubular member 60, heat can be efficiently exchanged between the wastewater W1 flowing in the drain channel 51 and the supply water W2 flowing in the water supply channel 52. Specifically, heat can be efficiently exchanged between the wastewater W1 drained from the wash-water tank 15 and the supply water W2 that is colder than the wastewater W1. By using as the body portion 55 a resin member having relatively low thermal conductivity, heat of the wastewater W1 can be prevented from being radiated outside the body portion 55, i.e., outside the wastewater heat recovery device 50, which enables more efficient heat exchange.

As depicted in FIG. 8, the tubular member 60 is a circular tube whose cross section orthogonal to the channel direction is circular. As depicted in FIG. 7 and FIG. 8, the tubular member 60 is spirally disposed in such a manner that the outer peripheral surface 60A of the tubular member 60 faces and is in contact with the inner peripheral surface 54B of the body tubular portion 54. In other words, the tubular member 60 is provided so as to be wound around an axis L of the body portion 55 to extend gradually in the axis L direction. In the tubular member 60, the one end portion 61 through which the supply water W2 supplied from outside through the water supply pipe 27A is caused to flow in and the other end portion 63 through which the supply water W2 flowing in from the one end portion 61 is fed out toward the hot-water storage tank 28 are formed. The supply water W2 flowing out from the other end portion 63 is fed to the hot-water storage tank 28 through the water supply pipe 27B.

In the dishwasher 1 including the wastewater heat recovery device 50 thus configured, with respect to configurations that are the same as those of the wastewater heat recovery device 450, the functional effects that the dishwasher 1 including the wastewater heat recovery device 450 can enjoy can be exerted.

In the dishwasher 1 including the wastewater heat recovery device 50, as depicted in FIG. 7, a portion out of the entire drain channel 51 in which heat is exchanged with the water supply channel 52, i.e., the drain channel 51 formed in the space 54A inside the water supply channel 52 that is spirally disposed on the inner peripheral surface 54B of the body tubular portion 54 is formed so that the inner diameter D2 thereof is substantially identical to the inner diameter D1 of the drain channels 51 formed in the hollow portions 53A of the connection tubular portions 53 that are connected to this drain channel 51. Accordingly, the drain channel 51 formed in the space 54A inside the spirally disposed water supply channel 52 and the drain channels 51 formed in the hollow portions 53A of the connection tubular portions 53 and connected to this drain channel 51 in series along the draining direction are smoothly connected without level difference.

In other words, as depicted in FIG. 7, the tubular member 60 serving as the water supply channel 52 is disposed in a position (the body tubular portion 54) that is recessed in the radial direction when viewed from the axis L of the body portion 55, whereby the drain channels 51 formed in positions (the connection tubular portions 53) that are not recessed in the radial direction when viewed from the axis L of the body portion 55 and the drain channel 51 formed in the space 54A inside the water supply channel 52 spirally disposed on the inner peripheral surface 54B of the body tubular portion 54 are formed as a straight channel.

Thus, garbage such as food scraps contained in the wastewater W1 can be prevented from being accumulated in the drain channel 51 portion that is formed in the space 54A inside the spirally disposed water supply channel 52. Because the water supply channel 52 is completely contained in the body tubular portion 54 forming the drain channel 51, heat that has been obtained by heat exchange can be prevented from being radiated outside the wastewater heat recovery device 50. Consequently, maintainability is excellent, and heat can be efficiently exchanged between the supply water W2 and the wastewater W1.

In the wastewater heat recovery device 50 of the second embodiment, because the tubular member 60 serving as the water supply channel 52 is insert molded in the body portion 55, there is no portions connected by screws or other means. Thus, problems such as leakage of the wastewater W1 and the supply water W2, for example, that is more likely to occur at portions connected by screws or other means can be reduced. Furthermore, time required for assembling the wastewater heat recovery device 50 can be shortened, and thus manufacturing cost can be reduced.

Because the tubular member 60 serving as the water supply channel 52 is a circular tube, the area that is in contact with the drain channel 51 formed in the space 54A inside the tubular member 60 is relatively large. This enables efficient heat exchange between the wastewater W1 and the supply water W2.

In the wastewater heat recovery device 50 of the second embodiment, because the tubular member 60 serving as the water supply channel 52 is spirally disposed, space for obtaining required heat exchanging performance can be reduced.

Third Embodiment

Figure 9:
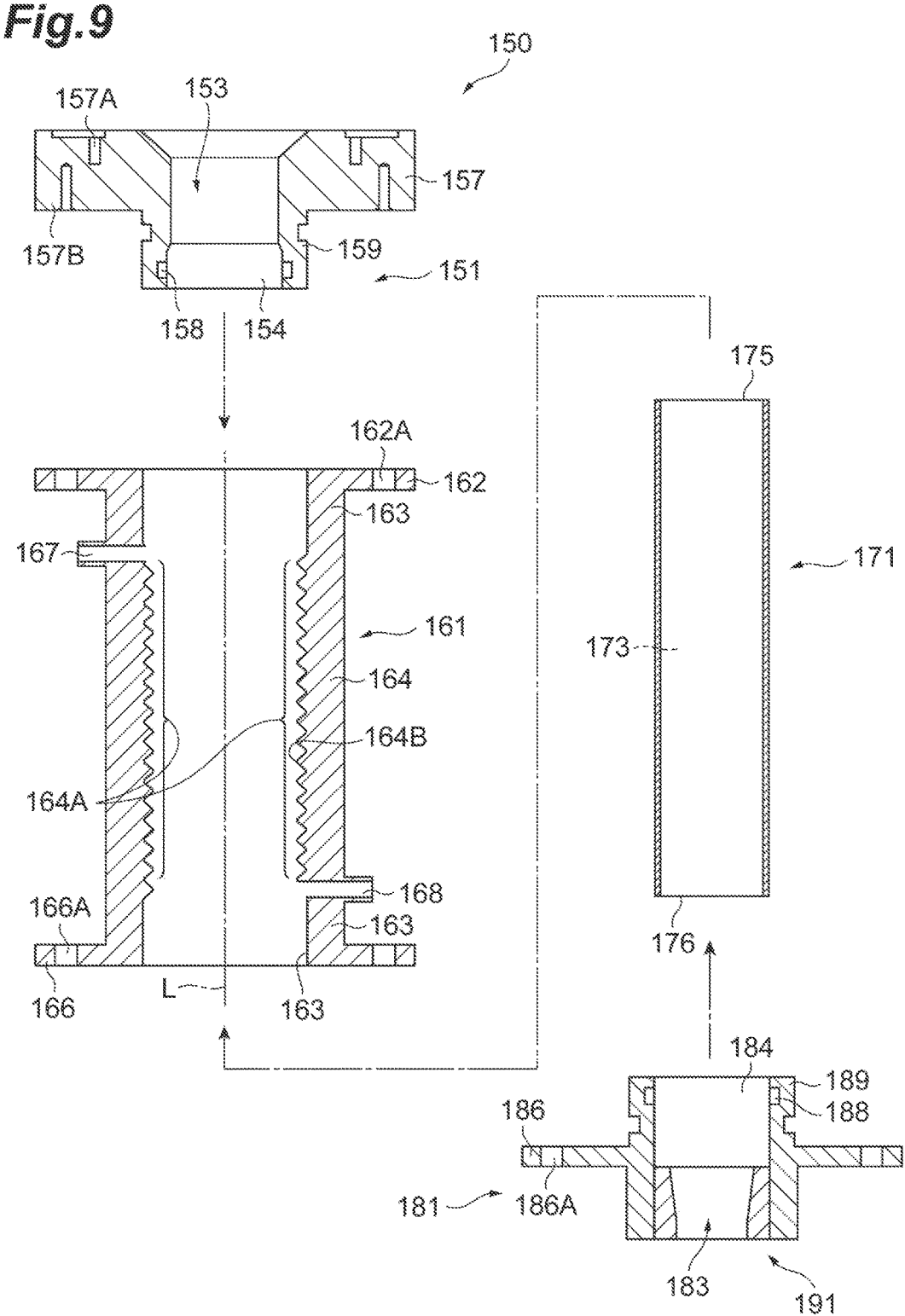
FIG. 9 is a sectional view illustrating respective members included in a wastewater heat recovery device according to a third embodiment.
Figure 10:
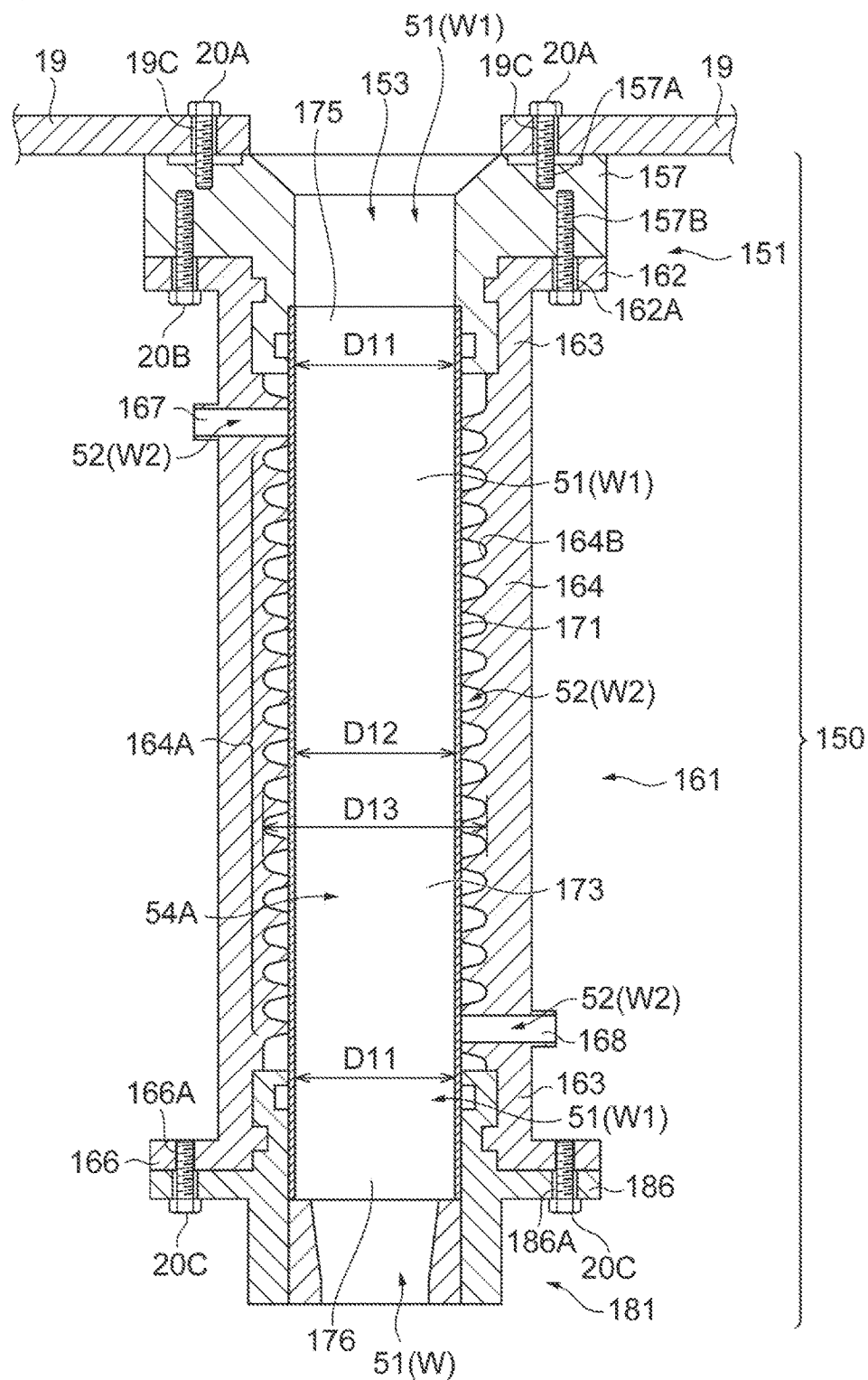
FIG. 10 is a sectional view illustrating the wastewater heat recovery device according to the third embodiment.

The following describes a wastewater heat recovery device 150 according to the third embodiment mainly with reference to FIG. 9 and FIG. 10. A dishwasher to be equipped with the wastewater heat recovery device 150 is the same as the dishwasher 1 of the third embodiment, and detailed description is omitted herein. As depicted in FIG. 9 and FIG. 10, the wastewater heat recovery device 150 includes a first connection member 151, a body member 161, a straight tube (inserted tubular portion) 171, and a second connection member 181.

As depicted in FIG. 9 and FIG. 10, the first connection member 151 has a hollow portion 153 and a connection portion 157. The hollow portion 153 serves as part of the drain channel 51 in the wastewater heat recovery device 150. The connection portion 157 is provided for fixation to the recessed portion 19 (see FIG. 2) of the wash-water tank 15 and to the body member 161. The connection portion 157 has first screw holes 157A and second screw holes 157B. On the lower side of the hollow portion 153 (side connected to the body member 161), a fitted portion 154 is provided into which the straight tube 171 is fitted. On the outer peripheral surface of the fitted portion 154, a gasket 158 is provided.

The body member 161 includes a connection portion 162, a connection tubular portion 163, a body tubular portion 164, an inflow portion 167, and an outflow portion 168. The connection portion 162 is provided for fixation to the first connection member 151, and has through holes 162A. The connection tubular portion 163 is provided to an upper end portion of the body member 161, and has an inner diameter that is substantially the same as the outer diameter of a lower end portion 159 of the first connection member 151 inserted into the connection tubular portion 163. This allows the body member 161 to be connected to the first connection member 151. The connection tubular portion 163 is also provided to a lower end portion of the body member 161, and has an inner diameter that is substantially the same as the outer diameter of an upper end portion 189 of the second connection member 181 inserted into the connection tubular portion 163. This allows the body member 161 to be connected to the second connection member 181.

The body tubular portion 164 is formed between the connection tubular portion 163 in the upper end portion of the body member 161 and the connection tubular portion 163 in the lower end portion thereof. On the inner peripheral surface 164B of the body tubular portion 164, a spiral groove 164A is formed. The spiral groove 164A is a continuous spiral groove provided so as to be wound around the axis L of the body member 161 to extend gradually in the axis L direction. The inflow portion 167 is provided through which the supply water W2 is caused to flow into the wastewater heat recovery device 150. The outflow portion 168 is provided through which the supply water W2 is caused to flow out from the wastewater heat recovery device 150.

The straight tube 171 is a tubular member formed so that the upper end portion 175 thereof can be fitted into the fitted portion 154 to allow the lower end portion 176 thereof to fit into a fitted portion 184. The straight tube 171 is formed of metallic material having relatively high thermal conductivity. The hollow portion 173 of the straight tube 171 serves as part of the drain channel 51 in the wastewater heat recovery device 150.

The second connection member 181 has a hollow portion 183 and a connection portion 186. The hollow portion 183 forms part of the drain channel 51 in the wastewater heat recovery device 150. The connection portion 186 is provided for fixation to the body member 161. The connection portion 186 has through holes 186A. On the upper side of the hollow portion 183 (side connected to the body member 161), the fitted portion 184 is provided into which the straight tube 171 is fitted. On the inner peripheral surface of the fitted portion 184, a gasket 188 is provided.

In the wastewater heat recovery device 150 including the first connection member 151, the body member 161, the straight tube 171, and the second connection member 181 as described above, as depicted in FIG. 10, the first connection member 151 is fixed to the recessed portion 19 of the wash-water tank 15. Specifically, the screws 20A that are inserted into the through holes 19C formed in the recessed portion 19 of the wash-water tank 15 from the washing chamber 3 side are fastened into the first screw holes 152A of the first connection member 151, whereby the first connection member 151 is fixed to the recessed portion 19 of the wash-water tank 15.

Subsequently, the body member 161 into which the straight tube 171 is inserted is fixed to the first connection member 151 while the straight tube 171 is inserted into the fitted portion 154 of the first connection member 151. Screws 20B inserted into the through holes 162A formed in the body member 161 from the machine chamber 4 side are fastened into the second screw holes 152B of the first connection member 151, whereby the first connection member 151 and the body member 161 are connected.

Subsequently, the fitted portion 184 of the second connection member 181 is fitted into the body member 161 into which the straight tube 171 is inserted, whereby the second connection member 181 is fixed to the body member 161. Screws 20C inserted into the through holes 186A formed in the second connection member 181 from outside of the machine chamber 4 are fastened into screw holes 166A of the body member 161, whereby the second connection member 181 and the body member 161 are connected.

Consequently, the hollow portion 153 of the first connection member 151, the hollow portion 173 of the straight tube 171, and the hollow portion 183 of the second connection member 181 serve as the drain channel 51. The inflow portion 167, the outflow portion 168, and space formed between the outer peripheral surface of the straight tube 171 and the spiral groove 164A formed on the inner peripheral surface 164B of the body tubular portion 164 serve as the spiral water supply channel 52. Specifically, the water supply channel 52 is disposed in a manner facing and being in contact with the inner peripheral surface 164B of the body tubular portion 164.

In the dishwasher 1 including the wastewater heat recovery device 150 thus configured, with respect to configurations that are the same as those of the wastewater heat recovery device 450, the functional effects that the dishwasher 1 including the wastewater heat recovery device 450 can enjoy can be exerted.

In the dishwasher 1 including the wastewater heat recovery device 150, as depicted in FIG. 10, a portion out of the entire drain channel 51 in which heat is exchanged with the water supply channel 52, i.e., the drain channel 51 formed by the hollow portion 173 of the straight tube 171 inserted into in the space 54A inside the water supply channel 52 that is spirally disposed on the inner peripheral surface 54B of the body tubular portion 54 is formed so that the inner diameter D12 thereof is substantially identical to the inner diameter D11 of the drain channel 51 formed in the hollow portion 153 of the first connection member 151 connected to this drain channel 51. Accordingly, the drain channel 51 formed by the hollow portion 173 of the straight tube 171 inserted into the space 54A inside the spirally formed water supply channel 52, and the drain channel 51 formed in the hollow portion 153 of the first connection member 151 connected upstream to this drain channel 51 along the draining direction and the drain channel 51 formed in the hollow portion 183 of the second connection member 181 connected downstream thereto are smoothly connected without level difference.

Thus, garbage such as food scraps contained in the wastewater W1 can be prevented from being accumulated in the drain channel 51 portion that is formed by the hollow portion 173 of the straight tube 171 inserted into the space 54A inside the spirally disposed water supply channel 52. Because the water supply channel 52 is completely contained in the body member 161, heat that has been obtained by heat exchange can be prevented from being radiated outside the wastewater heat recovery device 150. Consequently, maintainability is excellent, and heat can be efficiently exchanged between the supply water W2 and the wastewater W1.

Fourth Embodiment

Figure 11:
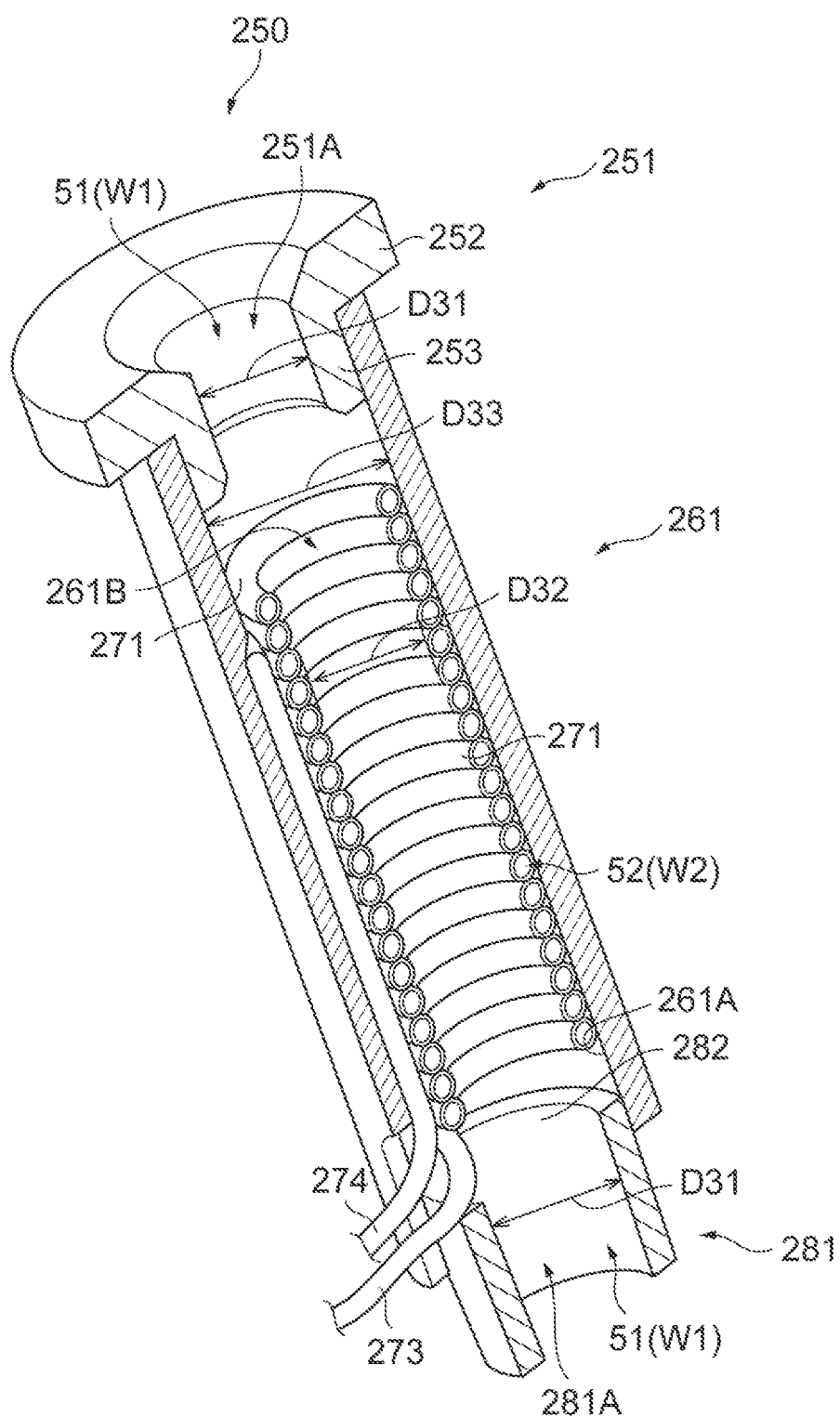
FIG. 11 is a perspective sectional view illustrating respective members included in a wastewater heat recovery device according to a fourth embodiment.
Figure 12:
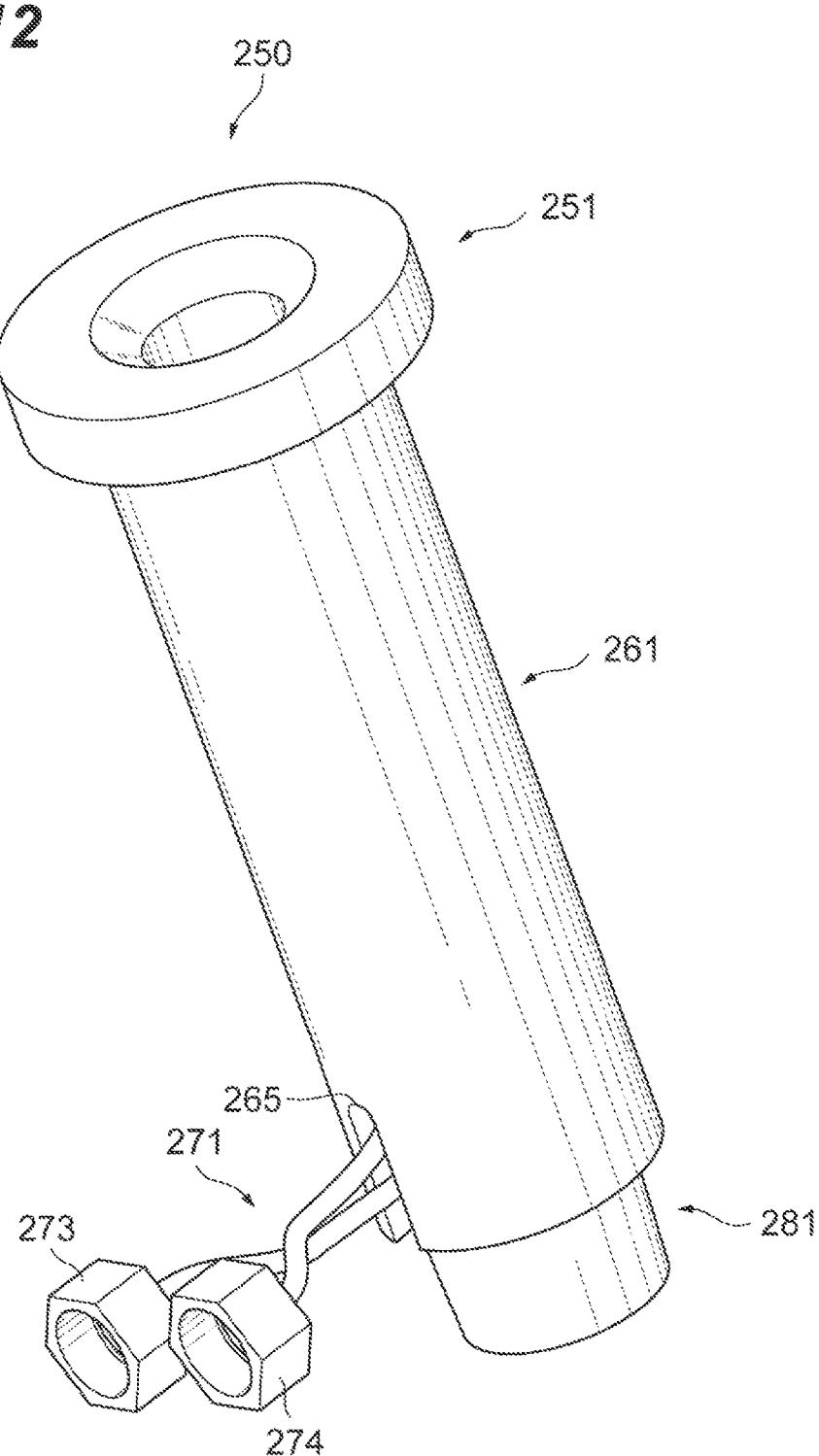
FIG. 12 is a perspective view illustrating the wastewater heat recovery device according to the fourth embodiment.

The following describes a wastewater heat recovery device 250 according to the fourth embodiment mainly with reference to FIG. 11 and FIG. 12. A dishwasher to be equipped with the wastewater heat recovery device 250 is the same as the dishwasher 1 of the first embodiment, and detailed description is omitted herein. As depicted in FIG. 11 and FIG. 12, the wastewater heat recovery device 250 includes a first connection member (connection tubular portion) 251, a body member (body tubular portion) 261, a tubular member 271, and a second connection member (connection tubular portion) 281.

The first connection member 251 is a portion in which a hollow portion 251A serves as the drain channel 51. The first connection member 251 is connected to the upper end of the body member 261 in the axial direction. The body member 261 is a portion in which the tubular member 271 serving as the water supply channel 52 is spirally disposed in a manner facing and being in contact with an inner peripheral surface 261A, and a space 261B formed inside the spiral tubular member 271 serves as the drain channel 51. A fixing portion 252 is a portion for fixing the wastewater heat recovery device 250 to the recessed portion 19 of the wash-water tank 15. Specifically, the screw 20A that are inserted into the through holes 19C formed in the recessed portion 19 of the wash-water tank 15 from the washing chamber 3 side are fastened into screw holes (not depicted) of the fixing portion 252, whereby the wastewater heat recovery device 250 is fixed to the recessed portion 19 of the wash-water tank 15.

The inner diameter D33 of the body member 261 is formed so that the inner diameter (i.e., the inner diameter of the drain channel 51 formed in the space 261B) D32 of the space 261B inside the spirally disposed tubular member 271 is substantially identical to the inner diameter D31 of the first connection member 251. As depicted in FIG. 12, a notch 265 is provided through which the supply water W2 is caused to flow into or flow out from the wastewater heat recovery device 250. Specifically, through the notch 265, one end portion 273 of the tubular member 271 and the other end portion 274 thereof are inserted into the body member 261.

As depicted in FIG. 11, the second connection member 281 is a portion in which a hollow portion 281A serves as the drain channel 51. The second connection member 281 is connected to the lower end of the body member 261 in the axial direction. On the downstream side of the second connection member 281, a tubular member (not depicted) is connected, through which the wastewater W1 is drained outside the wastewater heat recovery device 250.

The drain channel 51 and the water supply channel 52 are in contact with each other with a thick wall part of the tubular member 271 interposed therebetween. By using, for example, a metallic tube excellent in thermal conductivity as the tubular member 271, heat can be efficiently exchanged between the wastewater W1 flowing in the drain channel 51 and the supply water W2 flowing in the water supply channel 52. By using as the body member 261 a resin member having relatively low thermal conductivity, heat of the wastewater W1 can be prevented from being radiated outside the wastewater heat recovery device 250, which enables more efficient heat exchange.

The tubular member 271 is a circular tube whose cross section orthogonal to the channel direction is circular. The tubular member 271 is spirally disposed in such a manner that the outer peripheral surface 271A of the tubular member 271 faces and is in contact with the inner peripheral surface 261A of the body member 261. In the tubular member 271, the one end portion 273 through which the supply water W2 supplied from the outside through the water supply pipe 27A (see FIG. 2) is caused to flow in and the other end portion 274 through which the supply water W2 flowing in from the one end portion 273 is fed out toward the hot-water storage tank 28 (see FIG. 2) are formed. The supply water W2 flowing out from the other end portion 274 is fed to the hot-water storage tank 28 through the water supply pipe 27B (see FIG. 2).

In the dishwasher 1 including the wastewater heat recovery device 250 thus configured, with respect to configurations that are the same as those of the wastewater heat recovery device 450, the functional effects that the dishwasher 1 including the wastewater heat recovery device 450 can enjoy can be exerted.

In the dishwasher 1 including the wastewater heat recovery device 250, as depicted in FIG. 11, a portion out of the entire drain channel 51 in which heat is exchanged with the water supply channel 52, i.e., drain channel 51 formed in the space 261B inside the tubular member 271 that is spirally disposed on the inner peripheral surface 261A of the body member 261 and serves as the water supply channel 52 is formed so that the inner diameter D32 thereof is substantially identical to the inner diameter D31 of the drain channels 51 that are formed in the respective hollow portions 251A and 281A of the first connection member 251 and the second connection member 281 and are connected to this drain channel 51. Accordingly, the drain channel 51 formed in the space 261B inside the spirally disposed tubular member 271 and the drain channels 51 that are formed in the respective hollow portions 251A and 281A of the first connection member 251 and the second connection member 281 and are connected thereto in series along the draining direction are smoothly connected without level difference. Thus, garbage such as food scraps contained in the wastewater W1 can be prevented from being accumulated in the drain channel 51 portion that is formed in the space 261B inside the spirally disposed tubular member 271.

Because the water supply channel 52 is completely contained in the body member 261 forming the drain channel 51, heat that has been obtained by heat exchange can be prevented from being radiated outside the wastewater heat recovery device 250. Consequently, maintainability is excellent, and heat can be efficiently exchanged between the supply water W2 and the wastewater W1. In the wastewater heat recovery device 250 of the fourth embodiment, because the tubular member 271 serving as the water supply channel 52 is disposed spirally, space for obtaining required heat exchanging performance can be reduced.

Fifth Embodiment

Figure 13:
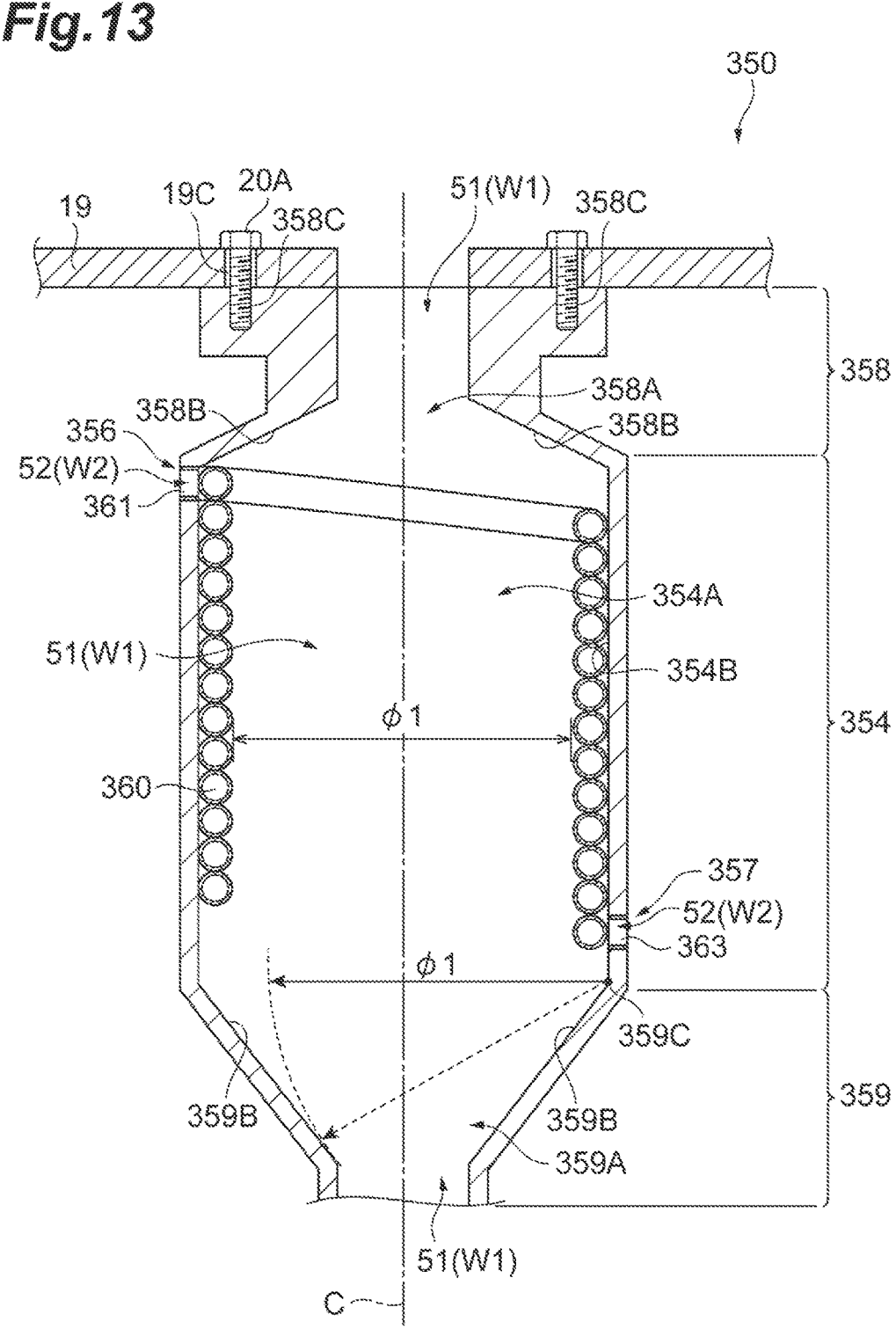
FIG. 13 is a sectional view of a wastewater heat recovery device according to a fifth embodiment.
Figure 14:
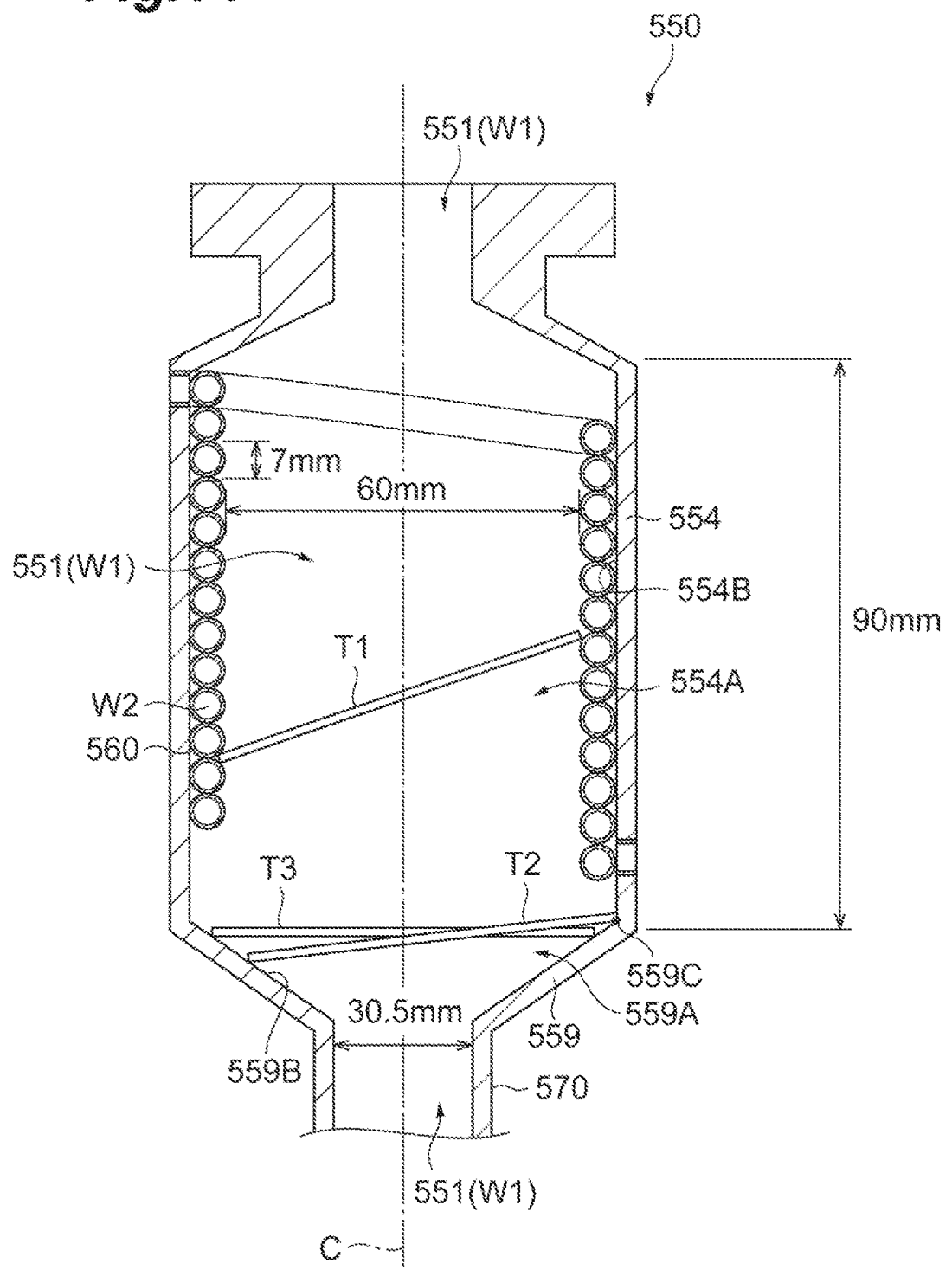
FIG. 14 is a sectional view of a wastewater heat recovery device used in a clogging test.

The following describes a wastewater heat recovery device 350 according to the fifth embodiment mainly with reference to FIG. 13 and FIG. 14. A dishwasher to be equipped with the wastewater heat recovery device 350 is the same as the dishwasher 1 of the first embodiment, and detailed description is omitted herein. As depicted in FIG. 13, the wastewater heat recovery device 350 includes a first tapered portion 358, a body tubular portion 354, a second tapered portion (tapered portion) 359, an inflow portion 356, an outflow portion 357, and a tubular member 360.

The first tapered portion 358 is a portion in which a hollow portion 358A serves as the drain channel 51, and the lower end thereof in the axial direction is connected to the body tubular portion 354 described later. The first tapered portion 358 and the body tubular portion 354 are integrally formed. The first tapered portion 358 has a first inclined surface 358B that causes the inner diameter of the hollow portion 358A to gradually increase toward the direction in which the wastewater W1 flows.

The first tapered portion 358 is provided with a portion for fixing the wastewater heat recovery device 350 to the recessed portion 19 (see FIG. 2) of the wash-water tank 15. Specifically, the screws 20A that are inserted into the through holes 19C formed in the recessed portion 19 of the wash-water tank 15 (see FIG. 2) from the washing chamber 3 (see FIG. 2) side are fastened into screw holes 358C, whereby the wastewater heat recovery device 350 is fixed to the recessed portion 19 of the wash-water tank 15.

To the upper end of the body tubular portion 354 in the axial direction, the first tapered portion 358 is connected, and to the lower end portion thereof, the second tapered portion 359 is connected. The body tubular portion 354 and the second tapered portion 359 are integrally formed. The tubular member 360 serving as the water supply channel 52 is spirally disposed in a manner facing and being in contact with the inner peripheral surface 354B of the body tubular portion 354. In the radial direction of the body tubular portion 354, the space 354A formed inside the spiral tubular member 360 serves as the drain channel 51. In the fifth embodiment, the inner diameter of the space 354A inside the spirally disposed tubular member 360 (in other words, the inner diameter of the drain channel 51 formed in the space 354A) is $\phi 1$. In still other words, the distance between the tubular members 360 that are opposed to each other across the tube axis (central axis) C of the body tubular portion 354 in the radial direction of the body tubular portion 354 is $\phi 1$. In the fifth embodiment, this distance is referred to as "basic dimension $\phi 1$".

The inflow portion 356 is a space formed through which the supply water W2 is caused to flow into the wastewater heat recovery device 350 and at which one end portion 361 of the tubular member 360 is disposed. The outflow portion 357 is a space formed through which the supply water W2 is caused to flow out from the wastewater heat recovery device 350 and at which the other end portion 363 of the tubular member 360 is disposed.

The second tapered portion 359 is a portion in which a hollow portion 359A serves as the drain channel 51. The second tapered portion 359 has an inclined surface 359B that causes the inner diameter of the hollow portion 359A to gradually decrease from a connection portion 359C connected to the body tubular portion 354 toward the direction in which the wastewater W1 flows. The inclined surface 359B is formed so that, in a cross section (FIG. 13) passing through the tube axis C along the direction in which the wastewater W1 flows, the distance between the inclined surface 359B and one point on the connection portion 359C that is opposed to the inclined surface 359B across the tube axis C is larger than the basic dimension $\phi 1$. In other words, the inclined surface 359B is formed so as not to come in contact with a stick-like member having a length of the basic dimension ϕ1 when the stick-like member is pivoted, about a pivot axis that is one point on the connection portion 359C that is opposed to the inclined surface 359B across the tube axis C, along the plane direction of the cross section passing through the tube axis C along the direction in which the wastewater W1 flows. The plane direction of the cross section passing through the tube axis C along the direction in which the wastewater W1 flows means a plane direction of the paper of FIG. 13. Specifically, as depicted in FIG. 13, the inclined surface 359B is formed so as not to come in contact with a circle of radius ϕ1 that is drawn centered on one point on the connection portion 359C.

In the dishwasher 1 including the wastewater heat recovery device 350 thus configured, with respect to configurations that are the same as those of the wastewater heat recovery device 450, the functional effects that the dishwasher 1 including the wastewater heat recovery device 450 can enjoy can be exerted.

In the dishwasher 1 including the wastewater heat recovery device 350, even if there is a portion having the hollow portion 359A the inner diameter of which gradually decreases toward the direction in which the wastewater W1 flows, the stick-like member (e.g., toothpick) can be prevented from being caught firmly in the radial direction at this portion. Even if a stick-like member is caught in the radial direction, the stick-like member can be forced to flow downstream together with water and/or another stick-like member that falls afterwards. Consequently, clogging with the stick-like member can be prevented. For example, if there is a possibility that a toothpick having a length of 65 mm is caught in the space 354A formed inside the tubular member 360 and/or in the second tapered portion 359, the basic dimension ϕ1 only needs to be set equal to or larger than 65 mm. The basic dimension ϕ1 can be appropriately set according to the size of a foreign matter.

In the wastewater heat recovery device 350 having the body tubular portion 354 that is spirally disposed in such a manner that the tubular member 360 through which the supply water W2 flows is in contact with the inner peripheral surface 354B, a portion exists that is not smoother than a drain channel of a wastewater tube that does not include the tubular member 360, and thus clogging with a foreign matter is more likely to occur. The inventors of the present invention repeatedly conducted tests (hereinafter referred to as "clogging tests") described below to find out what tendencies exist when the wastewater heat recovery device thus configured is clogged with a foreign matter.

To begin with, as depicted in FIG. 14, a wastewater heat recovery device 550 was prepared in which a second connection tubular portion 559 having a hollow portion 559A the inner diameter of which gradually decreases is connected to the downstream end of a body tubular portion 554 having an inner peripheral surface 554B on which a spiral tubular member 560 is disposed. Dimensions of the respective portions are as follows.

Outer diameter of the tubular member 560: 7 mm

Inner diameter of a space 554A formed inside the tubular member 560 (in other words, the inner diameter of a drain channel 551 formed in the space 554A) (in still other words, distance between the tubular members 560 that are opposed to each other across the tube axis C of the body tubular portion 554 in the radial direction of the body tubular portion 554): 60 mm Axial length of the body tubular portion 554: 90 mm Inner diameter of a drain pipe 570 connected to the wastewater heat recovery device 550: 30.5 mm Length of the drain pipe: 126 mm Subsequently, thrown objects to be used for the clogging tests, i.e., thrown objects including 10 toothpicks, 10 disposable wooden chopsticks, 5 chopstick envelopes, 2 grams of shredded sponge, and 2 grams of shredded metal scrubber were prepared.

Subsequently, the wastewater heat recovery device 550 depicted in FIG. 14 was connected to the wash-water tank 15 as depicted in FIG. 2. The above-described thrown objects were then thrown into the wash-water tank 15 filled with wash water, and the overflow tube 21 was pulled out to drain the wash water from the wash-water tank 15. At this time, clogging of the thrown objects in the wastewater heat recovery device 550 and in the drain pipe 570 connected to the downstream side of the wastewater heat recovery device 550 was checked. The clogging tests were conducted 10 times, and results given below in Table 1 and Table 2 were each obtained. Table 1 indicates test results in the wastewater heat recovery device 550, and Table 2 indicates test results in the drain pipe 570. In Table 1 and Table 2, "NO" indicates that no clogging was found, "numerals" indicates the number of cloggings, and "Found" indicates that clogging was found.

TABLE 1

| | Number of Tests | | | | | | | | | |
|---|---|---|---|---|---|---|---|---|---|---|
| | 1 | 2 | 3 | 4 | 5 | 6 | 7 | 8 | 9 | 10 |
| Toothpick | NO | 1 | NO | NO | 1 | NO | NO | NO | NO | NO |
| Chopstick | NO | NO | NO | NO | NO | NO | NO | NO | NO | NO |
| Chopstick Envelope | NO | NO | NO | NO | NO | NO | NO | NO | NO | NO |
| Shredded Sponge | NO | NO | NO | NO | NO | NO | NO | NO | NO | NO |
| Metal Scrubber | NO | NO | NO | NO | NO | NO | NO | NO | NO | NO |

TABLE 2

| | Number of Tests | | | | | | | | | |
|---|---|---|---|---|---|---|---|---|---|---|
| | 1 | 2 | 3 | 4 | 5 | 6 | 7 | 8 | 9 | 10 |
| Toothpick | NO | NO | NO | NO | NO | NO | NO | NO | NO | NO |
| Chopstick | NO | NO | NO | NO | NO | 1 | NO | 1 | NO | NO |

TABLE 2-continued

| | Number of Tests | | | | | | | | | |
|---|---|---|---|---|---|---|---|---|---|---|
| | 1 | 2 | 3 | 4 | 5 | 6 | 7 | 8 | 9 | 10 |
| Chopstick Envelope | NO | NO | NO | NO | NO | NO | NO | NO | NO | NO |
| Shredded Sponge | NO | NO | NO | NO | NO | NO | NO | NO | NO | NO |
| Metal Scrubber | NO | NO | NO | NO | NO | Found | NO | NO | NO | NO |

The inventors of the present invention found from the test results given in Table 1 and Table 2 that clogging with a foreign matter in the wastewater heat recovery device 550 occurred more frequently with toothpicks in particular. It was found that, when clogging with a toothpick occurred, there were three patterns as follows. (1) Both ends of a toothpick were caught at the tubular member (the toothpick T1 depicted in FIG. 14). (2) One end of a toothpick was in contact with a gap between the tubular member and the second connection tubular portion (or the drain pipe), and the other end thereof was in contact with the second inclined surface of the second connection tubular portion (the toothpick T2 depicted in FIG. 14). (3) Both ends of a toothpick lay on the second connection tubular portion (second inclined surface) (the toothpick T3 depicted in FIG. 14).

Further investigation found that the toothpick was caught less firmly in the state of (3) than in the states of (1) and (2). In other words, it was found that the toothpick caught in the state of (3) was more likely to be forced to flow downstream together with water and/or another foreign matter that falls afterwards. Thus, it was found that configuration enabling clogging in the states of (1) and (2) can effectively solve clogging with foreign matters in the wastewater heat recovery device 550.

The inventors of the present invention focused on the length of the toothpick, and found that, in order to prevent the occurrence of the state of (1), the inner diameter of the space 554A inside the tubular member 560 needs to be equal to or larger than the length of the toothpick. This configuration can prevent clogging with a toothpick in the wastewater heat recovery device 550 with both ends of the toothpick being caught.

The inventors of the present invention also found that, in order to prevent the occurrence of the state of (2), the distance between one point 559C on the inner peripheral surface of the tubular member 560 at its lower end and the second inclined surface 559B of the second connection tubular portion 559 that is opposed to the point 559C across the tube axis C needs to be equal to or larger than the length of the toothpick. This configuration can prevent clogging with a toothpick in the wastewater heat recovery device 550 with one end of the toothpick being in contact with the gap between the body tubular portion 554 and the second connection tubular portion 559 (or the drain pipe 570) and with the other end thereof being in contact with the second inclined surface 559B of the second connection tubular portion 559.

Based on the results of these intensive investigations, the inventors of the present invention prototyped the wastewater heat recovery device 350 according to the fifth embodiment as depicted in FIG. 13. At this time, the basic dimension ϕ1 was set to be 65 mm that is a length of a common toothpick. With this prototyped device, the same clogging tests as described above were conducted. Table 3 below indicates results of the clogging tests. In Table 3, "NO" indicates that no clogging was found and "numerals" indicates the number of cloggings.

TABLE 3

| | Number of Tests | | | | | | | | | |
|---|---|---|---|---|---|---|---|---|---|---|
| | 1 | 2 | 3 | 4 | 5 | 6 | 7 | 8 | 9 | 10 |
| Clogging | NO | NO | NO | 1 | NO | NO | NO | NO | NO | NO |

In the fourth test of these clogging tests, clogging occurred. However, this clogging was clogging due to the state of (3) described above, and it was confirmed that the toothpick was forced to flow downward in the subsequent test. Based on the above-described test results, it was confirmed that configuration of the wastewater heat recovery device 350 according to the fifth embodiment can prevent clogging with a foreign matter in the second tapered portion 359.

Sixth Embodiment

Figure 15:
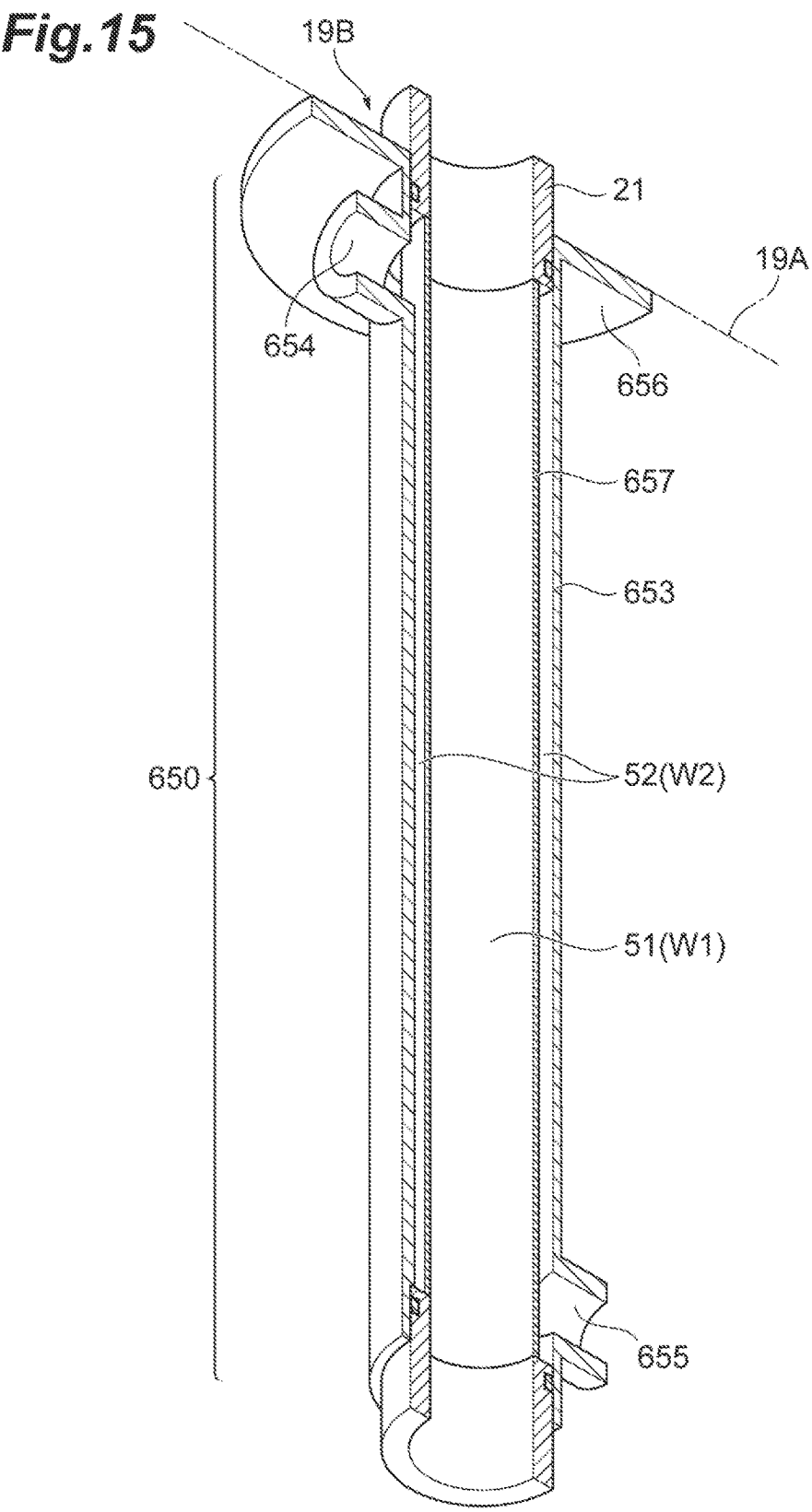
FIG. 15 is a perspective view of a wastewater heat recovery device according to a sixth embodiment that is cut along the axial direction.

The following describes a wastewater heat recovery device 650 according to the sixth embodiment mainly with reference to FIG. 15. A dishwasher to be equipped with the wastewater heat recovery device 650 is the same as the dishwasher 1 of the first embodiment, and detailed description is omitted herein.

In the machine chamber 4, the wastewater heat recovery device 650 having the drain channel 51 through which the wastewater W1 drained from the wash-water tank 15 flows and the water supply channel 52 through which the supply water W2 supplied to the hot-water storage tank 28 flows, and configured to exchange heat between the wastewater W1 flowing in the drain channel 51 and the supply water W2 flowing in the water supply channel 52 is disposed.

The wastewater heat recovery device 650 includes an inner tube 657 and an outer tube 653 formed so that the inner tube 657 can be inserted thereinto. The outer tube 653 with the inner tube 657 being inserted thereinto is connected to the drain hole 19B of the recessed portion 19. Specifically, a fixing portion 656 formed on the outer tube 653 is fixed to the bottom 19A of the recessed portion 19 with screws (not depicted), for example. Accordingly, the drain channel 51 through which the wastewater W1 flows is formed in the hollow portion of the inner tube 657, and the water supply channel 52 through which the supply water W2 flows is formed in a space between the inner peripheral surface of the outer tube 653 and the outer peripheral surface of the inner tube 657.

The drain channel 51 and the water supply channel 52 are in contact with each other with the inner tube 657 interposed therebetween. Because a metallic tube, for example, excellent in thermal conductivity is used as the inner tube 657, the wastewater W1 flowing in the drain channel 51 and the supply water W2 flowing in the water supply channel 52 exchange heat with each other. Specifically, the wastewater W1 drained from the wash-water tank 15 and the supply water W2 that is colder than the wastewater W1 exchange heat with each other.

In the outer tube 653, an inflow portion 654 through which the supply water W2 supplied from outside through the water supply pipe 27A is caused to flow in and an outflow portion 655 through which the supply water W2 flowing in from the inflow portion 654 is fed out toward the hot-water storage tank 28 are formed. The supply water W2 flowing out from the outflow portion 655 is fed to the hot-water storage tank 28 through the water supply pipe 27B.

In the wastewater heat recovery device 650 of the sixth embodiment, while the wastewater W1 drained from the overflow tube 21 flows in the hollow portion of the inner tube 657 of the wastewater heat recovery device 650, when the supply water W2 that is colder than the wastewater W1 flows in the space between the inner peripheral surface of the outer tube 653 and the outer peripheral surface of the inner tube 657, the wastewater W1 and the supply water W2 exchange heat with each other Consequently, the supply water W2 flowing in through the inflow portion 654 flows out through the outflow portion 655 at a water temperature higher than that when flowing in. Because the solenoid valve 27C is provided on the water supply pipe 27B, depending on the on/off state of the solenoid valve 27C, the supply water may be retained in the space between the inner peripheral surface of the outer tube 653 and the outer peripheral surface of the inner tube 657. In this case, the wastewater W1 and the supply water W2 exchange heat with each other, the supply water W2 being retained in the space between the inner peripheral surface of the outer tube 653 and the outer peripheral surface of the inner tube 657.

In the dishwasher 1 including the wastewater heat recovery device 650 thus configured, with respect to configurations that are the same as those of the wastewater heat recovery device 450, the functional effects that the dishwasher 1 including the wastewater heat recovery device 450 can enjoy can be exerted.

Seventh Embodiment

Figure 16:
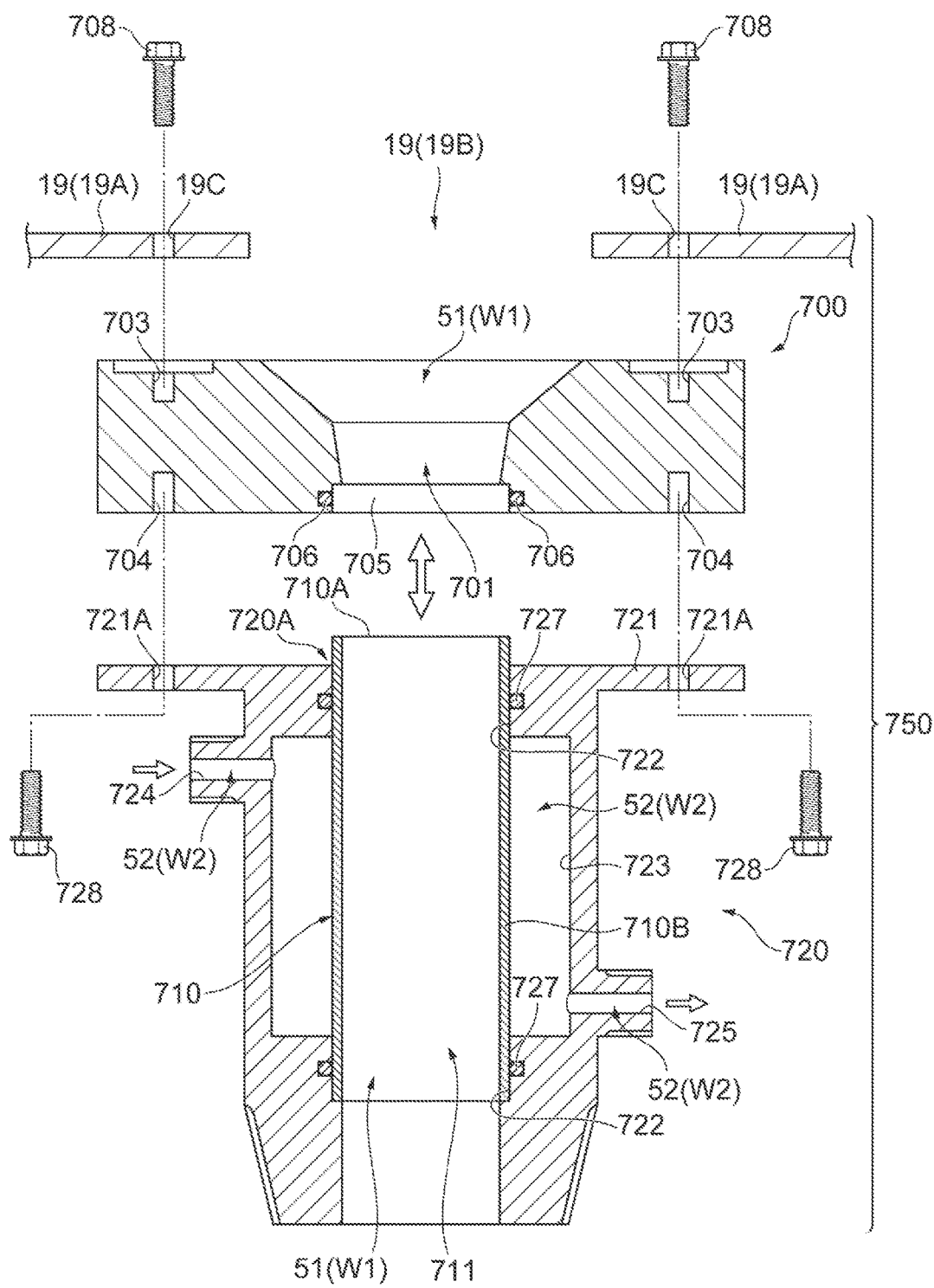
FIG. 16 is a sectional view of a wastewater heat recovery device according to a seventh embodiment illustrated in an exploded manner.
Figure 17:
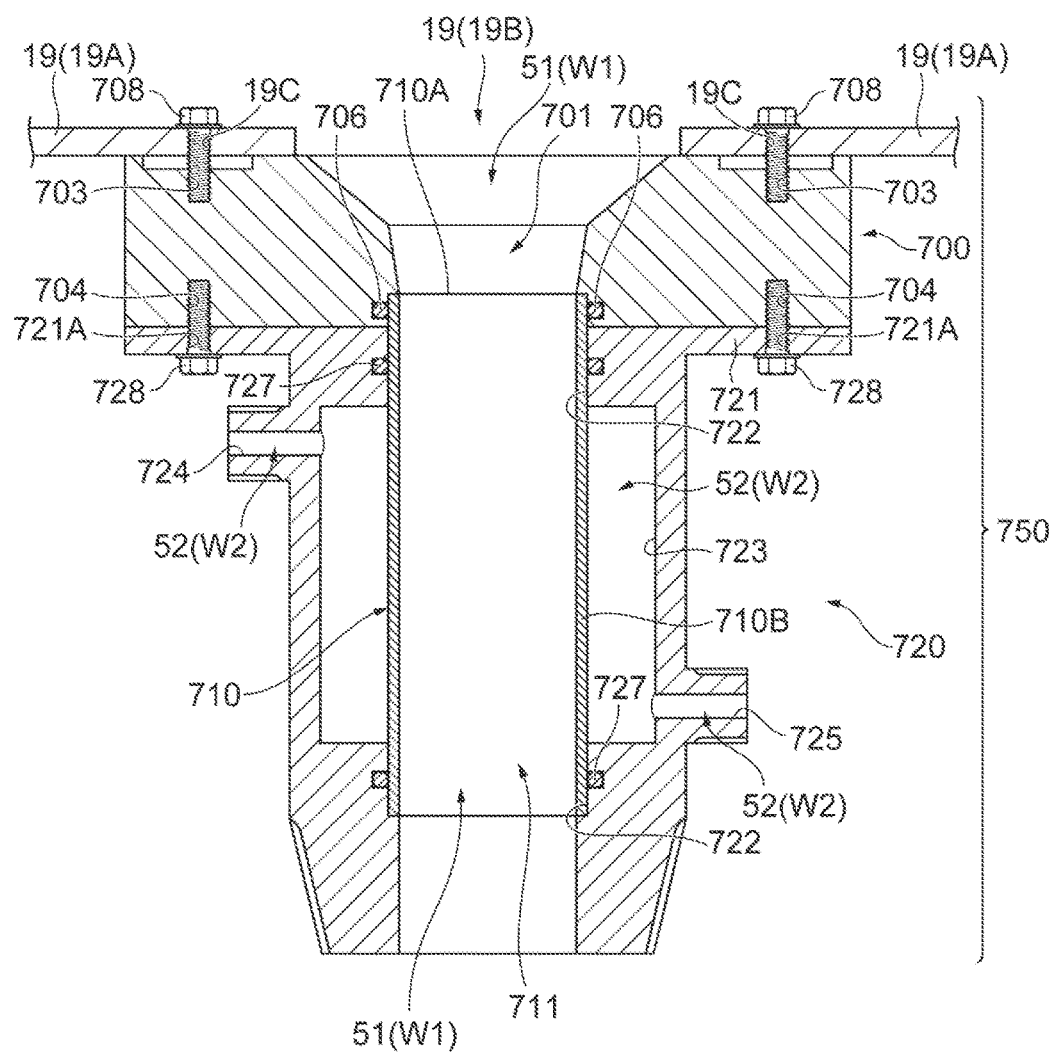
FIG. 17 is a sectional view illustrating the wastewater heat recovery device according to the seventh embodiment.

The following describes a wastewater heat recovery device 750 according to the seventh embodiment mainly with reference to FIG. 16 and FIG. 17. A dishwasher to be equipped with the wastewater heat recovery device 750 is the same as the dishwasher 1 of the first embodiment, and detailed description is omitted herein. As depicted in FIG. 16 and FIG. 17, the wastewater heat recovery device 750 includes a connection member 700, a straight tube 710, and a body member 720.

As depicted in FIG. 16, the connection member 700 has a hollow portion 701, first screw holes 703, and second screw holes 704. The hollow portion 701 forms part of the drain channel 51 in the wastewater heat recovery device 750. The first screw holes 703 are formed for fixation to the recessed portion 19 of the wash-water tank 15. The second screw holes 704 are formed for fixation to the body member 720. On the lower side (side connected to the body member 720) of the hollow portion 701, a fitted portion 705 into which the straight tube 710 is fitted is formed. On the outer peripheral surface of the fitted portion 705, a gasket 706 is provided.

The straight tube 710 is a tubular member formed so that the upper end portion 710A thereof can be fitted into the fitted portion 705. The straight tube 710 is formed of a metallic member having relatively high thermal conductivity. The hollow portion 711 of the straight tube 710 forms part of the drain channel 51 in the wastewater heat recovery device 750.

The body member 720 includes a connection portion 721, first inner peripheral surfaces 722, a second inner peripheral surface 723, an inflow portion 724, and an outflow portion 725, which are integrally formed of resin. The connection portion 721 is provided for fixation to the connection member 700, and has through holes 721A. The first inner peripheral surfaces 722 are each provided in an upper end portion and a lower end portion of the body member 720, and have an inner diameter that is substantially identical to the outer diameter of the straight tube 710 inserted thereinto. Accordingly, into the body member 720, the straight tube 710 can be inserted from an end portion 720A on the side connected to the connection member 700. On the first inner peripheral surfaces 722 each provided in the upper end portion and the lower end portion of the body member 720, gaskets 727 are provided.

The second inner peripheral surface 723 is formed between the first inner peripheral surfaces 722 each provided in the upper end portion and the lower end portion of the body member 720 in the axial direction, and has an inner diameter larger than that of the first inner peripheral surfaces 722. The inflow portion 724 is provided through which the supply water W2 is caused to flow into the body member 720, and forms part of the water supply channel 52. The outflow portion 725 is provided through which the supply water W2 is caused to flow out from the body member 720, and forms part of the water supply channel 52. When the straight tube 710 is inserted into the body member 720, between the outer peripheral surface 710B of the straight tube 710 and the second inner peripheral surface (inner peripheral surface) 723 of the body member 720, pert of the water supply channel 52 of the wastewater heat recovery device 750 is formed.

In the wastewater heat recovery device 750 including the connection member 700, the straight tube 710, and the body member 720 as described above, as depicted in FIG. 17, the connection member 700 is fixed to the recessed portion 19 of the wash-water tank 15. Specifically, screws 708 that are inserted into the through holes 19C formed in the recessed portion 19 of the wash-water tank 15 from the washing chamber 3 side are fastened into the first screw holes 703 of the connection member 700, whereby the connection member 700 is fixed to the recessed portion 19 of the wash-water tank 15.

Subsequently, the body member 720 into which the straight tube 710 is inserted is fixed to the connection member 700 so that the straight tube 710 is fitted into the fitted portion 705 of the connection member 700. Screws 728 that are inserted into the through holes 721A formed in the connection portion 721 from the machine chamber 4 side are fastened into the second screw holes 704 of the connection member 700, whereby the connection member 700 and the body member 720 are connected. Consequently, the drain channel 51 is formed by the hollow portion 701 of the connection member 700 and the hollow portion 711 of the straight tube 710, and the water supply channel 52 is formed in the inflow portion 724, in the outflow portion 725, and between the second inner peripheral surface 723 of the body member 720 and the outer peripheral surface 710B of the straight tube 710.

In the dishwasher 1 including the wastewater heat recovery device 750 thus configured, functional effects that the dishwasher 1 including the wastewater heat recovery device 650 can enjoy can be exerted. Furthermore, in the dishwasher 1 including the wastewater heat recovery device 750, the drain channel 51 is formed from the straight tube 710, and thus garbage such as food scraps can be easily removed. Because the straight tube 710 serving as the drain channel 51 is detachably configured, maintainability is excellent in that the straight tube 710 can be cleaned after being detached from the wastewater heat recovery device 750, for example.

Eighth Embodiment

Figure 18:
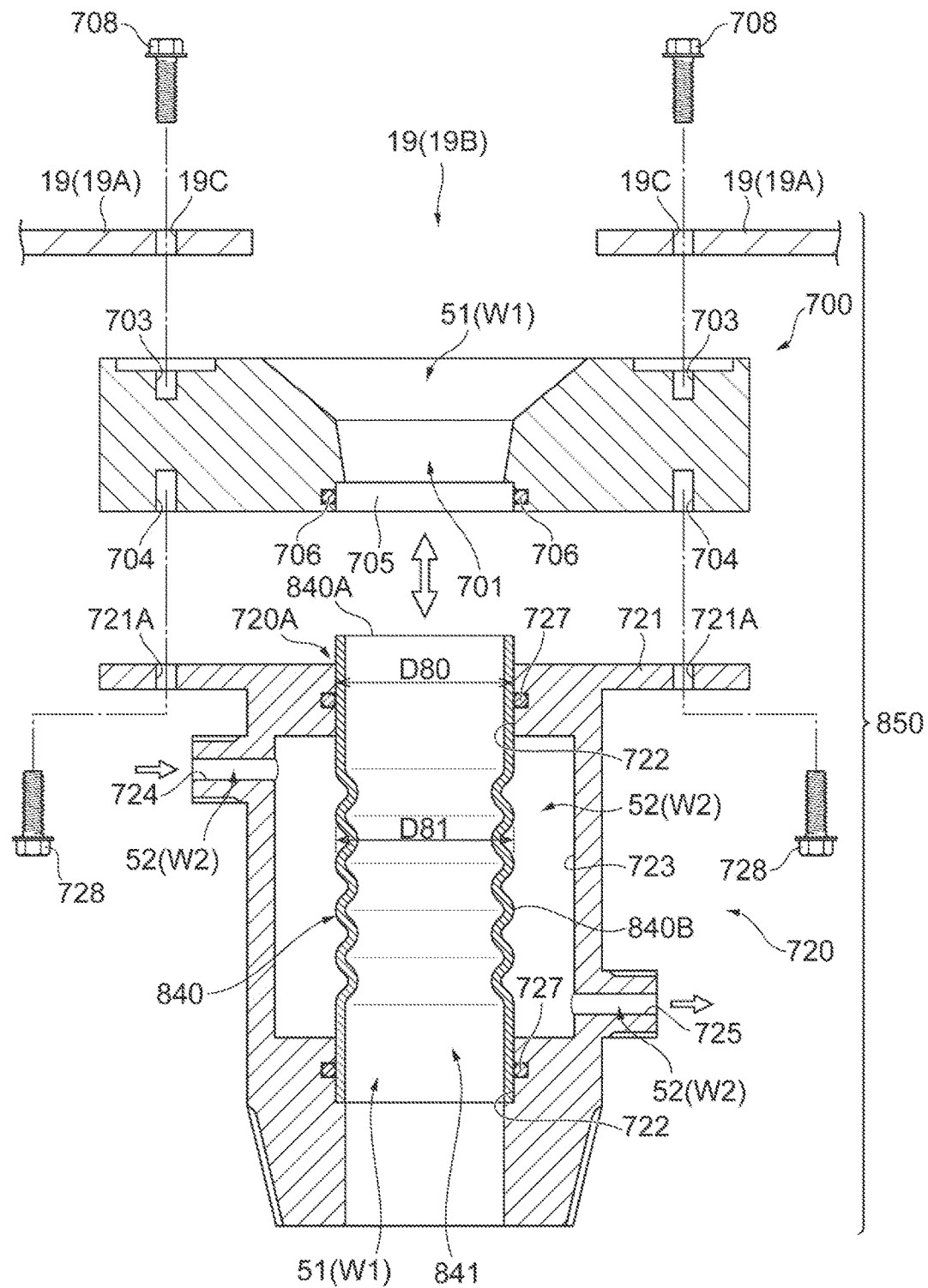
FIG. 18 is a sectional view of a wastewater heat recovery device according to an eighth embodiment illustrated in an exploded manner.
Figure 19:
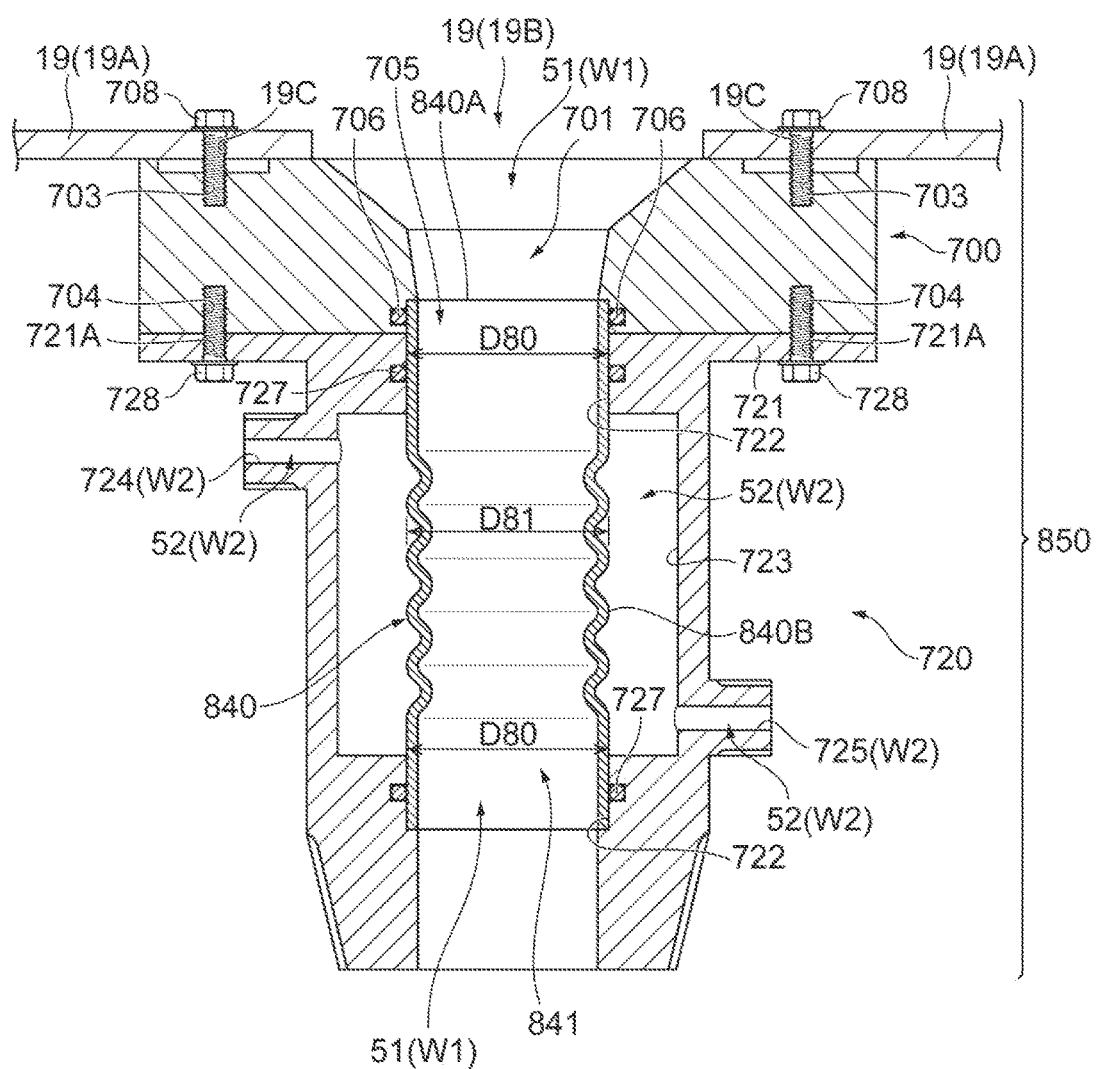
FIG. 19 is a sectional view illustrating the wastewater heat recovery device according to the eighth embodiment.

The following describes a wastewater heat recovery device 850 according to the eighth embodiment mainly with reference to FIG. 18 and FIG. 19. In the wastewater heat recovery device 850 according to the eighth embodiment, the straight tube 710 in the wastewater heat recovery device 750 according to the seventh embodiment is replaced with a bellows tube 840. Herein, the bellows tube 840 in the wastewater heat recovery device 850 will be described in detail, and detailed description for other configurations and a dishwasher to be equipped with the wastewater heat recovery device 850 is omitted herein.

As depicted in FIG. 18, on the lower side (side connected to the body member 720) of the hollow portion 701 of the connection member 700, the fitted portion 705 into which the bellows tube 840 is fitted is inserted.

The bellows tube 840 is a tubular member formed so that the upper end portion 840A thereof can be fitted into the fitted portion 705. The bellows tube 840 can be formed of metallic material having relatively high thermal conductivity. The upper and lower end portions of the bellows tube 840 are each formed not in a bellows shape but in a straight tubular shape. The hollow portion 841 of the bellows tube 840 forms part of the drain channel 51 of the wastewater heat recovery device 850. The bellows portion of the bellows tube 840 is formed so that the outer diameter D81 thereof is smaller than the inner diameter D80 of a portion of the body member 720 into which the bellows tube 840 is inserted.

The first inner peripheral surfaces 722 of the body member 720 are each provided in the upper end portion and the lower end portion of the body member 720, and have an inner diameter D80 that is a little larger than the outer diameter D81 of the bellows portion of the bellows tube 840 to be inserted thereinto. Accordingly, into the body member 720, the bellows tube 840 can be inserted from the end portion 720A an the side connected to the connection member 700. On the first inner peripheral surfaces 722 each provided in the upper end portion and the lower end portion of the body member 720, the gaskets 727 are provided. When the bellows tube 840 is inserted into the body member 720, in the inflow portion 724, in the outflow portion 725, and between the outer peripheral surface 840B of the bellows portion of the bellows tube 840 and the second inner peripheral surface (inner peripheral surface) 723 of the body member 720, the water supply channel 52 of the wastewater heat recovery device 850 is formed.

In the wastewater heat recovery device 850 including the connection member 700, the bellows tube 840, and the body member 720 as described above, as depicted in FIG. 19, the connection member 700 is fixed to the recessed portion 19 of the wash-water tank 15. Specifically, the screws 708 that are inserted into the through holes 19C formed in the recessed portion 19 of the wash-water tank 15 from the washing chamber 3 side are fastened into the first screw holes 703 of the connection member 700, whereby the connection member 700 is fixed to the recessed portion 19 of the wash-water tank 15.

Subsequently, the body member 720 into which the bellows tube 840 is inserted is fixed to the connection member 700 so that the bellows tube 840 is fitted into the fitted portion 705 of the connection member 700. The screws 728 that are inserted into the through holes 721A formed in the connection portion 721 from the machine chamber 4 side are fastened into the second screw holes 704 of the connection member 700, whereby the connection member 700 and the body member 720 are connected. Consequently, the drain channel 51 is formed by the hollow portion 701 of the connection member 700 and the hollow portion 841 of the bellows tube 840, and the water supply channel 52 is formed in the inflow portion 724, in the outflow portion 725, and between the second inner peripheral surface 723 of the body member 720 and the outer peripheral surface 840B of the bellows portion of the bellows tube 840.

In the dishwasher 1 including the wastewater heat recovery device 850 thus configured, the functional effects that the dishwasher 1 including the wastewater heat recovery device 650 can enjoy can be exerted. In the dishwasher 1 according to the eighth embodiment, a portion in which the drain channel 51 and the water supply channel 52 are in contact with each other is formed in a bellows shape, which can increase the contact area between the drain channel 51 and the water supply channel 52. This can enhance the efficiency of heat exchange between the drain channel 51 and the water supply channel 52. Because the bellows tube 840 forming part of the drain channel 51 is detachably configured, maintainability is excellent in that the bellows tube 840 can be cleaned after being detached from the wastewater heat recovery device 850, for example.

Ninth Embodiment

Figure 20:
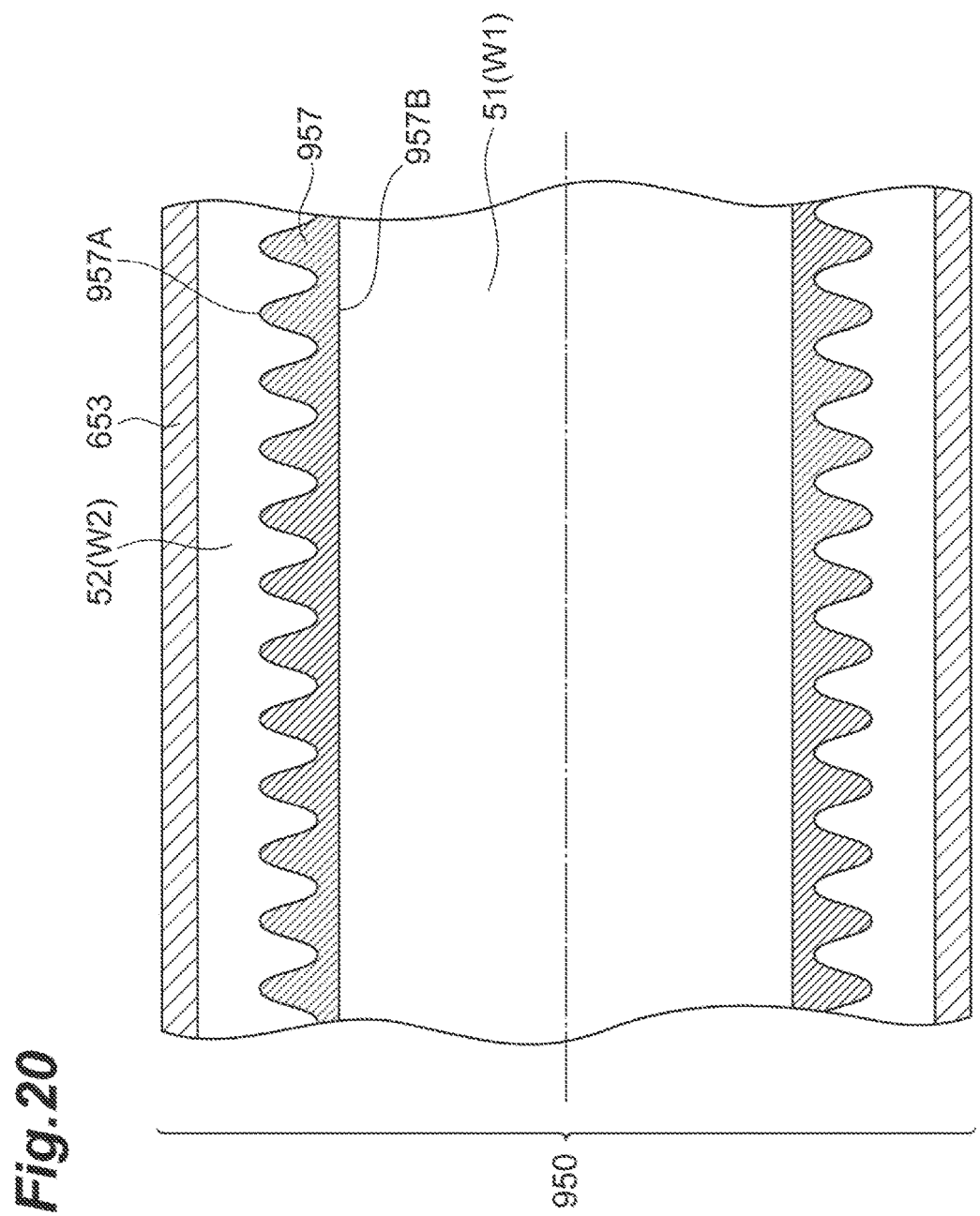
FIG. 20 is a partially enlarged sectional view illustrating a wastewater heat recovery device according to a ninth embodiment.

The following describes a wastewater heat recovery device 950 according to the ninth embodiment mainly with reference to FIG. 20. The wastewater heat recovery device 950 of the ninth embodiment is different in configuration of an inner tube 957 from the wastewater heat recovery device 650 of the sixth embodiment. Herein, the inner tube 957 in the wastewater heat recovery device 950 will be described in detail, and description for points that are the same as those in the wastewater heat recovery device 650 of the sixth embodiment is omitted.

FIG. 20 is a sectional view when the inner tube 957 is sectioned along the draining direction (longitudinal direction). As depicted in FIG. 20, the outer peripheral surface 957A of the inner tube 957 is formed as a corrugated surface. The inner peripheral surface 957B of the inner tube 957 is formed as a smooth surface in the same manner as that of the inner tube 657 of the sixth embodiment.

In the dishwasher 1 including the wastewater heat recovery device 950 thus configured, the functional effects that the dishwasher 1 including the wastewater heat recovery device 650 can enjoy can be exerted. In the dishwasher 1 including the wastewater heat recovery device 950, the surface area of the outer peripheral surface 957A of the inner tube 957 can be increased, whereby the contact area between the outer peripheral surface 957A of the inner tube 957 through which the wastewater W1 flows and the water supply channel 52 can be increased. This can enhance the efficiency of heat exchange between the wastewater W1 flowing in the drain channel 51 and the supply water W2 flowing in the water supply channel 52. In order to obtain the heat exchange efficiency equivalent to that in the case that the outer peripheral surface of the inner tube is formed as a smooth surface, the longitudinal length of the inner tube 957 can be shortened, whereby the entire wastewater heat recovery device 950 can be downsized. Because the inner peripheral surface 957B on the side where the wastewater W1 flows is still a smooth surface, accumulation of garbage such as food scraps contained in the wastewater W1 can be reduced.

In the foregoing, the first to ninth embodiments have been described, but the present invention is not limited to the above-described embodiments, and various modifications can be made without departing from the gist of the invention.

First Modification

Figure 21:
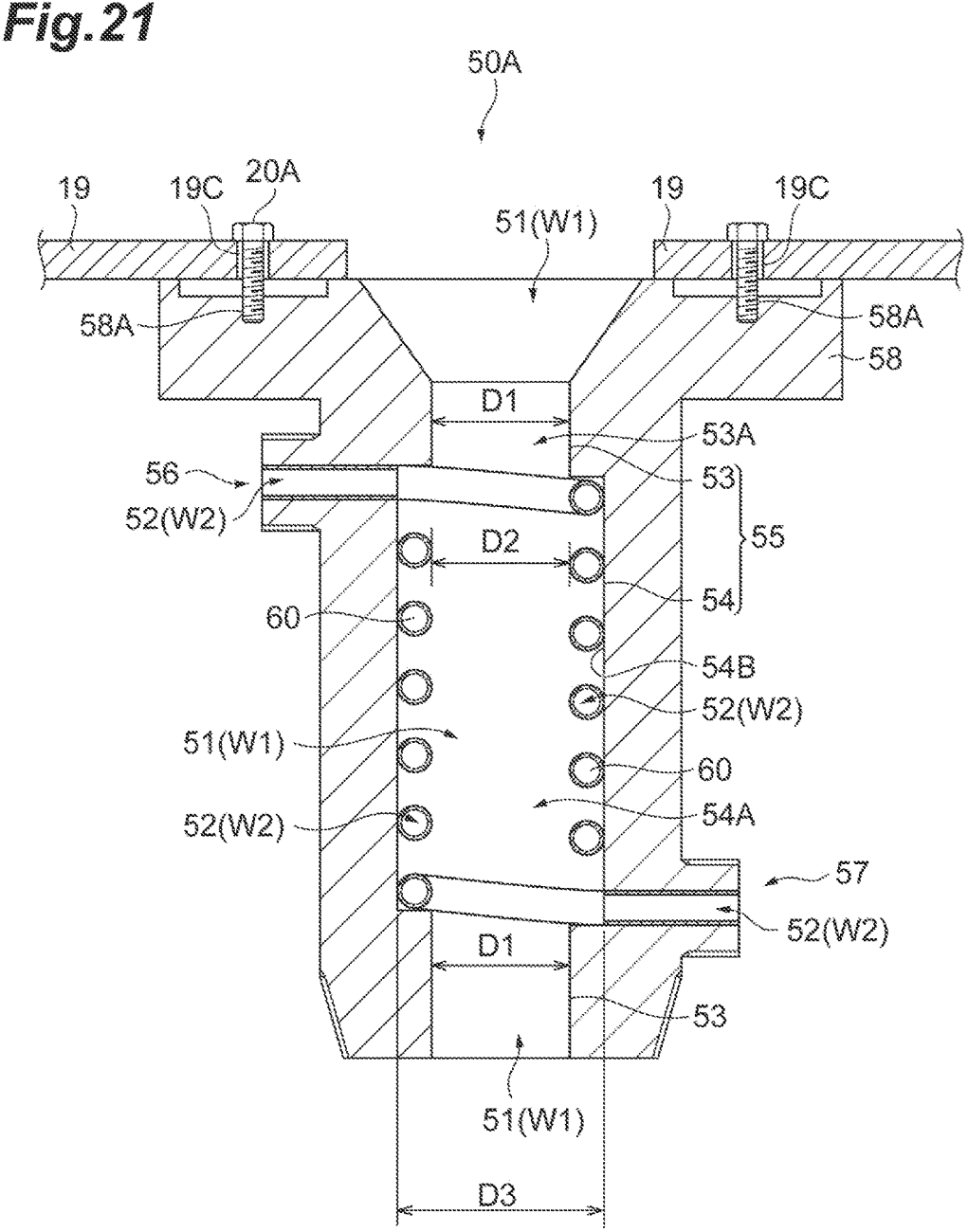
FIG. 21 is a sectional view of a wastewater heat recovery device according to a first modification.

For example, in the wastewater heat recovery device 50 according to the second embodiment, an example in which the tubular member 60 is provided so as to be wound around the axis L of the body portion 55 to extend gradually in the axis L direction, i.e., an example in which the tubular member 60 is aligned without a gap interposed therebetween in the axis L direction has been described, but the present invention is not limited to this. For example, as depicted in FIG. 21, a wastewater heat recovery device 50A may be structured such that the tubular member 60 is aligned with a gap interposed therebetween in the axis L direction. For the spirally disposed water supply channel described in the above embodiments, the same modification can be used.

Figure 22:
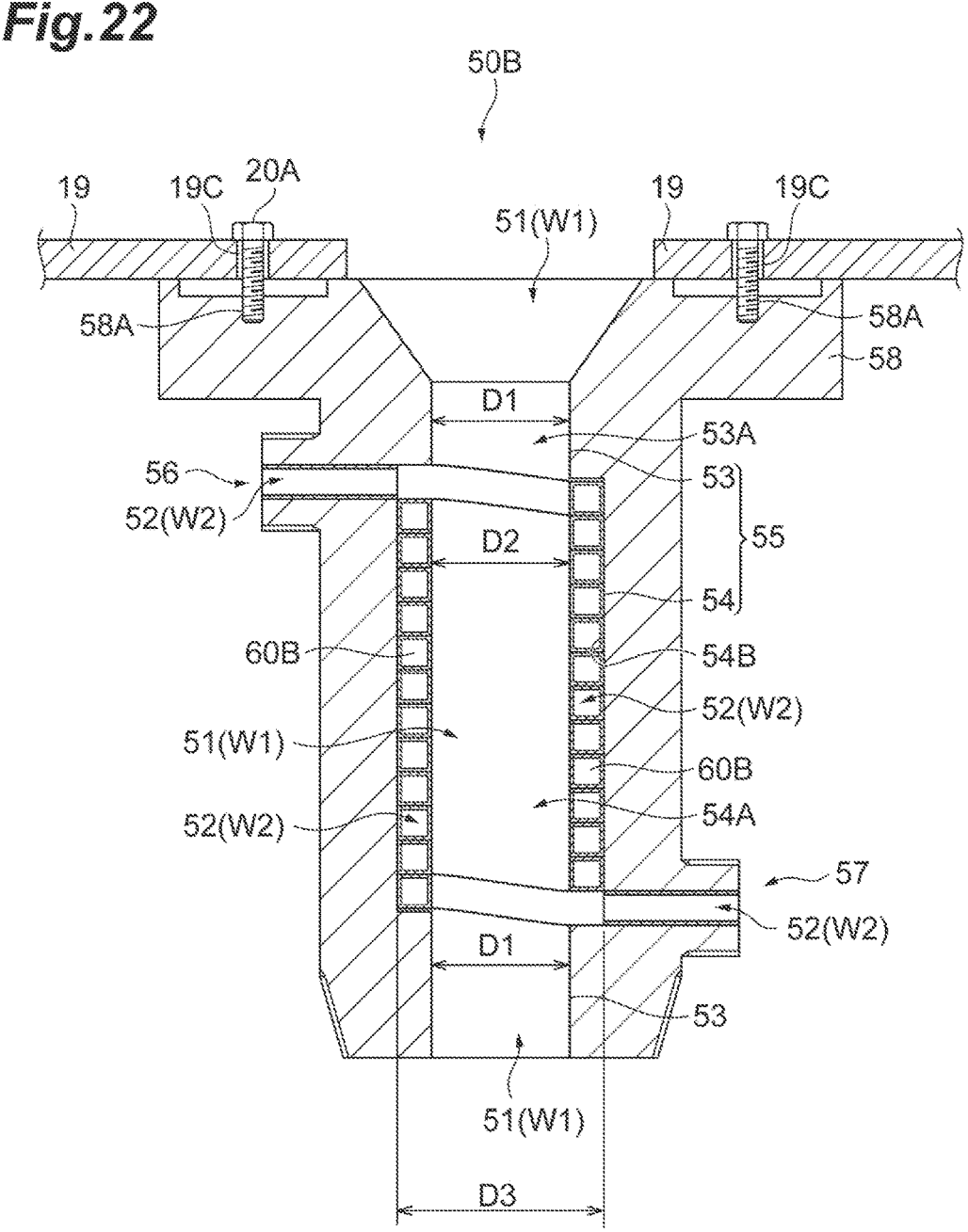
FIG. 22 is a sectional view of a wastewater heat recovery device according to the first modification.

For example, in the wastewater heat recovery device 50 according to the second embodiment, an example has been described in which the tubular member 60 is a circular tube whose cross section orthogonal to the channel direction is circular. However, the present invention is not limited to this. For example, as depicted in FIG. 22, the wastewater heat recovery device 50B may include a tubular member 60B whose cross section orthogonal to the channel direction is rectangular. In the wastewater heat recovery device thus configured, the inner peripheral surface of the drain channel 51 is straight, and thus garbage such as food scraps contained in the wastewater W1 can be more satisfactorily prevented from being accumulated. For the spirally disposed water supply channel described in the above embodiments, the same modification can be used.

Second Modification

Figure 23:
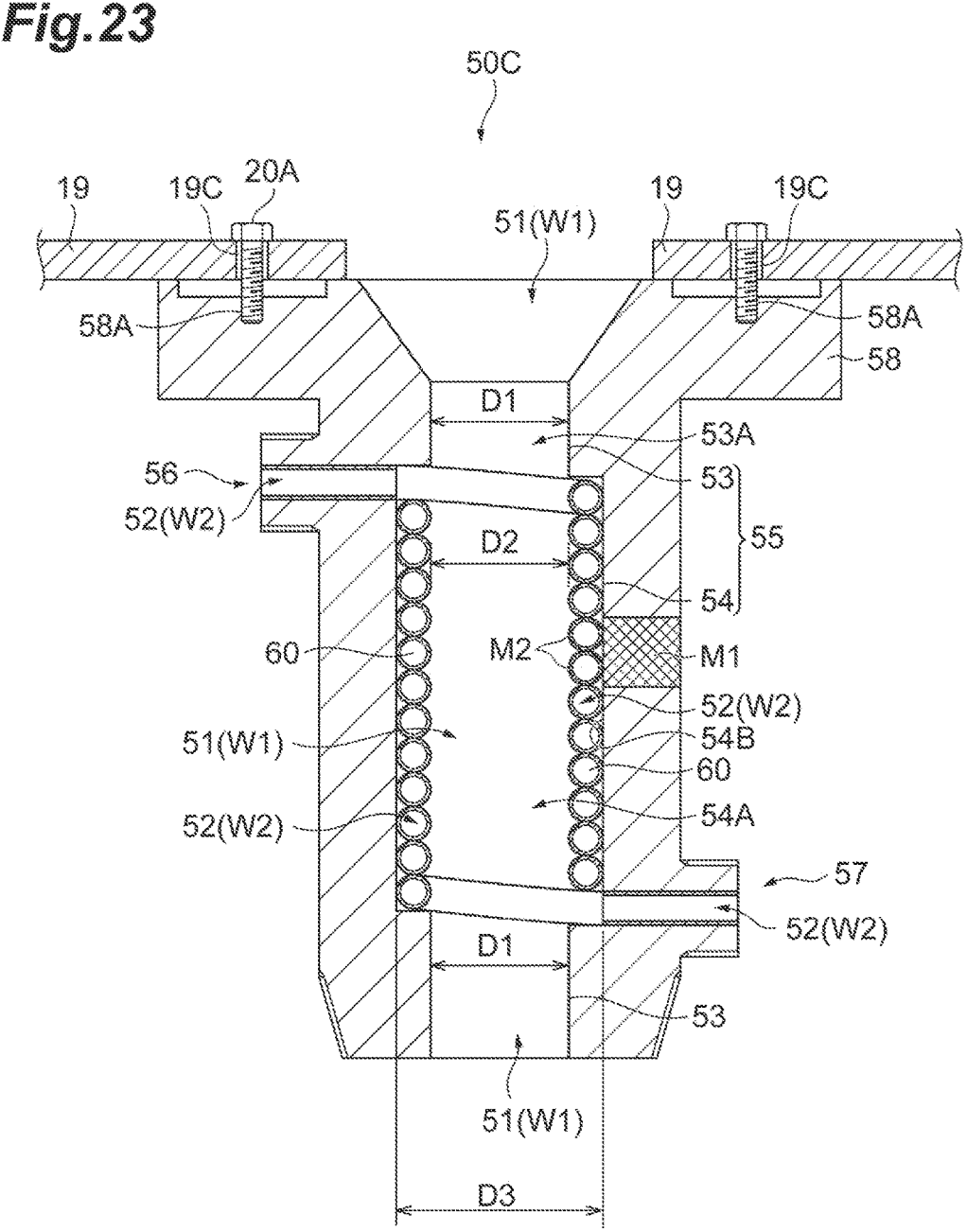
FIG. 23 is a sectional view of a wastewater heat recovery device according to a second modification.

For example, the body tubular portion 54 and the tubular member 60 in the second embodiment may be formed of transparent material (e.g., transparent resin) having heat resistance. In a wastewater heat recovery device 50C thus configured, when the wastewater W1 drained from the wash-water tank 15 passes through the wastewater heat recovery device 50C, flowing conditions of the wastewater W1 can be easily observed from outside. This makes it possible to check, for example, whether clogging with garbage such as food scraps contained in the wastewater W1 occurs in the drain channel 51, and whether soil is accumulated therein, without disassembling the wastewater heat recovery device 50C. Thus, maintenance can be performed appropriately depending on the state of the drain channel 51, and the frequency of periodically performing maintenance can be reduced In a wastewater heat recovery device 50C according to another embodiment, as depicted in FIG. 23, the body tubular portion 54 that is, not entirely, but partially formed of a transparent material M1 may be used. The tubular member 60 may also be, not entirely, but partially formed of a transparent material M2. In particular, the tubular member 60 is preferably formed of metallic material having high thermal conductivity because heat is exchanged with the wastewater W1 flowing outside the tubular member 60. In view of this, as depicted in FIG. 23, the tubular member 60 is formed of metallic material, and part thereof is formed of the transparent material M2 such as transparent resin, which allows the thermal conductivity to be kept at the same level, and the wastewater heat recovery device 50C can be excellent in maintainability.

Figure 24:
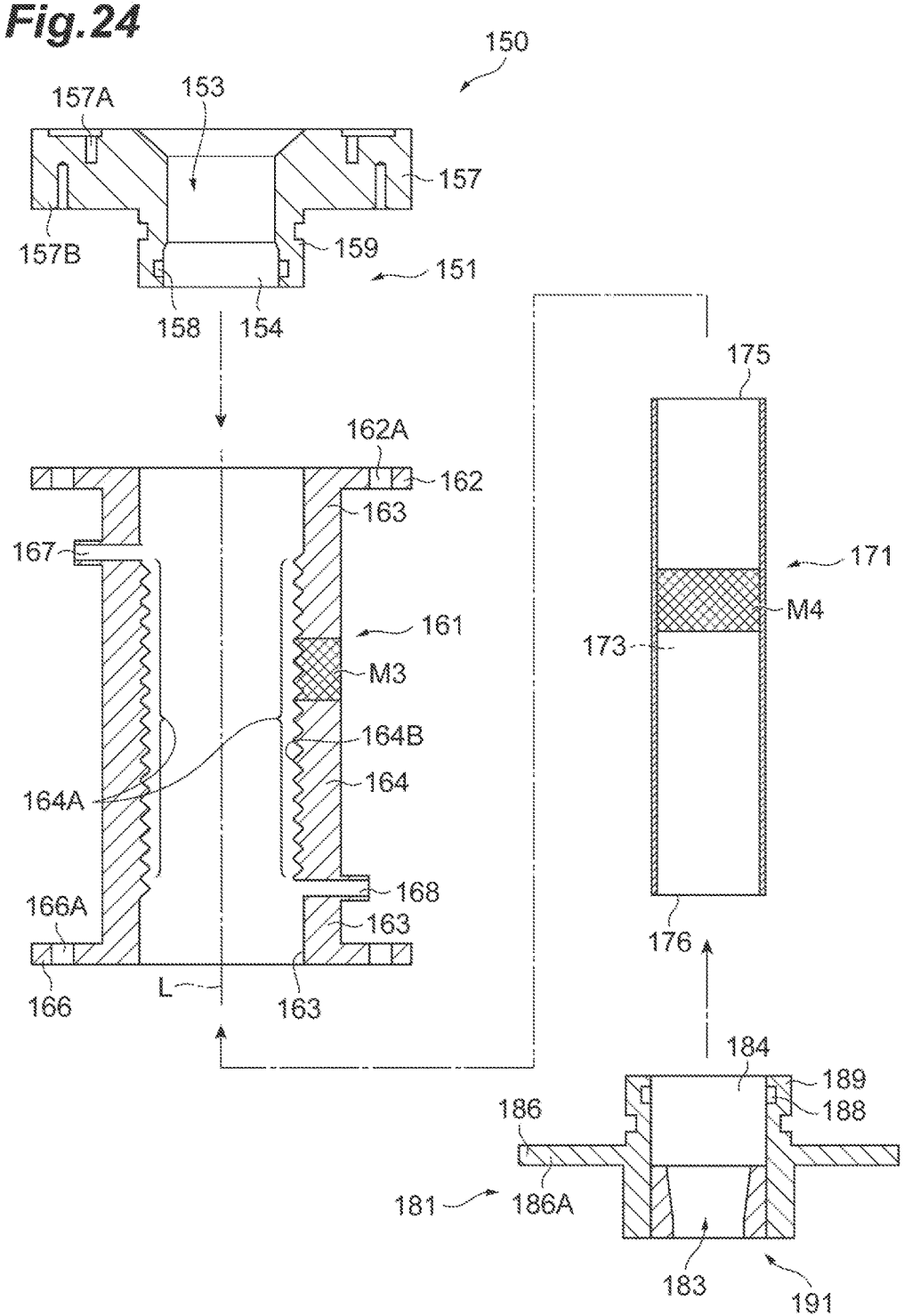
FIG. 24 is a sectional view illustrating respective members included in the wastewater heat recovery device according to the second modification.

For also the body member 161 and the straight tube 171 of the wastewater heat recovery device 150 according to the third embodiment, as depicted in FIG. 24, the whole or part thereof may be formed of a transparent material M3 or M4. In the same manner, for also the body member 261 and the tubular member 271 (see FIG. 11) in the fourth embodiment, the whole or part thereof may be formed of the transparent material. In the same manner, for also the body tubular portion 354 and the tubular member 360 (see FIG. 13) in the fifth embodiment, and for also the body portion 481 and the water supply tube 475 (see FIG. 3) in the first embodiment, the whole or part thereof may be formed of the transparent material.

Third Modification

Figure 25:
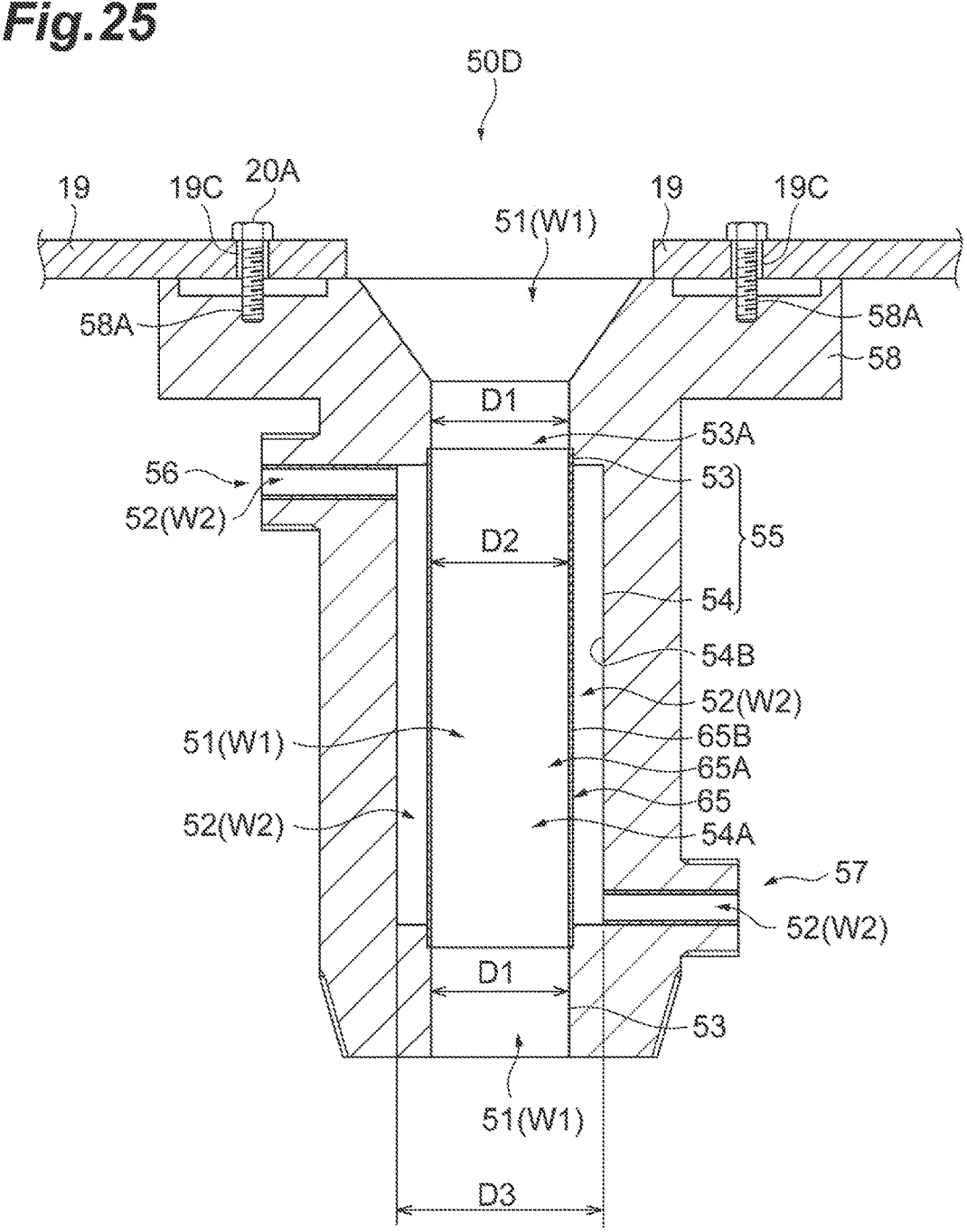
FIG. 25 is a sectional view of a wastewater heat recovery device according to a third modification.

For example, in the wastewater heat recovery device 50 according to the second embodiment, an example has been described in which the tubular member 60 is disposed so that the outer peripheral surface 60A of the tubular member 60 is in contact with the inner peripheral surface 54B of the body tubular portion 54, whereby the water supply channel 52 is disposed so as to face and be in contact with the inner peripheral surface 54B of the body tubular portion 54, and the drain channel 51 is formed in the space inside the water supply channel 52, but the present invention is not limited to this. For example, as depicted in FIG. 25, the wastewater heat recovery device 50D may be structured such that the drain channel 51 is formed of an inner tubular member 65 having a diameter smaller than that of the body tubular portion 54. In this case, the hollow portion 65A of the inner tubular member 65 serves as the drain channel 51, and the space between the inner peripheral surface 54B of the body tubular portion 54 and the outer peripheral surface 65B of the inner tubular member 65 serves as the water supply channel 52. In other words, the water supply channel 52 is disposed in a manner facing and being in contact with the inner peripheral surface 54B of the body tubular portion 54.

For example, in the wastewater heat recovery device 150 according to the third embodiment, an example has been described in which the spiral groove 165B is formed on the inner peripheral surface 164B of the body tubular portion 164, but the present invention is not limited to this. The body tubular portion 164 that does not have the spiral groove 165B on the inner peripheral surface may be used.

Fourth Modification

As depicted in FIG. 26(A), for example, the outer tube 653 in the sixth embodiment may be replaced with an outer tube 653A having a structure described below in detail. Specifically, in a wastewater heat recovery device 650A having a portion serving as a double tube in which the water supply channel 52 through which the supply water W2 flows is disposed outside the drain channel 51 through which the wastewater W1 flows, the outer tube 653A may have an inflow portion 654A through which the supply water W2 flows in as depicted in FIG. 26(A) and an outflow portion 655A through which the supply water W2 flows out as depicted in FIG. 26(B). At least one of the inflow portion 654A and the outflow portion 655A may be formed so that an inflow direction A1 (see FIG. 26(A)) of the supply water W2 at the inflow portion 654A and an outflow direction A2 (see FIG. 26(B)) of the supply water W2 at the outflow portion 655A correspond to a direction of a tangent (small deviation is allowed in this concept) to the circumference A3 of the double tube.

In the wastewater heat recovery device 650A, the directions of the inflow portion 654A and the outflow portion 655A formed in the outer tube 653A may be in the same direction in which the inflow direction A1 of the supply water W2 at the inflow portion 654A and the outflow direction A2 of the supply water W2 at the outflow portion 655A are aligned as depicted in FIG. 26(A) and FIG. 26(B), or alternatively may be in the opposite directions in which the inflow direction A1 of the supply water W2 at the inflow portion 654A and the outflow direction A2 of the supply water W2 at the outflow portion 655A are aligned as depicted in FIG. 27(A) and FIG. 27(B).

In the wastewater heat recovery device 650A thus configured, the supply water W2 that flows in from the inflow portion 654A of the outer tube 653A flows to the outflow portion 655A along the extending direction of the inner tube 657A while rotating along the outer peripheral surface of the inner tube 657A. In other words, the supply water W2 flows spirally in the space between the outer peripheral surface of the inner tube 657A and the inner peripheral surface of the outer tube 653A. Accordingly, the supply water W2 can be retained in the wastewater heat recovery device 650A for a longer period of time than in a case that the supply water W2 flows straight along the inner tube 657A. Consequently, a sufficient period of time for exchanging heat between the wastewater W1 and the supply water W2 can be ensured, which allows the supply water W2 to sufficiently receive heat that the wastewater W1 has.

The outer tube 653A in the ninth embodiment may be replaced with the outer tube 653A configured as described above. For also the inflow portion 724 and the outflow portion 725 of the body member 720 in the seventh and eighth embodiments, at least one of the inflow portion 724 and the outflow portion 725 may be formed so that the inflow direction A1 of the supply water W2 at the inflow portion 724 and the outflow direction A2 of the supply water W2 at the outflow portion 725 correspond to the direction of a tangent to the circumference A3 of the double tube.

Fifth Modification

For example, the outer tube 653 (653A) and the inner tube 657 (657A) in the sixth and ninth embodiments may be formed of transparent material (e.g., transparent resin) having heat resistance. In a wastewater heat recovery device 650B thus configured, when the wastewater W1 drained from the wash-water tank 15 passes through the wastewater heat recovery device 650B, flowing conditions of the wastewater W1 can be easily observed from outside. This makes it possible to check the state in the drain channel 51, for example, whether clogging with garbage such as food scraps contained in the wastewater W1 occurs in the drain channel 51, and whether soil is accumulated therein, without disassembling the wastewater heat recovery device 650B. Thus, maintenance can be performed appropriately depending on the state of the drain channel 51, and the frequency of periodically performing maintenance can be reduced.

Figure 28:
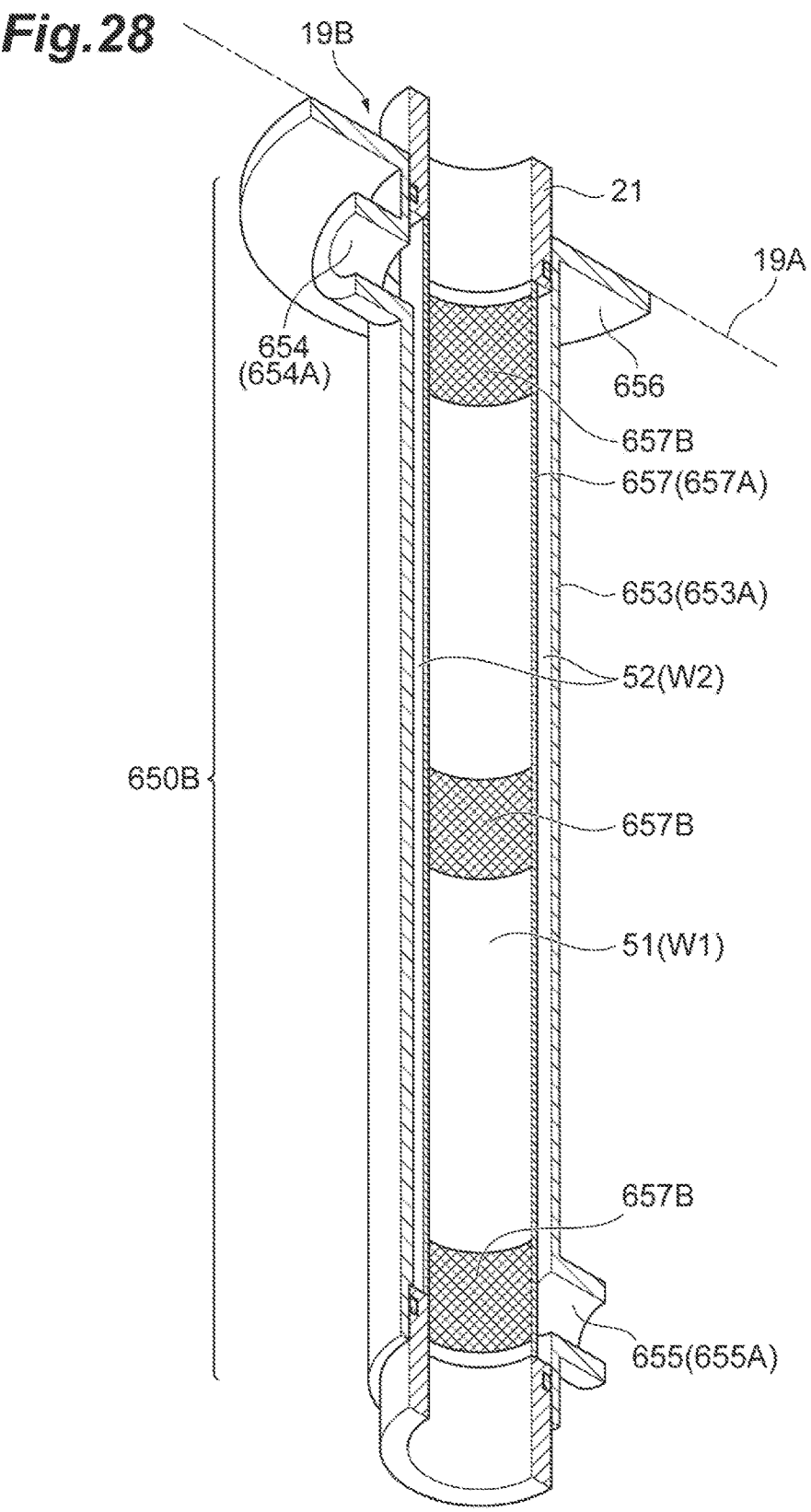
FIG. 28 is perspective view of a wastewater heat recovery device according to a fifth modification sectioned along the axial direction.

In a dishwasher according to another embodiment, as depicted in FIG. 28, the inner tube 657 (657A) that is, not entirely, but partially formed of a transparent material 657B may be used. The inner tube 657 (657A) is preferably formed of metallic material having high thermal conductivity because heat is exchanged with the supply water W2 flowing outside the inner tube 657 (657A). In view of this, as depicted in FIG. 28, the inner tube 657 (657A) is formed of metallic material, and part thereof is formed of the transparent material 657B, which allows the thermal conductivity to be kept as the same level, and the wastewater heat recovery device 650B can be excellent in maintainability.

For also the body member 720 and the straight tube 710 (see FIG. 17) in the seventh embodiment, the whole or part thereof may be formed of the transparent material. In the same manner, for also the body member 720 and the bellows tube 840 (see FIG. 19) in the eighth embodiment, the whole or part thereof may be formed of the transparent material.

Sixth Modification

Figure 29:
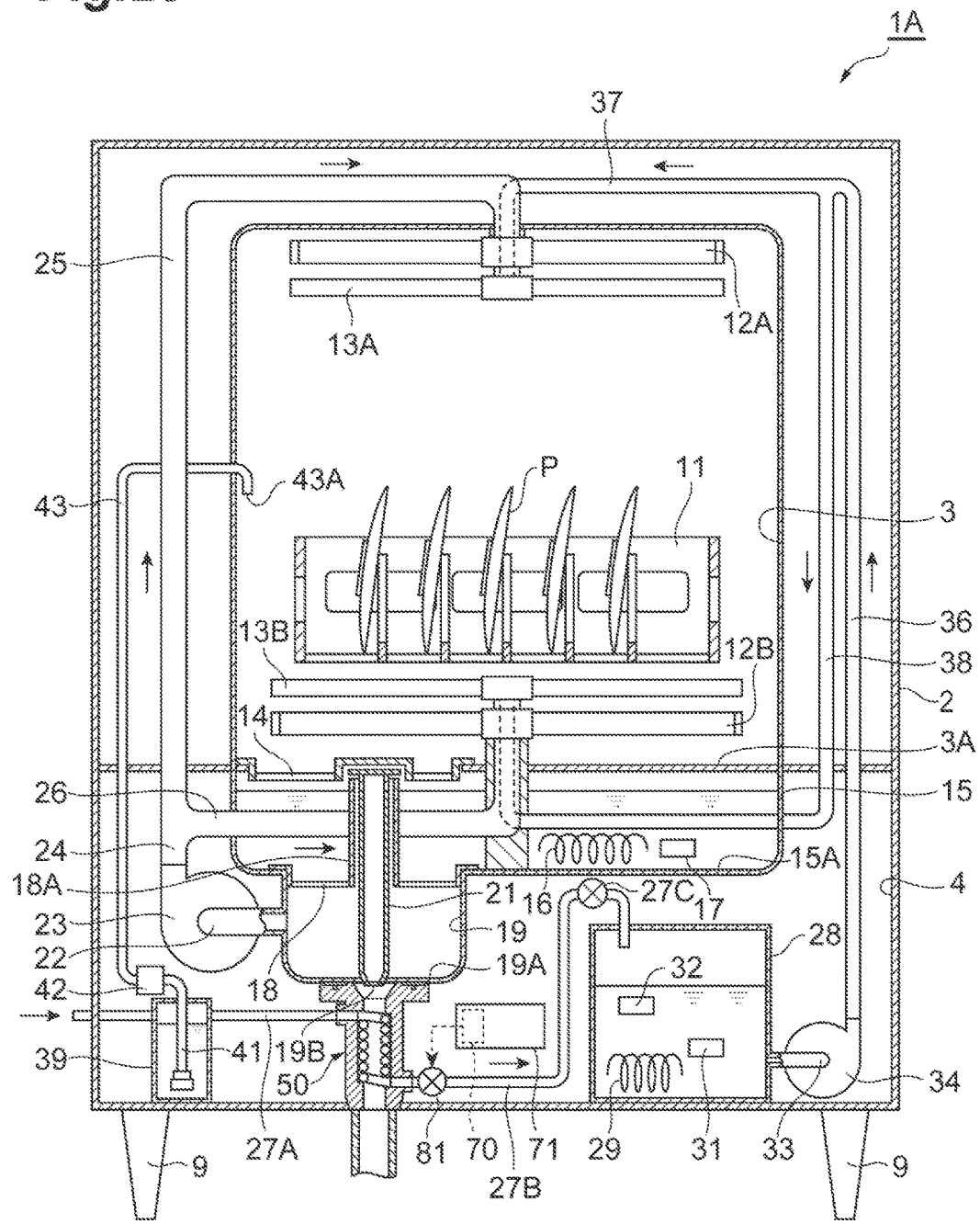
FIG. 29 is a sectional view illustrating a schematic structure of a dishwasher according to a sixth modification.

For example, as depicted in FIG. 29, a dishwasher 1A may have a structure in which a water supply valve 81 such as a solenoid valve is provided between the hot-water storage tank 28 and one of the wastewater heat recovery devices (e.g., the wastewater heat recovery device 50, 150, 250, 350, 450, 650, 650A, 650B, 750, 850, 950, 50A, 50, 50C, or 50D) of the first to ninth embodiments and the other modifications (in FIG. 29, the wastewater heat recovery device 50 is illustrated as an example) so as to be able to adjust the timing of supplying the supply water W2 to the corresponding wastewater heat recovery device. Opening and closing of a valve of the water supply valve 81 are controlled by the MICON 70 incorporated in the electrical box 71 disposed in the machine chamber 4.

In a dishwasher in general, water supply to the hot-water storage tank 28 and water drain from the wash-water tank 15 are intermittently performed. Accordingly, in a wastewater heat recovery device, there is a difference between the timing when the wastewater W1 flows and the timing when the supply water W2 flows, and there are occasions when heat cannot be sufficiently exchanged. In view of this, in the dishwasher 1A according to this sixth modification, the timing when the wastewater W1 flows and the timing when the supply water W2 flows are synchronized in the wastewater heat recovery device.

Specifically, for example, in a dishwasher in which water overflows from the wash-water tank 15 and a sufficient amount of water is drained at the timing when rinsing operation is completed, the MICON 70 closes the valve of the water supply valve 81 until the rinsing operation is completed (i.e., during a period when the rinse pump 34 is working), and opens the valve of the water supply valve 81 simultaneously when the rinsing operation is completed (i.e., the rinse pump 34 stops). The MICON 70 controls the water supply valve 81 as described above, thereby causing the supply water W2 to flow at the timing when the wastewater W1 in the wastewater heat recovery device. Accordingly, heat can be sufficiently exchanged between the wastewater W1 and the supply water W2 flowing in the wastewater heat recovery device.

Seventh Modification

Figure 30:
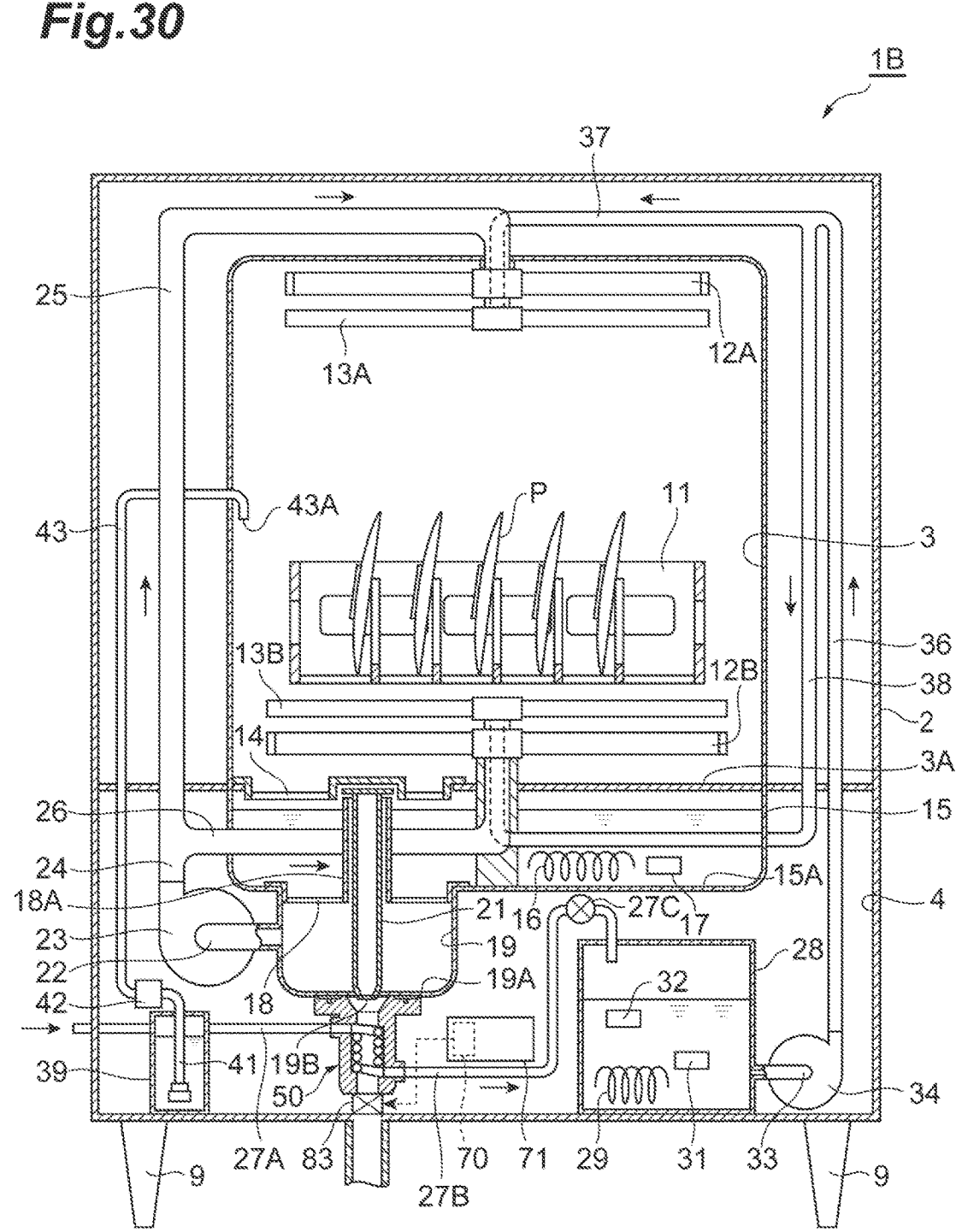
FIG. 30 is a sectional view illustrating a schematic structure of a dishwasher according to a seventh modification.

For example, as depicted in FIG. 30, a dishwasher 1B may have a structure in which a drain valve 83 such as a solenoid valve is provided downstream of one of the wastewater heat recovery devices (e.g., the wastewater heat recovery devices 50, 150, 250, 350, 450, 650, 650A, 650B, 750, 850, 950, 50A, 50B, 50C, and 50D) of the first to ninth embodiments and the other modifications (in FIG. 30, the wastewater heat recovery device 50 is illustrated as an example) so as to be able to retain the wastewater W1 in the corresponding wastewater heat recovery device. Opening and closing of a valve of the drain valve 83 are controlled by the MICON 70 incorporated in the electrical box 71 disposed in the machine chamber 4.

In a wastewater heat recovery device provided in a dishwasher in general, the wastewater W1 drained from the wash-water tank 15 is drained without being retained in the wastewater heat recovery device for a long period of time. Accordingly, in the wastewater heat recovery device, there are occasions when heat is not sufficiently transferred from the wastewater W1 to the supply water W2. There are also occasions when the wastewater W1 that is in a state of capable of exchanging heat with the supply water W2 (i.e., under conditions of relatively high temperature) is drained from the wastewater heat recovery device. In view of this, in the dishwasher 1B according to this seventh modification, the drain valve 83 is provided on the most downstream side in the wastewater heat recovery device so as to be able to adjust the period of time during which the wastewater W1 is retained in the wastewater heat recovery device.

Specifically, the MICON 70 controls opening of the valve of the drain valve 83 at any time intervals. The valve opening interval can be optionally set within a period from 0 seconds to when the next rising operation is performed. The valve opening interval can be optionally set to 0 seconds, 30 seconds, or 60 seconds, for example. The MICON 70 may control the valve of the drain valve 83 to be closed so that the wastewater W1 is always retained at the timing when the supply water W2 is supplied into the wastewater heat recovery device. Accordingly, heat can be sufficiently exchanged between the wastewater W1 and the supply water W2 flowing in the wastewater heat recovery device. Consequently, the temperature of the supply water W2 supplied to the hot-water storage tank 28 becomes relatively high, and thus consumption of gas or electric energy for heating up to a temperature for the supply water to be supplied as rinse water can be reduced, and running cost can also be reduced.

Other Modifications

The wastewater heat recovery devices (e.g., the wastewater heat recovery devices 50, 150, 250, 350, 450, 650, 650A, 650B, 750, 850, 950, 50A, 50B, 50C, and 50D) of the first to ninth embodiments and the other modifications may be used not only for the dishwashers 1, 1A, and 1B that are of a vertically opening-and-closing door type as described above, but may also be used for, for example, dishwashers of a type in which a door is provided in front of a washer body like an oven, or dishwashers of a conveyor type in which washing is performed while a rack for accommodating dishes is being conveyed.

In the second embodiment, a structure has been described as an example in which the water supply channel 52 is disposed in a manner facing and being in contact with the inner peripheral surface 54B of the body tubular portion 54, but the water supply channel 52 may be disposed in a manner facing and not being in contact with the inner peripheral surface 54B of the body tubular portion 54. In the same manner, in the third embodiment, the water supply channel 52 may be disposed in a manner facing and not being in contact with the inner peripheral surface 164B of the body tubular portion 164. In the fourth embodiment, the water supply channel 52 may be disposed in a manner facing and not being in contact with the inner peripheral surface 261A of the body member 261. In the fifth embodiment, the water supply channel 52 may be disposed in a manner facing and not being in contact with the inner peripheral surface 354B of the body tubular portion 354. In the third modification, the water supply channel 52 may be disposed in a manner facing and not being in contact with the inner peripheral surface 54B of the body tubular portion 54.

In the first embodiment, a structure has been described as an example in which the water supply tube 475 is disposed so as to face the inner peripheral surface 481B of the body portion 481 with the gap G1 interposed therebetween, but the present invention is not limited to this, and the water supply tube 475 may be disposed in a manner facing and being in contact with the inner peripheral surface 481B of the body portion 481.

In the present invention, the first to ninth embodiments, the first to seventh modifications, and the other modifications may be combined as appropriate.

REFERENCE SIGNS LIST 1, 1A, 1B . . . dishwasher, 3 . . . washing chamber, 4 . . . machine chamber, 50, 150, 250, 350, 450, 650, 650A, 650B, 750, 850, 950, 50A, 50B, 50C, 50D . . . wastewater heat recovery device, 51 . . . drain channel, 52 . . . water supply channel, 53 . . . connection tubular portion, 54, 354 . . . body tubular portion, 55 . . . body portion, 60, 60B, 271, 360 . . . tubular member, 163 . . . connection tubular portion, 164 . . . body tubular portion, 171 . . . straight tube (inserted tubular portion), 251 . . . first connection member (connection tubular portion), 261 . . . body member (body tubular portion), 281 . . . second connection member (connection tubular portion), 359 . . . second tapered portion (tapered portion), 359B . . . inclined surface, 359C . . . connection portion, 460 . . . first member, 461 . . . body portion, 463 . . . wastewater inlet portion, 471 . . . supply-water inlet portion, 473 . . . supply-water outlet portion, 475 . . . water supply tube, 477 . . . heat exchanging portion, 479 . . . joint portion, 480 . . . second member, 481 . . . body portion (body tubular portion), 481A . . . accommodating portion, 487 . . . tapered portion, 489 . . . wastewater outlet portion, φ1 . . . basic dimension, 653, 653A . . . outer tube (body portion), 654, 654A . . . inflow portion, 655, 655A . . . outflow portion, 657, 657A . . . inner tube, 700 . . . connection member (connection portion), 701 . . . hollow portion, 710 . . . straight tube, 720 . . . body member (body portion), 723 . . . second inner peripheral surface (inner peripheral surface), 724 . . . inflow portion, 725 . . . outflow portion, 840 . . . bellows tube

The invention claimed is:

1. A washer comprising:
a supply-water storage section configured to store supply water to be used for washing and rinsing an object to be washed accommodated in a washing chamber;
a wastewater storage section configured to temporarily store wastewater that has been used for washing and rinsing the object to be washed; and
a wastewater heat recovery device including a water supply channel through which the supply water is supplied to the supply-water storage section and a drain channel through which the wastewater is drained from the wastewater storage section, the wastewater heat recovery device being configured to exchange heat between the wastewater flowing in the drain channel and the supply water flowing in the water supply channel, wherein
the wastewater heat recovery device is disposed below the washing chamber, and is provided in a machine chamber in which a pump configured to deliver the supply water from the supply-water storage section to the washing chamber is disposed, and the drain channel is connected to a drain hole of the wastewater storage section.

2. The washer according to claim 1, wherein the wastewater heat recovery device includes:
a connection portion having a hollow portion serving as part of the drain channel, the connection portion being formed so as to be fixable to the wastewater storage section;
a straight tube formed so as to be capable of fitting into the hollow portion of the connection portion, the straight tube having a hollow portion serving as part of the drain channel; and
a body portion formed so as to be fixable to the connection portion to allow the straight tube to be inserted into the body portion from an end portion on a side connected to the connection portion, and
in a state in which the straight tube is inserted into the body portion, the water supply channel is formed between an outer peripheral surface of the straight tube and an inner peripheral surface of the body portion.

3. The washer according to claim 1, wherein, the wastewater heat recovery device includes:
a connection portion having a hollow portion serving as part of the drain channel, the connection portion being formed so as to be fixable to the wastewater storage section;
a bellows tube formed so as to be capable of fitting into the hollow portion, the bellows tube having a hollow portion serving as part of the drain channel; and
a body portion formed so as to be fixable to the connection portion to allow the bellows tube to be inserted into the body portion from an end portion on a side connected to the connection portion,
in a state in which the bellows tube is inserted into the body portion, the water supply channel is formed between an outer peripheral surface of the bellows tube and an inner peripheral surface of the body portion, and
a bellows portion of the bellows tube is formed so that an outer diameter of the bellows portion is smaller than an inner diameter of a portion of the body portion into which the bellows tube is inserted.

4. The washer according to claim 1, wherein the wastewater heat recovery device includes a portion serving as a double tube in which the water supply channel is disposed outside the drain channel,
the water supply channel includes an inflow portion through which the supply water flows in and an outflow portion through which the supply water flows out, and
at least one of the inflow portion and the outflow portion is formed so that a direction in which the supply water flows in at the inflow portion or a direction in which the supply water flows out at the outflow portion correspond to a direction of a tangent to the circumference of the double tube.

5. The washer according to claim 1, wherein the wastewater heat recovery device includes:
a body tubular portion having a tubular shape;
the water supply channel disposed in a manner facing an inner peripheral surface of the body tubular portion; and
the drain channel formed in a space inside the water supply channel in a radial direction of the body tubular portion.

6. The washer according to claim 5, wherein the water supply channel is disposed spirally in a manner facing an inner peripheral surface of the body tubular portion.

7. The washer according to claim 5, wherein the water supply channel is formed from a tubular member, and
the body tubular portion and the tubular member are formed Integrally.

8. The washer according to claim 5, wherein a spiral groove is formed on the inner peripheral surface of the body tubular portion,
the water supply channel is formed by an outer peripheral surface of an inserted tubular portion that is inserted into the body tubular portion and the spiral groove, and
a hollow portion of the inserted tubular portion serves as the drain channel.

9. The washer according to claim 5, further comprising a connection tubular portion a hollow portion of which serves as the drain channel, wherein
the connection tubular portion is connected to at least one of both ends of the body tubular portion in the axial direction, and
an inner diameter of the body tubular portion is formed so that an inner diameter of the drain channel that is formed inside the water supply channel in the radial direction of the body tubular portion is substantially identical to an inner diameter of the connection tubular portion.

10. The washer according to claim 5, further comprising a tapered portion connected to an end portion downstream of the body tubular portion in the axial direction, the tapered portion having a hollow portion serving as the drain channel, wherein
the tapered portion has an inclined surface that causes an inner diameter of the hollow portion to gradually decrease from a connection portion connected to the body tubular portion toward a direction in which the wastewater flows,
when the distance in the radial direction of the body tubular portion between the water supply channels that are opposed to each other across a central axis of the body tubular portion is defined as a basic dimension, the inclined surface is formed so that, in a cross section passing through the central axis along the direction in which the wastewater flows, a distance between the inclined surface and one point on the connection portion that is opposed to the inclined surface across the central axis is larger than the basic dimension.

11. The washer according to claim 1, wherein the wastewater heat recovery device includes:
a first member; and
a second member,
the first member includes:
a body portion including a supply-water inlet portion serving as an inlet of the water supply channel, a supply-water outlet portion serving as an outlet of the water supply channel, and a wastewater inlet portion serving as an inlet of the drain channel; and
a water supply tube serving as the water supply channel that includes one end connected to the supply-water inlet portion and another end connected to the supply-water outlet portion, extends from the one end to the other end, and is disposed so that part between the one end and the other end protrudes in one direction from the body portion, the second member is detachably mounted on the one direction side of the body portion and includes:
- an accommodating portion accommodating the part of the water supply tube protruding from the body portion and serving as the drain channel; and
- a wastewater outlet portion serving as an outlet of the drain channel, the wastewater flowing in the accommodating portion and the supply water flowing in the water supply tube accommodated in the accommodating portion exchange heat with each other.

12. The washer according to claim 11, wherein
the part of the water supply tube protruding from the body portion is spirally wound along the one direction, and
the wastewater flowing in from the wastewater inlet portion passes through a space extending along the one direction and surrounded by the water supply tube spirally wound to be drained from the wastewater outlet portion.

13. The washer according to claim 12, wherein
a joint portion between the accommodating portion of the second member and the body portion of the first member is provided at a position that faces the water supply tube spirally wound in a plane direction orthogonal to the one direction.

14. The washer according to claim 11, wherein
the water supply tube of the first member is formed integrally during injection molding of the body portion.

15. The washer according to claim 11, wherein
the supply-water inlet portion and the supply-water outlet portion of the body portion of the first member have screw threads formed integrally during injection molding.

* * * * *